United States Patent [19]

Okazawa et al.

[11] Patent Number: 5,276,818
[45] Date of Patent: Jan. 4, 1994

[54] BUS SYSTEM FOR INFORMATION PROCESSING SYSTEM AND METHOD OF CONTROLLING THE SAME

[75] Inventors: Koichi Okazawa, Tokyo; Hiroaki Aotsu; Hitoshi Kawaguchi, both of Yokohama; Masami Jikihara; Kazushi Kobayashi, both of Ebina; Koichi Kimura; Tetsuya Mochida, both of Yokohama, all of Japan

[73] Assignee: Hitachi, Ltd., Tokyo, Japan

[21] Appl. No.: 512,810

[22] Filed: Apr. 20, 1990

[30] Foreign Application Priority Data

Apr. 24, 1989 [JP] Japan ............................. 1-101621
Dec. 25, 1989 [JP] Japan ............................. 1-332716

[51] Int. Cl.⁵ ................................................ G06F 13/00
[52] U.S. Cl. ...................................... 395/325; 364/DIG. 1;
364/228; 364/229; 364/230; 364/230.1;
364/230.2; 364/230.4; 364/231.5; 364/240;
364/240.5; 364/241.2; 364/241.3; 364/242.6;
364/242.7; 364/242.91; 364/242.92; 364/260;
364/260.1; 364/270.5; 364/270.6; 364/271.6;
364/271.7
[58] Field of Search .................. 364/200, 900, DIG.;
395/325, 725

[56] References Cited

U.S. PATENT DOCUMENTS

| | | | |
|---|---|---|---|
| 3,710,324 | 1/1973 | Cohen et al. | 364/200 |
| 4,090,238 | 5/1978 | Russo | 364/200 |
| 4,302,808 | 11/1981 | Zanchi et al. | 395/325 |
| 4,449,183 | 5/1984 | Flahive et al. | 364/200 |
| 4,602,327 | 7/1986 | La Violette et al. | 364/200 |
| 4,627,018 | 12/1986 | Trost et al. | 364/900 |
| 4,745,548 | 5/1988 | Blahut | 364/200 |
| 4,763,249 | 8/1988 | Bomba et al. | 364/200 |
| 4,785,394 | 11/1988 | Fischer | 364/200 |
| 4,807,116 | 2/1989 | Katzman et al. | 364/200 |
| 4,959,775 | 9/1990 | Yonekura | 364/200 |
| 5,047,921 | 9/1991 | Kinter et al. | 364/200 |

OTHER PUBLICATIONS

IEEE Standard Backplane Bus Specification for Multiprocessor Architecture: Futurebus, ANSI/IEEE Std. 896.1-1987, pp. 73-119.
IEEE Standard for a Simple 32 bit Backplane Bus Nubus. ANSI/IEEE Std. 1196-1987, 21-62.

Primary Examiner—Michael R. Fleming
Assistant Examiner—Ayaz R. Sheikh
Attorney, Agent, or Firm—Antonelli, Terry, Stout & Kraus

[57] ABSTRACT

A bus system for an information processing system in which data transfer among plurality of modules is controlled on a common bus. In response to a bus use request from a module, a command is issued for aborting data transfer being performed by another module having a lower priority. The module which is transferring the data responds to the abort command by issuing a signal indicating that a word being transferred is the final word. The data is transferred between a master and a slave through an address bus having a same width as the data in synchronism with a clock supplied from a bus controller.

7 Claims, 44 Drawing Sheets

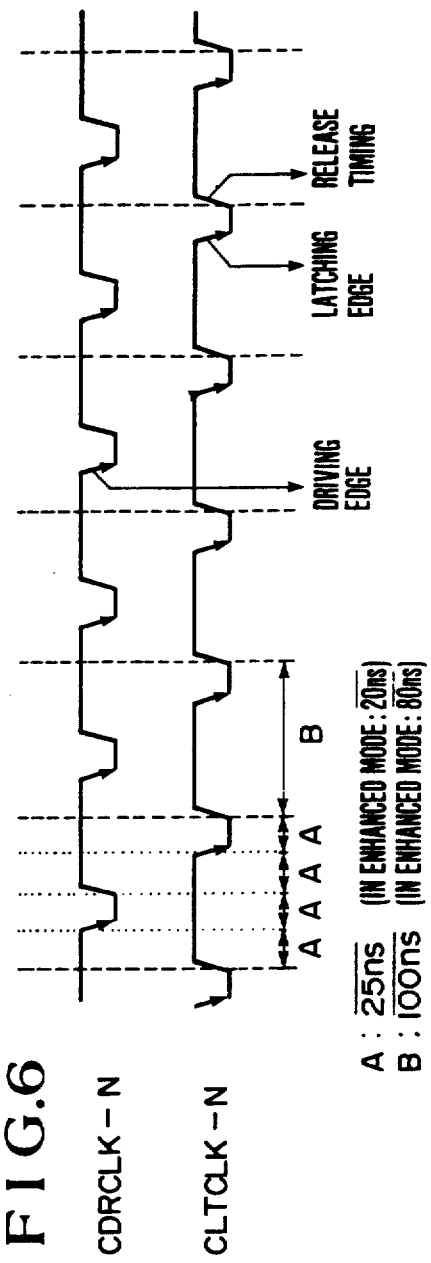
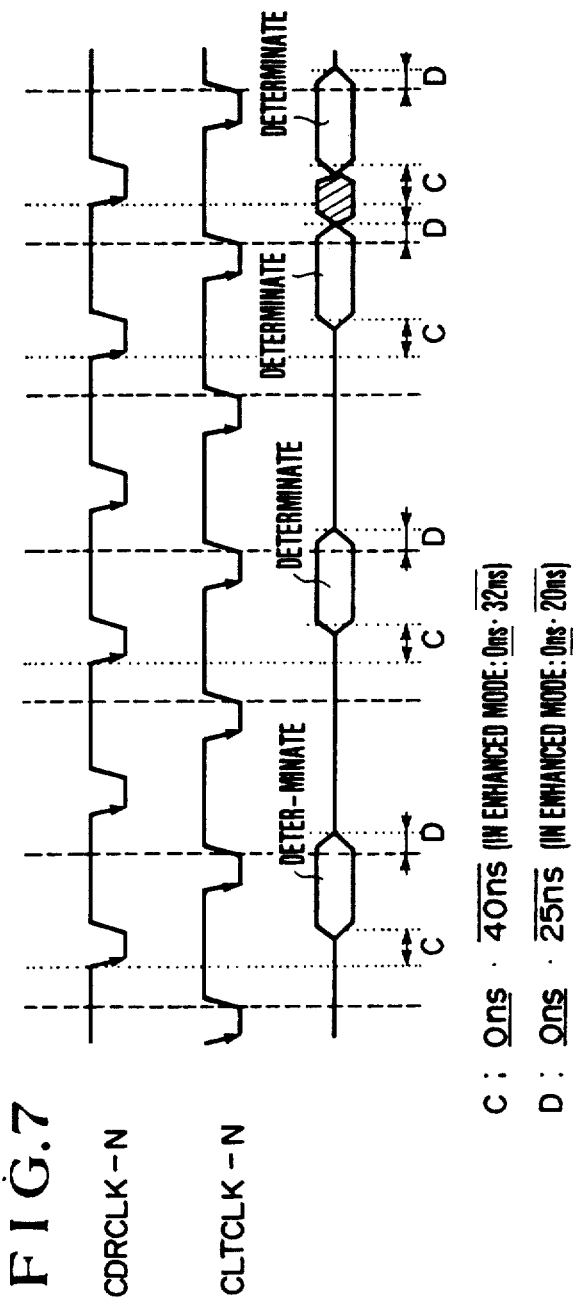

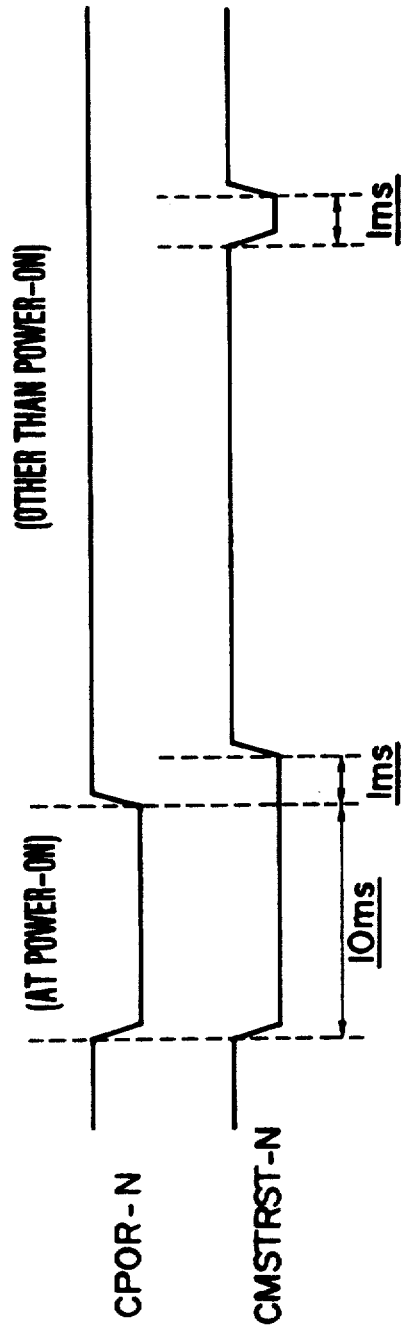

FIG. 10

| NAMES | ELECTRIC CHARACTERISTICS | | | DRIVER | RECEIVER | MEANING/ROLE |
|---|---|---|---|---|---|---|
| CAD (·,·)-P<br>·:0-3<br>::0-7 | CMOS<br>/TTL | 24mA OUTPUT | MAX. LOAD 20mA | 3-state<br>3.9kΩ<br>pull up | ALL CONNECTED DEVICES | ALL CONNECTED DEVICES | 32-bit ADDRESS/DATA MULTIPLEX LINE |
| CED (·,·)-P<br>·:0-3<br>::0-7 | | | | | 64-bit DEVICE | 64-bit DEVICE | 32-bit EXPANSION DATA LINE FOR 64-bit DATA TRANSFER |

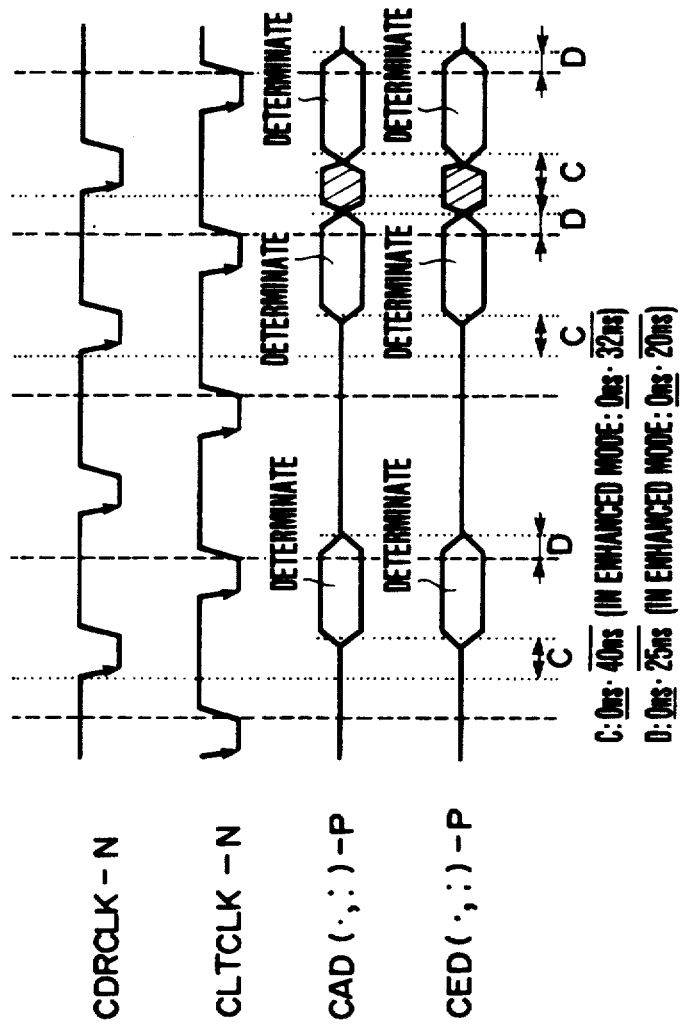

FIG.13

| NAMED | ELECTRIC CHARACTERISTICS | | | DRIVER | RECEIVER | MEANING/ROLE |
|---|---|---|---|---|---|---|
| CMSK(·)-N :0-3 (CMSK(·)) | CMOS /TTL | 24mA OUTPUT | MAX. LOAD 20mA | MASTER DEVICE | SLAVE DEVICE | DATA MASK SIGNAL FOR BYTES 0-3 |
| CEMSK(·)-N :0-3 (CEMSK(·)) | | | 3-state 3.9kΩ pull up | 64-bit MASTER DEVICE | 64-bit SLAVE DEVICE | MASK SIGNAL FOR 64-bit EXPANSION DATA TRANSFER |

FIG. 15

| NAMES | ELECTRIC CHARACTERISTICS | | | DRIVER | RECEIVER | MEANING/ROLE |
|---|---|---|---|---|---|---|
| COP(·)-P :0 3 | CMOS /TTL | 24mA OUTPUT | MAX. LOAD 20mA | 3-state 3.9kΩ pull up | SUPPORTING DEVICE (64-bit DEVICE) | SBUSC | ODD PARITY PER BYTE |
| CEOP(·)-P :0 3 | | | | | | | ODD PARITY FOR EXPANSION DATA |
| CPCEN-N (CPCEN) | | | | | ALL CONNECTED DEVICES | | PARITY ENABLE |

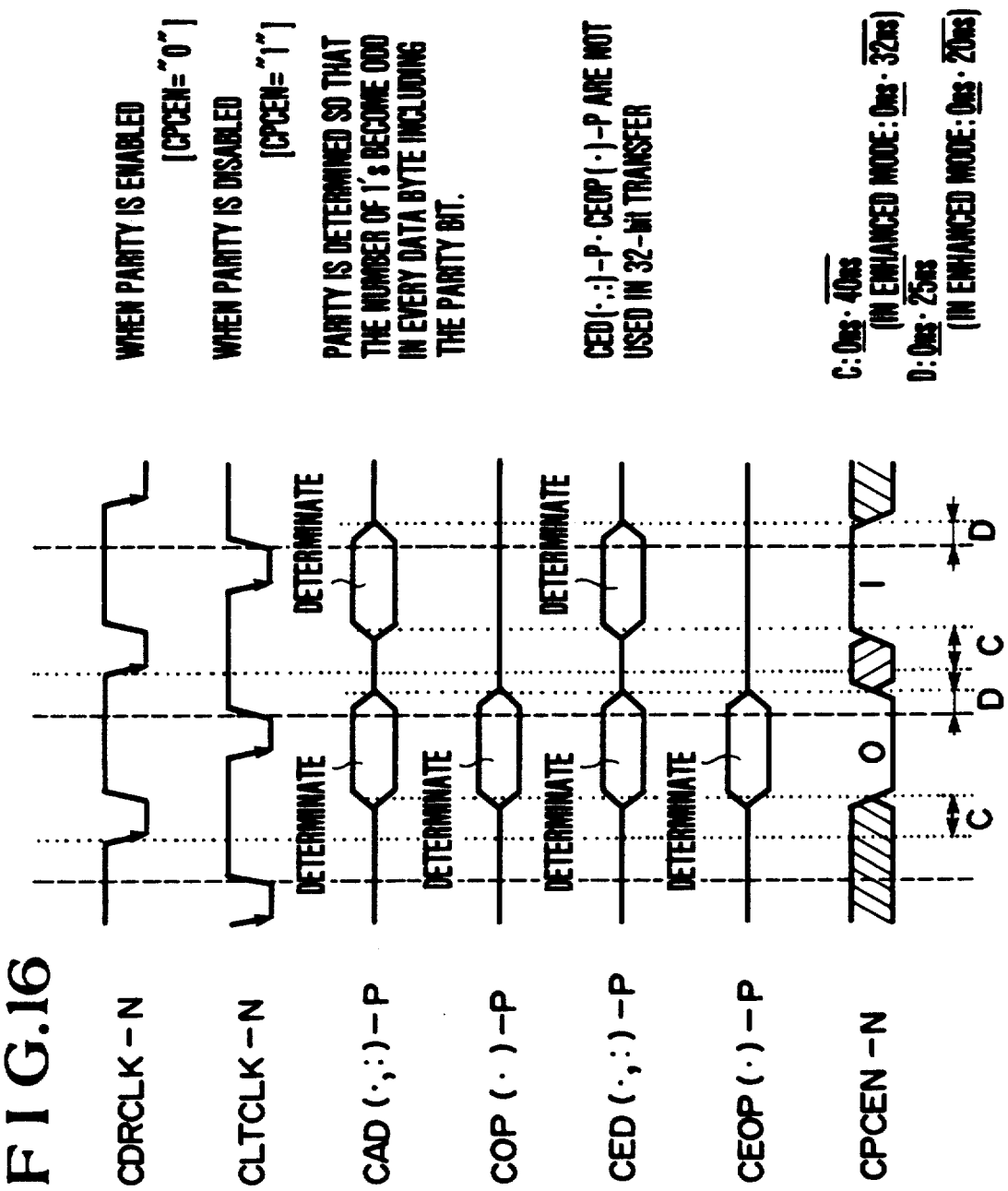

FIG. 17

| NAMES | ELECTRIC CHARACTERISTICS | | | DRIVER | RECEIVER | MEANING/ROLE |
|---|---|---|---|---|---|---|
| CADR-H (CADR) | CMOS /TTL | 24mA OUTPUT | MAX. LOAD 20mA | 3-state 3.9k pull up | MASTER DEVICE | ALL CONNECTED DEVICES | ADDRESS/DATA SWITCHING |
| CWRITE-H (CWRITE) | | | | | | | READ/WRITE SWITCHING |
| CBUSLK-H (CBUSLK) | | | | | | | INDICATION OF BUS TENURE |
| CMSTEN-H (CMSTEN) | | | | | | | ENABLING OF MASTER TO PERFORM DATA TRANSFER |
| CSLVEN-H (CSLVEN) | | | | | SLAVE DEVICE | | ENABLING OF SLAVE TO PERFORM DATA TRANSFER |
| CWLVEN-H (CWLVEN) | | | | | ALL CONNECTED DEVICES | 64-bit DEVICE | ENABLING OF 64-bit TRANSFER |

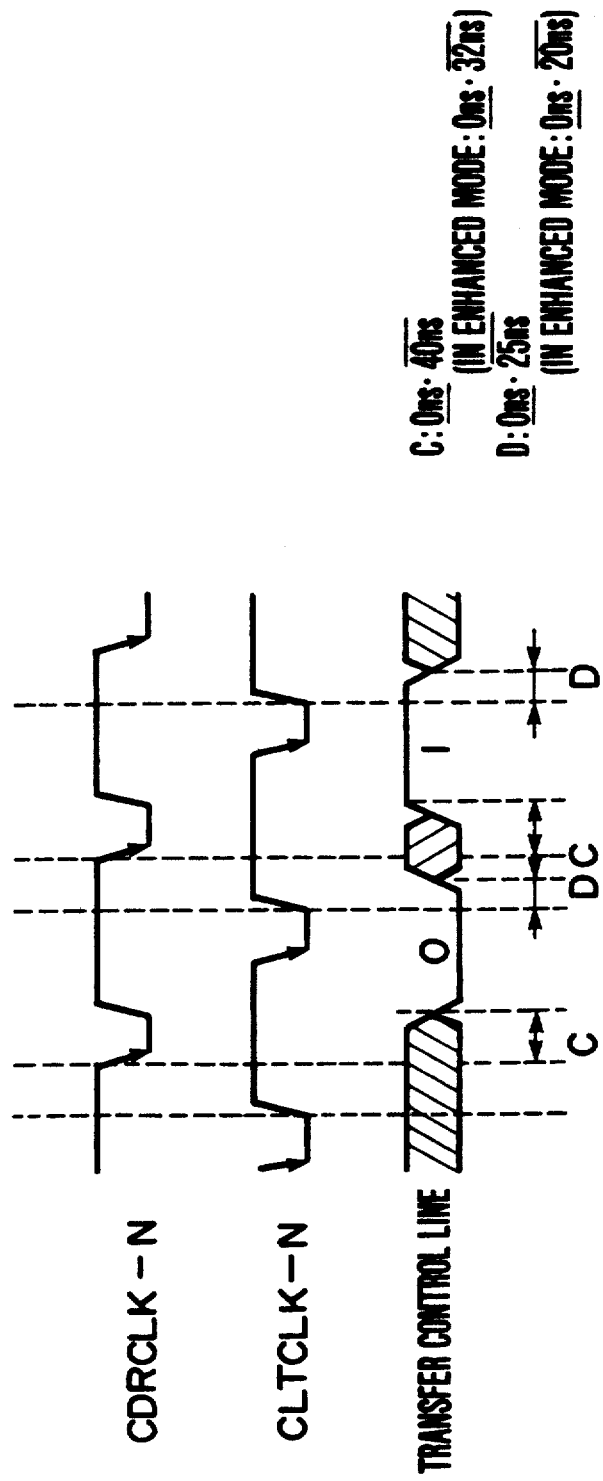

FIG.20

| CADR-N | CBUSLK-N | CMSTEN-N | CSLVEN-N | STATE DEFINITION |
|---|---|---|---|---|
| 0 | 0 | 0 | Hi-Z | ADDRESS OUTPUT (START-OF-TRANSFER CYCLE) |
|   |   | 1 | 0/1 next Hi-Z | ADDRESS MODIFICATION (END-OF-TRANSFER CYCLE 2) |
|   | 1 |   |   | MASTER ERROR (END-OF-TRANSFER CYCLE 3) |
| 1 | 0 | 0 | 0 | EXCUTION OF NON-FINAL TRANSFER (SEND/RECEIVE) CYCLE |
|   |   |   | 1 | MASTER'S WAITING FOR NON-FINAL TRANSFER CYCLE |
|   |   | 1 | 0 | SLAVE'S WAITING FOR NON-FINAL TRANSFER CYCLE |
|   |   |   | 1 | BOTH'S WAITING FOR NON-FINAL TRANSFER CYCLE |
|   | 1 | 0 | 0 | EXECUTION OF FINAL/ PSEUDO-FINAL TRANSFER CYCLE (END-OF-TRANSFER CYCLE 1) |
|   |   |   | 1 | MASTER'S WAITING FOR FINAL TRANSFER CYCLE |
|   |   | 1 | 0 | SLAVE'S WAITING FOR FINAL TRANSFER CYCLE |
|   |   |   | 1 | BOTH'S WAITING FOR FINAL TRANSFER CYCLE |

FIG. 28

| NAMES | ELECTRIC CHARACTERISTICS | | | DRIVER | RECEIVER | MEANING/ROLE |
|---|---|---|---|---|---|---|
| CBERR-N (CBERR) | CMOS /TTL | MAX. LOAD 20mA | 20mA OUT-PUT | 3-state 3.9kΩ pu 11 up | SBUSC | ALL CONNECTED DEVICE | BUS ERROR SIGNAL ISSUED BY SBUSC |

F I G. 30

| NAMES | ELECTRIC CHARACTERISTICS | | | DRIVER | RECEIVER | MEANING/ROLE |
|---|---|---|---|---|---|---|
| | CMOS /TTL | 8mA OUT-PUT | MAX. LOAD 6mA | | | |
| CBREQ(*)-N :0~ (CBREQ(*)) | | | 3-state 3.9kΩ pull up | MASTER DEVICE | SBUSC | MASTER REQUEST SIGNAL FROM CONNECTED DEVICE |
| CBACK(*)-N :0~ (CBAC(*)) | | | | SBUSC | MASTER DEVICE | MASTER ACKNOWLEDGE SIGNAL FROM SBUSC |

FIG. 36

| NAMES | ELECTRIC CHARACTERISTIC | | | DRIVER | RECEIVER | MEANING/ROLE |
|---|---|---|---|---|---|---|
| CIREQ(*)-N *:0~ | CMOS /TTL | 8mA OUTPUT | MAX. LOAD 6mA | 3-state 3.9k pu 11 up | SUPPORTING DEVICE | SBUSC | INTERRUPT REQUESTS OF INDIVIDUAL DEVICES |

FIG. 37

| # | SPECIES | NAMES | ELECTRIC CHARACTERISTICS | | | CONTENT/REMARKS |
|---|---|---|---|---|---|---|
| 1 | CLOCK LINE | CDRCLK-N | CMOS/TTL 24mA DRIVE | TOTEM POLE | MAX. CAPACITY 200pF | USE OF RIS-UP OF DRIVE CLOCK |
|   |   | CLTCLK-N |   |   |   | USE OF FALLING EDGE OF LATCH CLOCK |
| 2 | RESET LINE | CPOR-N |   |   |   | RESET OF POWER-ON |
|   |   | CMSTRST-N |   |   |   | RESET OF MASTER BY SBUSC |
| 3 | ADDRESS /DATA LINES | CAD(·,·)-P ·:0-3 ::0-7 | MAX. LOAD 20mA | THREE-STATE 3.9kΩ Pull up |   | 32-bit ADDRESS/DATA MULTIPLEX LINE $CAD(0,0)-P=2^{31}$ $CAD(3,7)-P=2^{0}$ |
|   |   | CED(·,·)-P ·:0-3 ::0-7 |   |   |   | 32-bit EXPANSION DATA LINE FOR 64-bit TRANSFER $CED(0,0)-P=2^{63}$ $CED(3,7)-P=2^{32}$ |
| 4 | BUS CONTROL LINES | CMSK(·)-N ·:0-3 |   |   |   | BYTE-BASED DATA MASK LINE DATA IS INVALID WHEN "0" |
|   |   | CEMSK(·)-N ·:0-3 |   |   |   | EXPANSION DATA MASK LINE FOR 64-bit TRANSFER. DATA IS INVALID WHEN "0" |
|   |   | COP(·)-P ·:0-3 |   |   |   | BYTE-BASED ODD PARITY LINE. ODD NUMBER OF "1s" IN 9 bits INDICATES NORMALITY |
|   |   | CEOP(·)-P ·:0-3 |   |   |   | EXPANSION ODD PARITY LINE FOR 64-bit TRANSFER. ODD NUMBER OF "1s" IN 9 bits INDICATES NORMALITY |
|   |   | CPCEN-N |   |   |   | PARITY CHECK ENABLE SIGNAL |
|   |   | CADR-N |   |   |   | DATA/ADDRESS SWITCHING SIGNAL |
|   |   | CWRITE-N |   |   |   | READ/WRITE TRANSFER SWITCHING SIGNAL |
|   |   | CBUSLK-N |   |   |   | BUS TENURE SIGNAL |
|   |   | CMSTEN-N |   |   |   | MASTER'S TRANSFER ENABLE SIGNAL |
|   |   | CSLVEN-N |   |   |   | SLAVE'S TRANSFER ENABLE SIGNAL |
|   |   | CVLWEN-N |   |   |   | 64-bit TRANSFER ENABLE SIGNAL |
|   |   | CBERR-N |   |   |   | BUS ERROR SIGNAL OUTPUTTED BY SBUSC |
| 5 | ARBITRATION CONTROL LINES | CBREQ(*)-N *:0- | CMOS/TTL 8mA DRIVE |   | MAX. CAPACITY 100pF | BUS MASTERSHIP REQUEST SIGNAL, CONNECTED TO SBUSC BY EACH DEVICE SEPARATELY |
|   |   | CBACK(*)-N *:0- |   |   |   | BUS MASTERSHIP ACKNOWLEDGE SIGNAL, CONNECTED TO SBUSC BY EACH DEVICE SEPARATELY |
| 6 | INTERRUPT CONTROL LINE | CIREQ(*)-N *:0- | MAX. LOAD 6mA |   |   | INTERRUPT REQUEST SIGNAL, CONNECTED TO SBUSC BY EACH DEVICE SEPARATELY |

FIG.38

| # | COLUMN A | | COLUMN B | | COLUMN C | |
|---|---|---|---|---|---|---|
| 1 | CPOR-N | K | GND | G | CMSTRST-N | K |
| 2 | GND | G | 12V | V | GND | G |
| 3 | GND | G | 12V | V | GND | G |
| 4 | CAD(0,1)-P | Y | GND | G | CAD(0,0)-P | Y |
| 5 | CAD(0,3)-P | Y | CMSK(0)-N | Y | CAD(0,2)-P | Y |
| 6 | CAD(0,5)-P | Y | COP(0)-P | Y | CAD(0,4)-P | Y |
| 7 | CAD(0,7)-P | Y | GND | G | CAD(0,6)-P | Y |
| 8 | 5V | V | CPCEN-N | Y | 5V | V |
| 9 | CADR-N | Y | (FOR DIAGNOSIS) | | CWRITE-N | Y |
| 10 | CBUSLK-P | Y | (FOR DIAGNOSIS) | | CMSTEN-N | Y |
| 11 | 5V | V | CSLVEN-N | Y | 5V | V |
| 12 | CAD(1,1)-P | Y | GND | G | CAD(1,0)-P | Y |
| 13 | CAD(1,3)-P | Y | CMSK(1)-N | Y | CAD(1,2)-P | Y |
| 14 | CAD(1,5)-P | Y | COP(1)-P | Y | CAD(1,4)-P | Y |
| 15 | CAD(1,7)-P | Y | GND | G | CAD(1,6)-P | Y |
| 16 | GND | G | (-5V) | V | GND | G |
| 17 | GND | G | (-5V) | V | GND | G |
| 18 | CAD(2,1)-P | Y | GND | G | CAD(2,0)-P | Y |
| 19 | CAD(2,3)-P | Y | CMSK(2)-N | V | CAD(2,2)-P | Y |
| 20 | CAD(2,5)-P | Y | COP(2)-P | V | CAD(2,4)-P | Y |
| 21 | CAD(2,7)-P | Y | GND | G | CAD(2,6)-P | Y |
| 22 | 5V | V | SLOT1-P | K | 5V | V |
| 23 | CBREQ(*)-N | Y | SLOT2-P | K | CBACK(*)-N | Y |
| 24 | CIREQ(*)-N | Y | SLOT3-P | K | CBERR-N | Y |
| 25 | 5V | V | CVLWEN-N | Y | 5V | V |
| 26 | CAD(3,1)-P | Y | GND | G | CAD(3,0)-P | Y |
| 27 | CAD(3,3)-P | Y | CMSK(3)-N | Y | CAD(3,2)-P | Y |
| 28 | CAD(3,5)-P | Y | COP(3)-P | Y | CAD(3,4)-P | Y |
| 29 | CAD(3,7)-P | Y | GND | G | CAD(3,6)-P | Y |
| 30 | GND | G | -12V | V | GND | G |
| 31 | GND | G | -12V | V | GND | G |
| 32 | CDRCLK-N | K | GND | G | CLTCLK-N | K |

FIG. 39

| # | COLUMN A | | COLUMN B | | COLUMN C | |
|---|---|---|---|---|---|---|
| 1 | (RESERVED) | | GND | G | (RESERVED) | |
| 2 | GND | G | (RESERVED) | | GND | G |
| 3 | GND | G | (RESERVED) | | GND | G |
| 4 | CED (0, 1) -P | Y | GND | G | CED (0, 0) -P | Y |
| 5 | CED (0, 3) -P | Y | CEMSK (0) -N | Y | CED (0, 2) -P | Y |
| 6 | CED (0, 5) -P | Y | CEOP (0) -P | Y | CED (0, 4) -P | Y |
| 7 | CED (0, 7) -P | Y | GND | G | CED (0, 6) -P | Y |
| 8 | 5 V | V | (RESERVED) | | 5 V | V |
| 9 | (RESERVED) | | (RESERVED) | | (RESERVED) | |
| 10 | (RESERVED) | | (RESERVED) | | (RESERVED) | |
| 11 | 5 V | V | (RESERVED) | | 5 V | V |
| 12 | CED (1, 1) -P | Y | GND | G | CED (1, 0) -P | Y |
| 13 | CED (1, 3) -P | Y | CEMSK (1) -N | Y | CED (1, 2) -P | Y |
| 14 | CED (1, 5) -P | Y | CEOP (1) -P | Y | CED (1, 4) -P | Y |
| 15 | CED (1, 7) -P | Y | GND | G | CED (1, 6) -P | Y |
| 16 | (RESERVED) | | (RESERVED) | | GND | G |
| 17 | (RESERVED) | | (RESERVED) | | GND | G |
| 18 | CED (2, 1) -P | Y | GND | G | CED (2, 0) -P | Y |
| 19 | CED (2, 3) -P | Y | CEMSK (2) -N | Y | CED (2, 2) -P | Y |
| 20 | CED (2, 5) -P | Y | CEOP (2) -P | Y | CED (2, 4) -P | Y |
| 21 | CED (2, 7) -P | Y | GND | G | CED (2, 6) -P | Y |
| 22 | 5 V | V | (RESERVED) | | 5 V | V |
| 23 | (RESERVED) | | (RESERVED) | | (RESERVED) | |
| 24 | (RESERVED) | | (RESERVED) | | (RESERVED) | |
| 25 | 5 V | V | (RESERVED) | | 5 V | V |
| 26 | CED (3, 1) -P | Y | GND | G | CED (3, 0) -P | Y |
| 27 | CED (3, 3) -P | Y | CEMSK (3) -N | Y | CED (3, 2) -P | Y |
| 28 | CED (3, 5) -P | Y | CEOP (3) -P | Y | CED (3, 4) -P | Y |
| 29 | CED (3, 7) -P | Y | GND | G | CED (3, 6) -P | Y |
| 30 | (RESERVED) | | (RESERVED) | | GND | G |
| 31 | (RESERVED) | | (RESERVED) | | GND | G |
| 32 | (RESERVED) | | GND | G | (RESERVED) | |

BUS SYSTEM FOR INFORMATION PROCESSING SYSTEM AND METHOD OF CONTROLLING THE SAME

BACKGROUND OF THE INVENTION

The present invention relates to a bus system for information processing systems such as personal computers, work stations, word processors, process controllers and the like. The invention is further concerned with a method of controlling the bus system.

There is described a variety of data transactions carried out by resorting to a combination of a single address mode, a block transfer mode and a general transfer mode in a publication entitled "IEEE Standard Backplane Bus Specification for Multiprocessor Architectures: Future bus", ANSI/IEEE Std 896.1-1987, pp. 73-119.

In conjunction with known bus systems for information processing systems as well as bus control systems such as a bus arbitration control system for deciding which of bus-connected modules should become a next bus master, i.e. should gain the control of a system bus, there are adopted a mode referred to as a single address mode in which only the data that corresponds to a single address is transferred with a single beat (i.e. per tenure), and a mode referred to as a burst transfer mode or a block transfer mode in which data is transferred consecutively to one or a plurality of addresses during a single transaction tenure, wherein the species of the modes which are to be made use of in the bus for the data transfer can be discriminatively identified with the aid of a mode line. In this connection, reference may be made to "IEEE Standard for a simple 32-Bit Backplane BUS: NuBus", ANSI/IEEE Std 1196-1987 (1988), pp. 21-62. According to the prior art technique, the right of using the bus (referred to as the bus mastership or bus ownership) once acquired through arbitration allows only one block transfer, word transfer, broadcast transfer or the like per transaction. Accordingly, when the data transfer is to be performed a number of times by changing or modifying the address arbitrarily, the bus mastership acquisition process (i.e. the process for acquiring the right of using the bus) through arbitration control must be performed a corresponding number of times.

According to the standards specified in the second mentioned publication, it is noted that the data width or length corresponding to a unit address is set to be smaller than that of the data bus. More specifically, while the data bus width is 32 bits, the unit address given by the least significant bits thereof corresponds to a data width of 8 bits, i.e. 1 byte, wherein the address space is $2^{32}$ bytes and hence $2^{30}$ words, assuming that one word is 32 bits (because $2^{32}/(32/8) = 2^{30}$). Further, when data of a width smaller than that of the data bus is to be transferred, it is required to control the data transfer by making use of the least significant bits of the address and a bus control line in addition to an address data line. In other words, in order to carry out the data transfer on an 8-bit basis or on a 16-bit basis, the control therefor requires the two least significant bits and two bus control lines.

Devices connected to the bus system having the two modes such as mentioned above must naturally be compatible with both modes, which however gives rise to problems that the control procedure as involved becomes complicated and the amount of hardware for the control circuit is correspondingly increased.

Besides, in the prior art techniques mentioned above, no consideration is paid to applications such as distribution of a large amount of data to a plurality of addresses, and there arises a problem that the bus mastership (i.e. the right of using the bus) has to be newly acquired through arbitration control every time the address is modified or changed.

Additionally, in the case of the prior art bus systems, the size of the memory space capable of being addressed is limited to $2^{32}$ bytes by the bit width of the unit data to be transferred. On the other hand, when the data of a width smaller than that of the data bus is to be transferred, both the address line multiplexed with the data line and the bus control line have to be controlled. As a consequence, for a bus-connected device capable of transferring the data having the same width as that of the data bus, the least significant bits of the address become redundant, with the result that the memory space capable or being addressed is limited to an unnecessarily reduced size, while for a bus-connected device destined for handling data of a smaller width than the data bus, control must be performed for both the address/data multiplex line and the bus control lines, presenting a problem that the control circuit configuration is inevitably very complicated.

SUMMARY OF THE INVENTION

It is an object of the present invention to provide a bus system having a structure which is capable of simplifying the control procedure as well as the control circuits for the data transaction in an information processing system. It is also contemplated with the invention to provide a control method for the bus system.

Another object of the present invention is to provide a bus control method which is capable of performing the data transfer a plurality of times by modifying the address arbitrarily during a single bus tenure (i.e. duration of a single bus mastership) to thereby make it possible to carry out distribution of a large amount of data or the like operation at a high speed. With the invention, it is also contemplated to provide a system for carrying out the method.

A further object of the present invention is to provide a bus arbitration control method in which a bus is protected from exclusive use by a single device connected thereto over an extended period. The invention is also to provide a system for carrying out the method.

It is still another object of the present invention is to provide a bus system of an address/data multiplex type which can enhance significantly the efficiency of an address space while allowing a control circuit to be realized in a simplified structure.

In view of the above and other objects which will become apparent as description proceeds, it is proposed according to the present invention that the data transfer on the bus is performed only in the burst transfer mode by adopting a structure which can transfer given amounts of data consecutively or successively all in the burst transfer mode. According to an aspect of the invention, the data transfer is carried out through handshake of a data transfer source and a data transfer destination by using a combination of a strobe signal for determining data timing and an acknowledge signal, in order to make variable the interval between the individual data transfers. According to a further aspect of the invention, such a structure is provided in which an indication that specified data is the final data to be transferred is given on the bus in the course of the burst transfer, for thereby indicating an end of transfer of an arbitrary or given amount of data in the burst transfer mode.

In conjunction with the bus arbitration control method, it is also taught by the present invention that the termination or invalidation of the bus mastership or tenure and the end of a single data transfer are defined independent of each other in the bus specifications to thereby allow the data transfer to be terminated without invalidating the bus mastership so that a plurality of data transfers (also referred to as the multiple transfers or simply as multi-transfer) can be performed during a single bus tenure by changing or modifying the address arbitrarily.

Further, the present invention teaches that in order to realize arbitration control suited for burst transfer of a given amount of data, means is provided for causing the bus controller to issue in the course of data transfer a command for stopping the burst transfer being performed instead of forcibly stopping it by using the transfer control line so that a device having a priority or privilege in acquiring the bus mastership by aborting the transfer being performed can be connected to the bus. Thus, the problem that the bus may be used exclusively by a single device connected thereto over an extended period to thereby impose limitation on the operation or other devices can be successfully solved.

In a preferred mode for carrying out the invention, the width of data corresponding to one unit address is so dimensioned as to coincide with the line number of the address/data multiplex lines. More specifically, when the line number of the address/data multiplex lines is represented by n, one unit address is dimensioned to have n bits.

In another preferred mode for carrying out the invention, a control line (referred to as the data mask line) for validating or invalidating a part of the data bus on a byte basis, for example, is provided to make it possible to transfer the data of a smaller width than that of the data bus.

In a further preferred embodiment of the invention, there is provided in addition to the address/data multiplex lines an independent address line or an address line multiplexed with another bus control line for thereby allowing the address space to be expanded.

By virtue of various aspects or features of the invention mentioned above, all the data transfers are performed in a single mode called the burst transfer mode which allows any given amount of data to be consecutively transferred. Thus, the devices connected to the bus may be of a structure compatible with only one mode, which in turn means that the amount of hardware for the data transfer control circuit can be reduced correspondingly.

In case the data transfer is performed through handshake of the transfer source and the transfer destination or sink according to the aforementioned aspect of the invention, it becomes possible to establish the transfer speed for the burst data transfer by taking account of the permissible transfer speeds of the transfer source and the transfer destination. Besides, the data transfer speed can arbitrarily be varied periodically or aperiodically in the course of the burst transfer. Thus, it is possible to realize constantly a maximum transfer speed so far as the devices connected to the bus can permit.

By making it possible to specify the final data transferred in the burst transfer mode per transaction according to the aforementioned aspect of the invention by providing, for example, a dedicated bus control line or by setting a plurality of bus control lines to the specific state, it is possible to indicate the end of the Transfer on the bus regardless of the amount of data to be transferred. By virtue of this feature, the amount of data to be transferred through a single burst transfer can arbitrarily be selected or determined.

More specifically, since the status of termination of the bus tenure (mastership or duration thereof) and the status of the end of a single data transfer are defined independent of each other, it is possible to terminate only the data transfer without ending the bus mastership or tenure to thereby allow a succeeding data transfer to be performed by modifying or redesignating the address. Thus, the device connected to the bus can perform data transfer a number of times by modifying the address correspondingly in an arbitrary manner during a period in which the bus mastership acquired once through arbitration remains valid. Owing to this feature, distribution of a large amount of data to a plurality of addresses or the like processing can be carried out with an enhanced efficiency.

Further, according to one of the preferred aspects of the invention mentioned above, the bus controller can respond to assertion of a request for the bus ownership (i.e. the right of using the bus) from a device assigned with a higher priority by issuing a data transfer stop command to the device currently taking part in the data transfer, to thereby allow the device having the higher priority to cause an interruption. Thus, the exclusive use of the bus by a single device which will restrict the use of the bus by another device can be inhibited, whereby flexible arbitration control can be realized with a high efficiency.

More specifically, by providing in association with the bus controller the means for issuing a data transfer stop command in the course of the burst transfer without disturbing or preventing the operation of the burst transfer being performed in a form of the dedicated bus control line or by setting a specific state of the signal lines for the arbitration control as mentioned above, a device having a privilege of aborting the bus transfer can be connected to the bus. Owing to this feature, an arbitration control can be performed which allows the bus-connected device having a higher priority or privilege to make interruption by aborting or stopping temporarily the burst transfer of a large amount of data being currently performed.

Besides, by adopting a method of allocating the above mentioned privilege to the individual devices connected to the bus on a time division basis, for example, an impartial or fair arbitration control can be achieved.

When the width of data corresponding to one address is set to coincide with the line number of the address/data multiplex lines as described above in conjunction with one aspect of the invention, there arises no redundant address bits for those devices which are capable of transferring data having the same width is that of the data bus to thereby make available the addressed space most efficiently. By way of example, in the case of a system bus including the address/data multiplex lines in a number n, there can be set up an address space of $2^n$ words with n bits representing one word.

By providing additionally the control line (data mask line) for validating or invalidating a part of the data bus, as mentioned previously, the width of data can be controlled by a controller of a simplified structure without need for controlling the address/data multiplex line for a bus-connected device adapted for performing the data transfer on a smaller unit basis than the width of the data bus.

Further, by providing additionally the independent address line or the address line multiplexed with another bus control line as mentioned hereinbefore, the address space can be expanded.

BRIEF DESCRIPTION OF THE DRAWINGS

FIG. 6 is a timing chart for illustrating the timing operation of the clock line;

FIG. 7 is a timing chart illustrating the operation of common synchronous signal lines;

FIG. 8 is a view showing the specification of a reset line;

FIG. 9 is a timing chart for illustrating the operation of the same;

FIG. 10 is a view showing the specification of an address/data multiplex line;

FIG. 11 is a timing chart for illustrating the operation of the same;

FIG. 12 is a view for illustrating the correspondence between signal identifiers and bit positions on the address/data line;

FIG. 13 is a view showing the specifications of data mask lines;

FIG. 15 shows specifications of a parity data line and a parity enable line;

FIG. 16 is a timing chart for illustrating the operations of the same;

FIG. 17 is a view showing the specifications of data transfer control lines;

FIG. 18 shows a timing chart for illustrating the operation of the same;

FIG. 20 is a view for illustrating date transfer cycle statuses;

FIG. 28 shows a specification of a bus error line;

FIG. 30 shows a specification of a bus arbitration control line;

FIG. 36 is a view showing the specification of an interrupt control line;

FIG. 37 is a view showing in a list various signal lines in summarization;

FIG. 38 is a view showing a list of standard connector pins;

FIG. 39 is a view showing a list of expansion connector pins;

DESCRIPTION OF THE PREFERRED EMBODIMENTS

Figure 1:
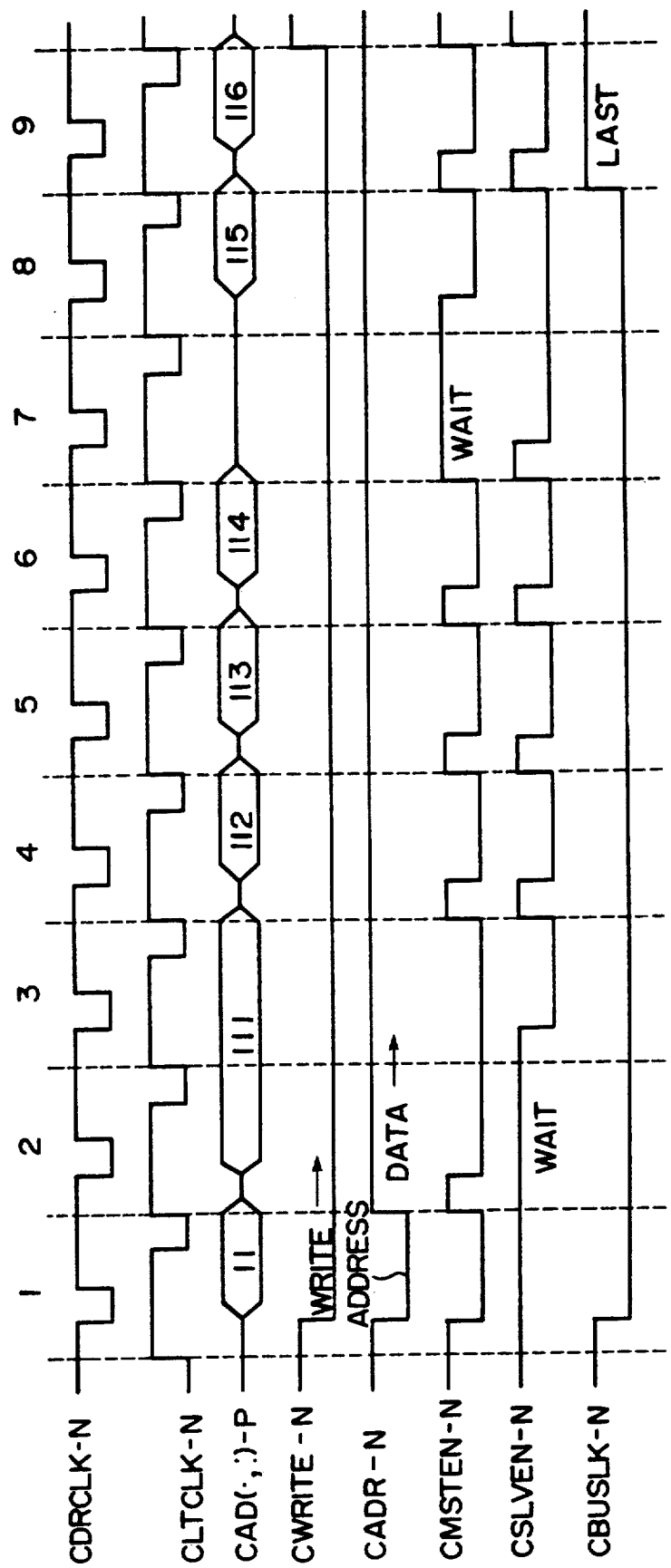
FIG. 1 is a data transfer timing chart for illustrating the principle underlying the burst transfer according to the present invention and showing an outline of the operation of a bus system according to a first exemplary embodiment of the present invention.

Now, the present invention will be described in detail in conjunction with preferred or exemplary embodiments thereof by reference to the drawings.

In the following, a description will first be made of the basic features of the bus system according to the invention, followed by a description of the concept underlying the data transfer performed only in the burst transfer mode, as well as a first exemplary embodiment of the invention, then a second exemplary embodiment as applied to a 64-bit/32-bit bus system and finally an exemplary embodiment concerning the structure of a bus controller.

Although it is assumed in the following description, unless specified otherwise, that the invention is applied to a system bus for a work station (hereinafter also referred to as a WS in abbreviation) and intended to be implemented for use with a 64-bit/32-bit work station among others, it should be understood that the invention is never limited to such application and utilization. Parenthetically, the 32-bit specification constitutes a complete subset for the 64-bit specification. With the present invention, it is also contemplated to pay consideration to the expansion capability of the bus system in the future as well as speed enhancement, while taking into account in the design the usability of devices connected directly or indirectly to the bus system after enhancement thereof.

The bus systems according to the embodiments of the invention feature among others the aspects mentioned below:

1) The bus system comprises a two-phase clock synchronous bus of 64 bits, for example.

2) In the bus system, data transfer is based on a burst transfer operation.

3) The bus is an address/data multiplex bus (a bus operating to multiplex address and data information).

4) The bus system makes available an address space of 16 G bytes (32 bits), wherein each of the addresses of 16 G bytes in total corresponds to one word.

5) The bus system supports a 64-bit/32-bit transfer, for example. Besides, it has a data mask function on a byte-by-byte basis, for example.

6) A slot for a 32-bit expansion board for the bus corresponds to a single 96-pin connector, by way of example.

Terminology used in the following description can be defined as follows:

a) "Long word (LW in abbreviation)" means a 32-bit word.

b) "Very long word (VLW) means a 64 bit word.

c) "Drive" means delivery or output of "1" or "0" to a signal line.

d) "Release" means stoppage of an output to the signal line and setting the latter to a high impedance state (Hi-Z).

e) "Generation or issuance or assert" means to make active the output to the signal line.

f) "Master" means a connected device or module having acquired the bus mastership or tenure (the right of using the bus).

g) "Slave" means a connected device or module which is addressed by the master.

h) "System bus controller (SBUSC in abbreviation )" means a bus control unit responsible for controlling the bus system.

i) "Hi-Z" represents a high-impedance state.

With the concept underlying the system bus according to the invention embodied in the illustrative embodiments thereof, it is basically contemplated as its purpose to realize a high-speed burst transfer and to make usable a so-called store and burst" scheme which is capable of coping with increase in the capacity of local memories incorporated in individual bus-connected devices or modules.

Now, the first exemplary embodiment of the invention will be described by reference to FIGS. 1 to 3. Incidentally, FIG. 4 is a chart intended to be used in common in the description of the first and second embodiments of the invention and contains representations of symbols used in various timing diagrams and the contents or meanings of the symbols.

The first embodiment is directed to a two-phase clock synchronous address/data multiplex type bus system which is not limited in respect to the bit specification. In the figures mentioned above, FIG. 1 is a view illustrating an example of timing in the data transfer performed through the bus system according to the first embodiment of the invention, FIG. 2 is a schematic circuit diagram showing, by way of example only, the structure of an information processing system in which the instant bus system is employed as a system bus, and FIG. 3 is a timing chart for illustrating arbitration operation in The bus system.

Referring to FIG. 1, symbols CDRCLK-N and CLTCLK-N represent, respectively, a drive clock signal and a latch clock signal which constitute a two-phase bus clock signal. In FIG. 1, nine cycles (1) to (9) are illustrated, by way of example. A symbol CAD(. , :)-P designates an address/data multiplex line. Five lines including a read/write control signal line CWRITE-N, an address control signal line CADR-N, a master enable control signal line CMSTEN-N, a slave enable control signal line CSLVEN-N and a bus clock signal line CBUSLK-N constitute parts of the bus control lines, respectively, and are hereinafter also referred to collectively as the transfer control line. More specifically, the signal line CWRITE-N serves as a change-over control line for switching between a read transfer and a write transfer. This signal line CWRITE-N is set to "LOW: O" for the write transfer in which the master having acquired the bus mastership or tenure (right of using the bus) upon addressing to a counterpart or destination referred to as the slave performs data transfers to the addressed slave, while the signal line CWRITE-N is set to "HIGH: 1" for the read transfer in which data is transferred from a slave to the master. The signal line CADR-N serves as a switching control signal line for the address/data multiplex line. This signal line CADR-N is set to "0" when an address is delivered onto the address/data multiplex line while it is set to "1" when data is delivered to the address/data multiplex line. The signal CMSTEN-N serves as a data transfer enable signal which is used in the handshake of the master and set to "0" when the master is in the state ready for input/output of data and when the address signal is outputted from the master, while it is set to "1" when the master is in the waiting state. The signal CSLVEN-N serves as a data transfer enable signal which is used in the handshake of the slave and set to "0" when the slave is in the state ready for data input/output while it is set to "1" when the slave is in the waiting state. The signal CBUSLK-N is a bus tenure signal indicating that the bus is being used (or busy) and is set to "1" during the period in which the last data of a burst data transfer is outputted while being set to "0" during the remaining bus tenure period. There may be employed other types of bus control lines, as will be described later on in conjunction with other embodiments of the invention.

In the case of the example illustrated in FIG. 1, it is assumed that the data to be transferred is of six words. Now, description will be turned to the transfer operation. At first, in the cycle (1), a master, i.e. a bus-connected device which has acquired the bus mastership or tenure through a process which will be described later on outputs an address 11 designating a slave on the signal line CAD(. , :)-P. At this time point, the master outputs "0" onto the signal lines CADR-N, CMSTEN-N and CBUSKL-N, respectively. Further, the master sets the signal line CWRITE-N to "0", indicating the transfer of data to be written (WRITE transfer). In the cycle (2), the master outputs first data 111 for transfer on the line CAD(. , :)-P while setting simultaneously the Line CMSTEN-N to "0", indicating that the master is in the state capable of performing data input/output operation. On the other hand, the slave designated by the address signal 11 sets the line CSLVEN-N to "1" in the cycle (2), indicating that the slave is in the waiting state, while in the cycle (3), the slave sets the line CSLVEN-N to "0", which indicates that the slave is now in the state capable of data input/output operation. In the case of the bus system according to the embodiment of the invention now under consideration, it is assumed that the data is transferred when both the lines CMSTEN-N and CSLVEN-N are set to "0". Accordingly, in the cycle (3), the data 111 is transferred from the master to the slave.

In the cycle (4), (5) and (6), data 112, 113 and 114 are successively transferred, similarly to the cycle (3). In the cycle (7), the master sets the line CMSTEN-N to "1", indicating that the master is now in the waiting state (WAIT). In the cycle (8), data 115 is transferred. In the cycle (9), the line CBUSLK-F is set to "1" simultaneously with the transfer of data 116, to thereby indicate that the data 116 is the last or final one to be transferred. Thus, it can be seen that the burst transfer comes to an end at the cycle (9). In this manner, the instant embodiment of the invention is structured such that the data to be last transferred in the burst transfer mode is specified. To this end, the dedicated bus control line CBUSLK-N is used.

As will be apparent from the above description, in the case of the example illustrated in FIG. 1, the data of six words 111 to 116 is transferred in the burst transfer mode. In that case, each word of the data is transferred through the handshaking of the bus control lines CMSTEN-N and CSLVEN-N, wherein the waiting state (WAIT) intervenes periodically or aperiodically, as can be seen in the cycle (2) or (7), which thus allows the data transfer speed to be changed periodically or aperiodically in compliance with the state or situation of the master or that of the slave. Additionally, since the final or last data to be transferred can be indicated on the bus by the signal line CBUSLK-N, as is shown in the cycle (9) by "LAST", the data to be transferred through the burst transfer can be of an arbitrary amount. In this way, with the bus control system according to the instant embodiment of the invention, even the data transfer of a single word can be realized. In other words, it is possible with the inventive bus control to perform all the data transfers in the form of a burst transfer.

Figure 2:
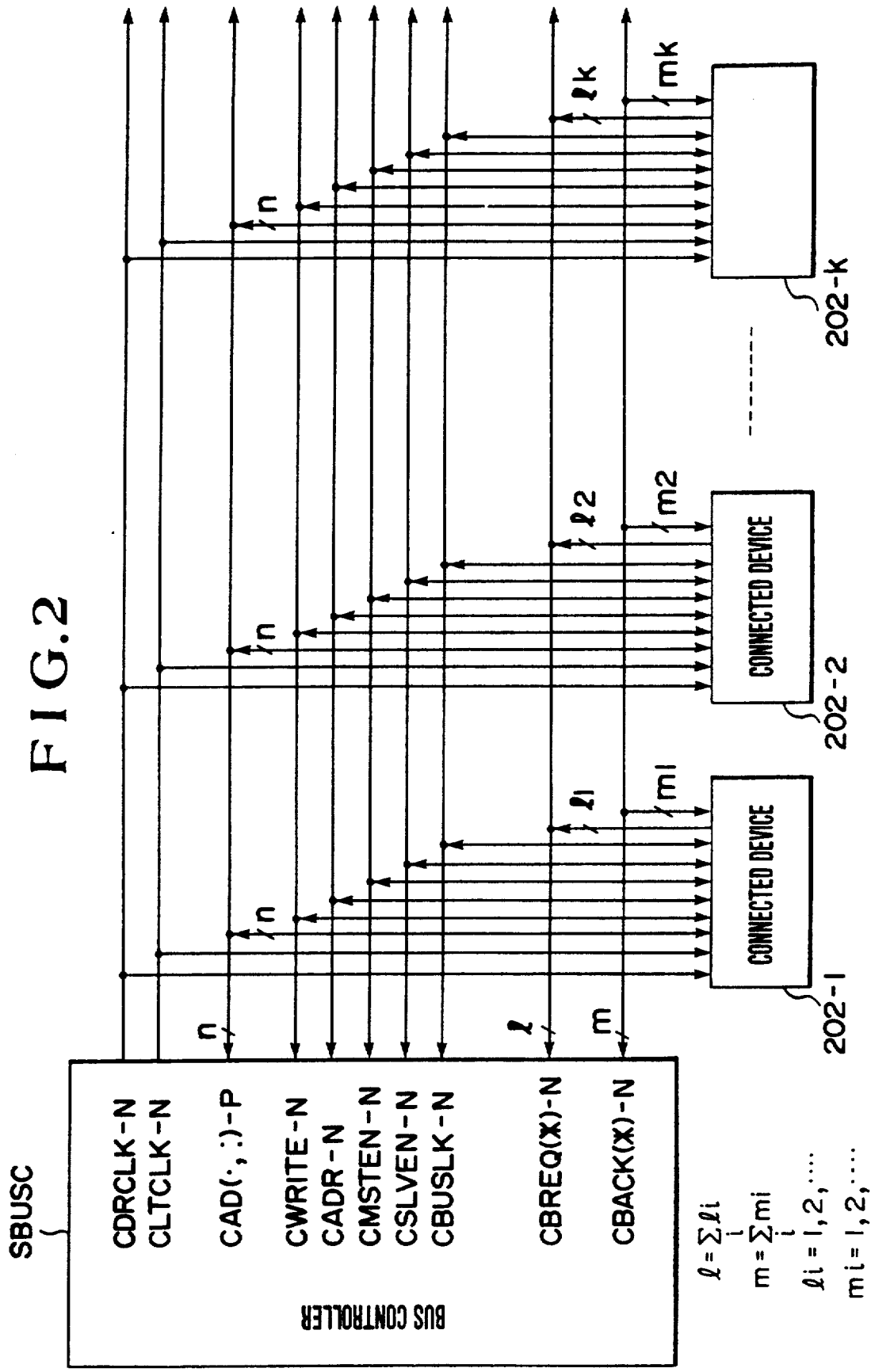
FIG. 2 is a schematic circuit diagram of an information processing system incorporating a bus system according to an embodiment of the invention.

FIG. 2 shows a system block structure of an information processing apparatus in which the bus system according to the instant embodiment of the invention is adopted. Referring to this figure, a reference symbol SBUSC denotes a bus control part called the system bus controller, and numeral 202 denotes a single or a plurality of bus-connected devices. As examples of the bus-connected devices 202-1 to 202-k, there may be mentioned those devices which can be connected to the bus system for implementing an information processing system such as, for example, a CPU interface, input-/output (I/O) interfaces, a memory control circuit, a dedicated processor such as graphic processor and so forth. Further, in FIG. 2, symbols CDRCLK-N, CLTCLK-N, CAD(. , :)-P, CWRITE-N, CADR-N, CMSTEN-N, CSLVEN-N and CBUSLK-N denotes the signal lines and the control lines over which the signals described hereinbefore by reference to FIG. 1 are carried. Bus request signal lines CBREQ(*)-N in a number 0 and bus acknowledge signal lines CBACK(*)-N in a number m represent the control lines for the bus arbitration, as will be described later on. Incidentally, it should be understood that the same abridged notations are used for representing both the signals themselves and the corresponding signal/control lines, for convenience of description. Turning back to FIG. 2, each of the connected devices 202-1 to 202-k couples a single or plural bus request signals CBREQ(*)-N and the bus acknowledge signal CBACK(*)-N to the system bus controller SBUSC. In other words, a centralized control is adopted, wherein $$l = l_1 + l_2 + \ldots + l_k \text{ and } m = m_1 + m_2 + \ldots + m_k.$$

Additionally, in the system in which the bus according to the invention is employed, a so-called distributed control scheme may be adopted in which all the connected devices share the arbitration control line in common to one another and the functions of the system bus controller are distributively allocated to the individual devices.

Next, the arbitration control according to the instant embodiment will be described by taking as an example arbitration between the bus-connected device 202-1 and 202-2 and by referring to a timing chart shown in FIG. 3.

Figure 3:
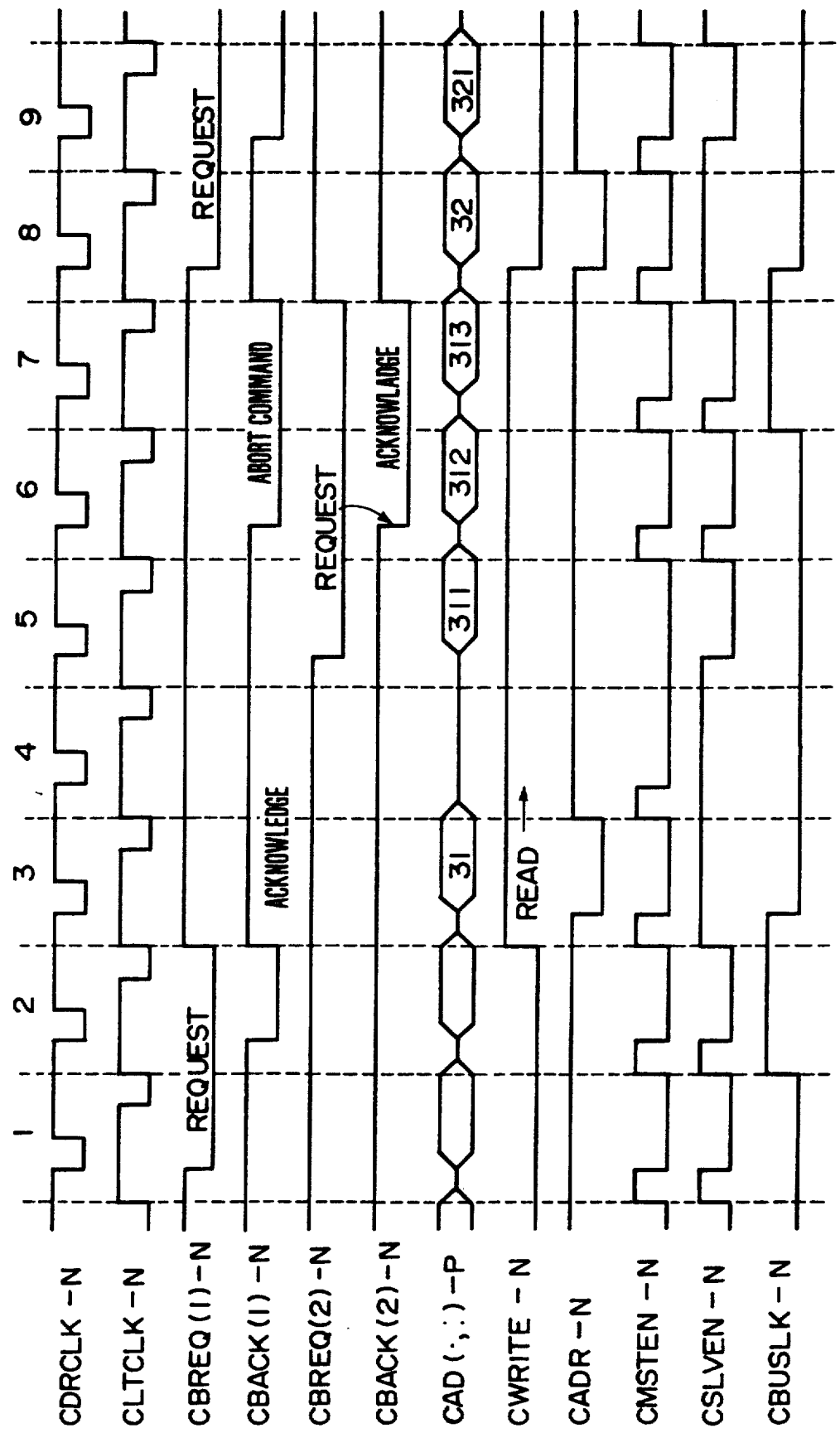
FIG. 3 is a timing chart for illustrating an outline of the bus arbitration control according to an embodiment of the invention.
Figures 4, 5:
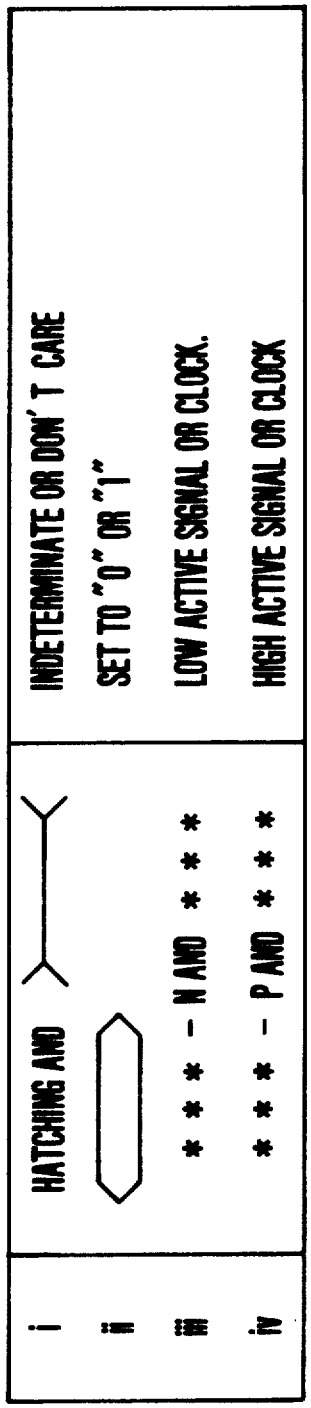
FIG. 4 is a view for explaining examples of symbols or representations used in various timing charts.
FIG. 5 is a view showing the specification of clock lines employed in the bus system according to the first embodiment of the invention.

In FIG. 3, CBREQ(1)-N and CBREQ(2)-N represent master request lines connected between the bus-connected devices 202-1 and 202-2 and the system bus controller SBUSC, respectively. The master request lines are set to "0" when the bus-connected assert a request for )us mastership or tenure the right of using the bus) and are set to "1" when they have acquired the bus mastership or the right of using the bus. Reference symbols CBACK(1)-N and CBACK(2)-N represent master acknowledge lines connected between the bus-connected devices 202-1 and 202-2 and the system bus controller SBUSC. The master acknowledge lines are set to "0", when the system bus controller SBUSC is going to give the bus mastership to the connected devices 202 or when the system bus controller requests the stoppage of the burst transfer. On the other hand, the master acknowledge lines are set to "1" when the bus mastership has been given to the connected devices 202 or when the burst transfer has been stopped. These functions of the master acknowledge line are equivalent to the functions of the conventional master acknowledge line to which is added the function of commanding the stoppage of the burst transfer.

In the case of the example illustrated in FIG. 3, it is assumed that the bus mastership or the right of using the bus has been given to one of the bus-connected devices 202 provided that all the signals CBACK(*)-N, CMSTEN-V and CSLVEN-N are "0" and that the signal CBUSLK-N is "1". Besides, it is also assumed that the bus-connected device 202-2 is assigned with a privilege of acquiring the mastership by stopping or aborting the burst transfer to the other device 202-1. Now, the bus arbitration control operation will be explained by reference to FIG. 3.

In the cycle (1), the sub-connected device 202-1 is requesting the bus mastership or tenure by setting the bus request signal CBREQ(1)-N to "0". On the other hand, the system bus controller SBUSC sets the bus acknowledge signal CBACK(1)-N to "0" in the cycle (2) in order to give the mastership to the device 202-1 through arbitration. Simultaneously, in the cycle (2), the signals CMSFEN-N and CSLVEN-N are both "Os" with CBUSLK-N being "1", as a result of which the bus mastership right is given to the device 202-1. The device 202-1 having thus acquired the bus mastership or tenure starts the data transfer from the cycle (3).

In this case, the data transfer is assumed to be the read transfer from an address 31 designated in the cycle (3). More specifically, three data words 311, 312 and 313 are transferred from the master to the slave during the cycles (5), (6) and (7), respectively.

In the cycle (5) in the course of the burst transfer, the bus-connected device 202-2 issues a request for the bus mastership (the right of using the bus) by setting the bus request signal line CBREQ(2)-N to "0". Through the arbitration performed by the system bus controller SBUSC, the bus acknowledge signal CBACK(2)-N is set to "0" in the cycle (6) for giving the bus mastership to the connected device 202-2 because it has the privilege or priority over the device 202-1, as mentioned above. At the same time, the system bus controller SBUSC asserts the burst transfer stop command by setting the signal line CBACK(1)-N to "0" in the cycle (6) because of the priority or the device 202-2 over the device 202-1. As a consequence, the device 202-1 responds to the burst transfer stop command by setting the signal CBUSLK-N to "1" in the cycle (7) to thereby make the data 313 to be the final data in the current burst transfer.

In this manner, the burst transfer of the device 202-1 is terminated at the cycle (7). Simultaneously, the device 202-2 is assigned with the bus mastership or tenure in the cycle (7) because the signal CMSTEN-N and CSLVEN-N are both set to "0" with the signal CBUSLK-N being set to "1". Thus, the device 202-2 starts the data transaction from the cycle (8) by outputting an address 32. On the other hand, the device 202-1 whose data transfer has been stopped issues again a request for the bus mastership by setting the signal CBREQ(1)-N to "0" in cycle (8) in an effort to regain the data transfer, in this way, in the case of the example illustrated in FIG. 3, the burst transfer is executed without exerting any adverse influence to the data transfer operation at all. In other words, a very flexible bus arbitration can be realized such that a data transfer of emergency is allowed to interrupt the burst transfer which is being executed for transferring a large amount of data. In the foregoing, the principle underlying the burst transfer according to the present invention has been elucidated in conjunction with the first embodiment of the invention.

Next, a second embodiment of the present invention will be described in detail by reference to FIGS. 5 to 43. In the first place, the basic specifications of the bus system according to the second embodiment will be set forth below.

1) The bus according to the instant (second) embodiment is an address/data multiplex type bus system having a data width (length) of 32/64 bits and an expansion slot with one or two 96-pin connectors.

2) The bus system is a two-phase clock synchronous bus having a bus cycle of 100 ns and is capable of performing a burst transfer at 80 MB/second at maximum for 64-bit data. Further, the instant bus system having a transfer cycle based on a burst transfer handles a non-burst transfer as a burst transfer of a single word (32 bits or 64 bits) for thereby eliminating a distinction between a burst transfer and a non-burst transfer so that the bus system can equally support both types of the data transfers of 32 bits/64 bits.

3) The bus system has a common signal line which is driven at 24 mA or more.

4) For the purpose of arbitration and interrupt control, the instant bus system adopts a centralized control by using a system bus controller (SBUSC). 5) The bus system according to the instant embodiment is designed to support only 32-bit/64-bit transfers. However, a misaligned transfer on a byte basis can be performed by using the data mask lines provided on a byte basis. The bus system has a data width of 64 bits in its specification. Thus, the 32-bit transfer is accompanied with swapping when viewed from a 64-bit device. More specifically, since the 12-bit specification constitutes a complete subset of the 64-bit specification, the 32-bit transfer is accompanied with the swapping when viewed from a 64-bit device.

6) The bus system according to the instant embodiment is implemented in the enhancement specification in order to pay consideration to a high-speed operation up to the clock cycle of 80 ns.

Now, the specifications of the bus system according to the second embodiment of the invention will be explained in more detail. In the first place, the bus system according to the instant (second) embodiment is designed to support a 32-bit/64-bit transfer. For convenience of elucidation, the detailed specifications of the individual signal lines of the bus system will be described one by one. Parenthetically, the representations appearing in the timing charts referred to in the following description have the contents or meanings illustrated in FIG. 4. The structure of the information processing system in which the bus system of the second embodiment is employed is basically identical with that of the system shown in FIG. 2. In conjunction with the instant bus system, it should however be mentioned that the signal lines provided between the system bus controller SBUSC and the individual bus-connected devices include in addition to those shown in FIG. 2, a reset line, an interrupt control line and other bus control lines, as will be described hereinafter. These additional signal lines are connected in substantially the same configuration as the bus control lines shown in FIG. 2.

Clock Line

FIG. 5 shows the specification of the clock line employed in the bus system according to the second embodiment of the invention, and FIG. 6 is a timing chart for illustrating the clock timing on the clock line. The bus system according to this embodiment is a synchronous bus having a bus cycle of 100 ns, and two phases of synchronizing clock signals CDRCLK-N and CLTCLK-N are employed as in the case of the bus system according to the first embodiment of the invention.

Referring to FIG. 6, the rise-up edge of the clock signal CDRCLK-N is defined as a drive edge. The falling edge of the clock signal CLTCLK-N is defined as E latch edge. The rise-up edge of the clock CLTCLK-N is defined as a release timing. The bus cycle is defined by the release timing.

Common Synchronous Signal Lines

FIG. 7 is a timing chart illustrating a common synchronous signal in relation to the clock signals. With the common synchronous signals, it is intended to mean or encompass all the signals on the address/data lines (CAD(. , :)-P shown in FIG. 1 et al.) which will be described in detail by reference to FIG. 10, the data mask lines shown in FIG. 13, a parity line and a parity enable line shown in FIG. 15, a transfer control line (corresponding to the five bus control lines described by reference to FIG. 1) shown in FIG. 17, a bus error line shown in FIG. 26 and an arbitration control line shown in FIG. 28.

As can be seen in FIG. 7, all the common synchronous signals are driven in response to the drive edge and released at the release timing in the bus system according to the instant embodiment. A permissible delay C involved in the driving may be 0 ns at minimum and 40 ns at maximum, while a permissible delay D involved in the releasing may be 0 ns at minimum and 25 ns at maximum. Accordingly, the common synchronous signal, if delivered, is fixed or set up during a period from 10 ns before the latch edge to 25 ns after the latch edge.

When common synchronous signals of the same value are to be outputted or delivered successively over more than one cycle, the drive and release may be effectuated every cycle or the common synchronous signal may be delivered successively over a plurality of cycles. It should be noted that the numerical values mentioned herein in conjunction with the timing are only for the purpose of illustration. It should be added that all the numerical values concerning the timing will be multiplied with a factor of 0.8 in the enhancement specifications.

Reset Line

FIG. 8 shows specification of the reset line of the bus system according to the second embodiment of the invention and FIG. 9 is a timing chart for illustrating the operation thereof. The instant system bus includes two types of reset lines CPOR-N and CMSTRST-N. The reset signals are asynchronous, as can be seen in FIG. 9. In the bus system, only the reset signals and the interrupt signal are asynchronous. When the reset signals are issued, all the signals but the clock on the bus are released.

Address/Data Line

FIG. 10 shows specifications of the address/data line in the bus system according to the second embodiment and FIG. 11 is a timing chart illustrating operation thereof. As in the case of the first embodiment of the invention, the instant bus system includes an address/data multiplex line CAD( . , :)-P of 32 bits and an expansion data line CED( . , :)-P of 32 bits for the data transfer of 64 bits, as is shown in FIG. 10, wherein correspondence is found between the bytes 0 to 3 and the bits 0 to 7 at ". : 0-3" and ": : 0-7", respectively. It can further be seen from the timing chart of FIG. 11 that the expansion data line CED( . , :)-P is invalidated during the address output beat. In the instant bus system, the address signal is not delivered consecutively over a plurality of cycles. As can be seen in FIG. 12, the signal identifiers are so established that the numerical value "0" is located at the most significant side. FIG. 12 is a view illustrating the correspondence between the signal identifiers and the bit positions on the address/data line CAD( . , :)-P and the expansion data line CED( . , :)-P.

In the case of the instant bus system, the address is given in terms of LW address (32 bits/address), wherein $2^0$ bit is the basic unit for the LW address (32 bits). Accordingly, the address space on the instant bus system has a size of 16 G bytes (equivalent to 4 G long words). In the case of the 32-bit transfer, the least significant address bit ($2^0$ bit) is constantly "0" on the address/data line CAD( . , :)-P and "1" on the expansion data line CED( . , :)-P. In the case of the 64-bit transfer, the least significant address bit ($2^0$ : CAD(3, 7)-P) always assumes "0".

The instant bus system is designed to support only the 32-bit/64-bit transfer. However, in order to be able to support the misaligned transfer on a byte basis, there are provided data mask lines corresponding to the bytes 0 to 3 (FIG. 12), respectively. Further provided an option are parity data lines on the byte basis which correspond to the bytes 0 to 3, respectively. For more particulars in this respect, description will be made later on by reference to FIGS. 13 and 15.

In the instant bus system, all the data transfers are performed in the burst transfer mode. Accordingly, every time the data is transferred, the address is automatically incremented by one LW (in the 32-bit transfer) or by two LWs (in the 64-bit transfer). (It should be understood that the address incrementing does not involve a modification of the address.) In the instant bus system, 32-bit devices and 64-bit devices can be connected in an arbitrarily mixed manner. Accordingly, as a principle, the expansion data line CED( . , :)-P for the devices of 64 bits is invalidated in the 32-bit transfer mode, which thus appears as being accompanied with the swapping for the devices of 64 bits.

Bus Control Lines

By referring to FIGS. 13 to 17, description will be made of the data transfer operations controlled through the data mask line, the parity data line and parity enable line and the transfer control line constituting the common synchronous signal lines of the bus control lines.

Data Mask Line

Figure 14:
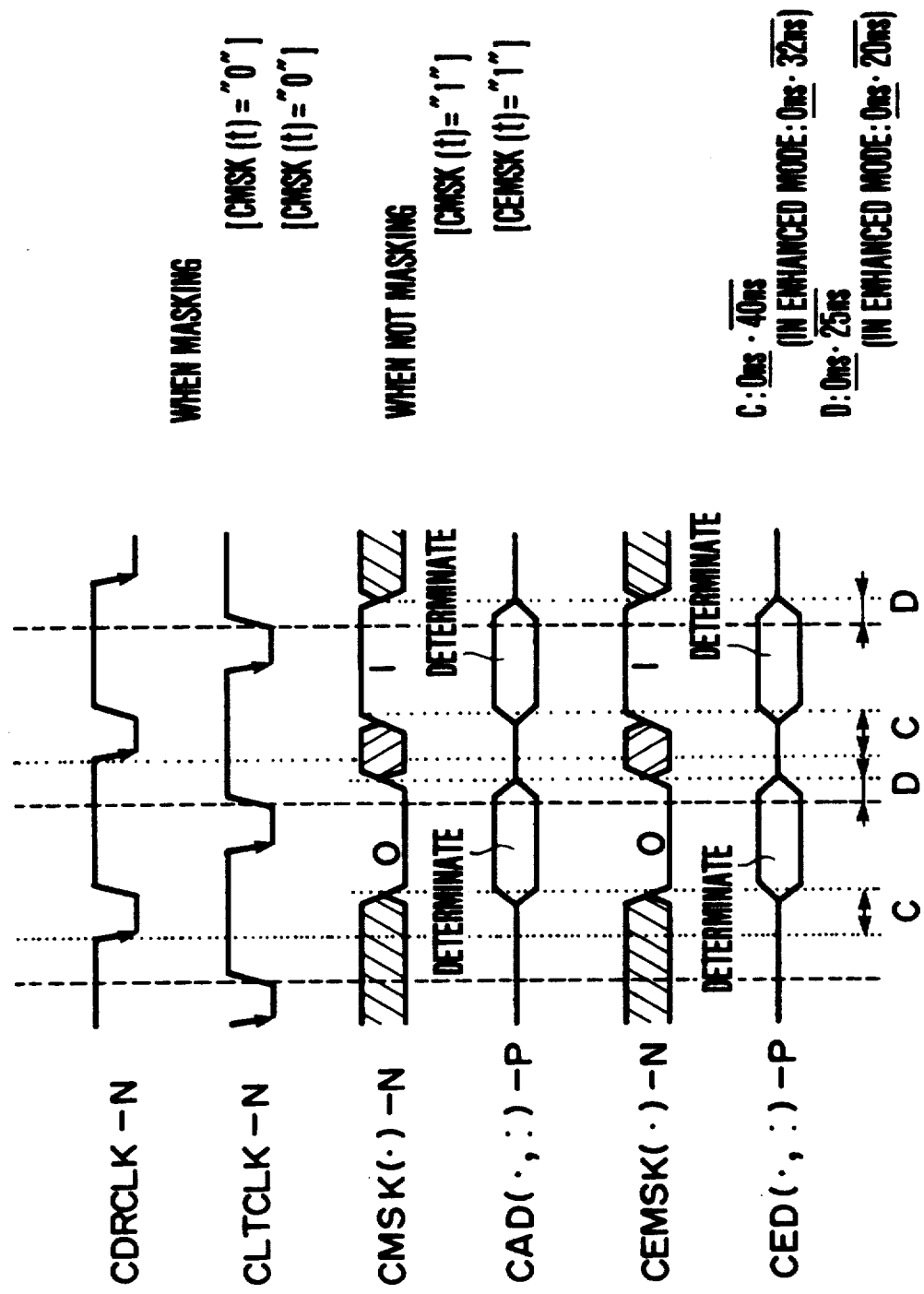
FIG. 14 is a timing chart for illustrating the operation of the same.

FIG. 13 shows the specification of the data mask lines and FIG. 14 is a timing chart for illustrating the operation of the same. In order to support a misaligned data transfer, each of the data mask lines of the instant bus system which correspond to the bytes 0 to 3 of the 32-bit/64-bit data includes a mask signal line CMSK(.)-N and an expansion mask signal line CEMSK(.)-N (where ". : 0-3" corresponds to the bytes 0-3, respectively), as can be seen in FIG. 13. Operation timing of these mask lines is illustrated in FIG. 14. The master having the mastership or the right of using the bus must deliver either "1" indicating validity or "0" indicating invalidity for each data byte in all the cycles during which the data transfer takes place. The expansion mask signal line CEMSK(-)-N is invalidated in the case of the 32-bit transfer operation.

For the invalid data bytes (for which CMSK(-)-N = "0" and CEMSK(.)-N = "0"), the system bus 5 controller SBUSC does not perform a parity check even when the parity is valid.

With the aid of the data mask signal, the data transfer can be realized on a byte (8-bit) basis or on a word (16-bit) basis, i.e. by 8 bits, 16 bits or 24 bits. In this case, however, the data transfer is not accompanied with a data swapping. Consequently, data alignment must be performed in each of the connected devices. Further, since the bus address is based on the LW address (32 bits/address) in the instant bus system, neither the address of a byte (8 bits) nor that of a word (16 bits) is delivered on the bus.

Parity Data Line and Parity Enable Line

FIG. 15 shows the specification of the parity data line and the parity enable line, and FIG. 16 is a timing chart for illustrating operations performed via these lines. In the instant bus system, there are provided odd parity data lines COP(.)-P and CEOP(.)-P for the bytes of the address/data and the expanded data, respectively, as well as a parity enable line CPCEN-N. The signal timing of these lines is as shown in FIG. 16. In the bus system according to the instant embodiment, the parity is optional. Those of the connected devices which support the parity set up the signals CAD( . , :)-P together with CED(. , :)-P together with COP(.)-P and CEOP(.)-P to deliver "0" on the parity enable line CPCEN-N. On the other hand, those of the connected devices which do not support the parity deliver "1" on the parity enable line CPCEN-N upon outputting of CAD(. , :)-P and CED(. , :)-P. In other words, even the devices which do not support the parity also outputs "1" on the CPCEN-N.

In the bus system according to the instant embodiment of the invention, only the system bus controller performs a parity check. More specifically, the system bus controller SBUSC performs a check for the parity when it is valid upon execution of a data transfer (i.e. data send/receive) and address delivery. Upon occurrence of parity error, a bus error is issued in the immediately succeeding cycle. For more particulars in this concern, description will be made later on by reference to FIGS. 28 and 29. For the bytes of which data is invalid (i.e. when CMSK(.)-N="0" and CEMSK(.)-N="0"), the bus controller performs no parity check even when the parity is valid.

Transfer Control Line

Referring to FIGS. 17 to 27, the data transfer control according to the instant embodiment of the invention will be described.

FIG. 17 shows the specifications of the data transfer control lines, and FIG. 18 shows a timing chart for illustrating operation of the same. The instant bus system includes six data transfer control lines labeled CADR-N, CWRITE-N, CBUSLK-N, CMSTEN-N, CSLVEN-N and CVLWEN-N. All the signal lines but CVLWEN-N are identical with the five bus control lines shown in FIG. 1. The transfer control line CULWEN-N is required in the case of the instant bus system because of the 32-bit/64-bit data structure. The operation timing is as illustrated in FIG. 18. In the following, description will be made concerning the meanings and rolls of the individual signals, definitions used in the data transfer, procedure of the transfer and the timing without daring to evade repetition of the description made in some respects of the first embodiment of the invention.

In the bus system according to the instant embodiment of the invention, the master controls the data transfer by using the transfer control lines CADR-N, CWRITE-N, CBUSLK-N, CMSTEN-N and CVLWEN-N. On the other hand, the slave addressed by the master performs data transfer control by using the lines CSLVEN-N and CVLWEN-N.

a) The line or signal CADR-N is an address/data switching signal which assumes the level "0" for the address beat and "1" for the data beat. This signal is used also for address modification and upon occurrence of a master error which will be explained later on.

b) The line or signal CWRITE-N is the read/write switching signal which assumes the level "1" for the read transfer while assuming "0" for the write transfer.

c) The line or signal CBUSLK-N is a bus tenure signal. In the instant bus system, because the amount of data which can be transferred through a single data transaction is not limited and besides since the data can be transferred consecutively to a plurality of different addresses during the single bus tenure (i.e. duration of a single bus mastership), the master can continuously assert the bus tenure with this signal. The master sets the signal CBUSLK-N to "0" immediately after having acquired the bus mastership unit immediately before the final data transfer (send/receive), while setting the signal to "1" at the final data transfer beat and upon occurrence of a master error.

d) The signals CMSTEN-N and CSLVEN-N represent the data transfer enable signals for the master and the slave, respectively. The master and the slave set these signals to "0" when they are in the state capable of performing the data transfer (send/receive) while setting the signals to "1" when a wait is forced. Thus, when both of these signals are "0", data transfer (send/receive) is permitted. Besides, the signal CMSTEN-N is also used for coping with a master error and address modification, as will be made more clear later on.

e) The signal CVLWEN-N is a 64-bit transfer enable signal. The master sets this enable signal to "0" during the address beat (cycle) when it requests a 64-bit transfer while setting the signal to "1" when it requests a 32-bit transfer. On the other hand, the slave sets this enable signal to "0" during a period immediately after the address beat or cycle to the end of the data transfer when the 64-bit transfer is permissible, while setting the signal to "1" when the 64-bit transfer is not permitted or when the 32-bit transfer is requested.

In the instant bus system, a single event of the data transaction is defined to begin with the address output beat or cycle to terminate with the data transfer end beat or cycle. The address output cycle is that in which the master having the bus mastership (the right of using the bus) delivers an address and is defined by (CADR-N="0" and CBUSLK-N="0" and CMSTEN-N "0"). All devices connected to the bus system according to the instant embodiment latch and decode the address during this address cycle, whereby the device to be the slave is designated in this cycle. On the other hand, the transfer end cycle is that at which the single event of data transfer or transaction is completed. There are four species of the transfer end cycles as mentioned below. When any of them takes place, the slave releases the bus immediately to prepare for the succeeding address output cycle.

① Execution of final data transfer defined by: CADR-N="1" and CBUSLK-N="1" and CMSTEN-N="0" and CSLVEN-N="0".

② Modification of address (multi-transfer described hereinafter) defined by: CADR-N="0" and CBUSLK-N="0" and CMSTEN-N="1".

③ Master error defined by: CADR-N="0" and CBUSLK-N="1" and CMSTEN-N="1".

④ Bus error defined by CBERR-N="0".

In the instant bus system according to the second embodiment of the invention, the master may hold the bus tenure and perform successively a data transfer a number of times by modifying the address. This is what is referred to as multi-transfer. The input/output of each data word performed in the course of the data transaction is referred to as the data transfer or data send/receive. A single event of transaction begins with the address output and ends with one of the four type transfer end cycles mentioned above after the transfer has been performed a given number of times.

Since the data transfer over the bus according to the instant embodiment is performed in the burst transfer mode in all cases, the address will normally be incremented by one automatically upon completed execution of the transfer of one LW. (Incrementing of the address is not same as address modification.) It may be said that the transfer end cycle is that in which the succeeding transfer is canceled. Four different operations executable in the transfer end cycle are mentioned below.

①  Execution of final transfer (send/receive)

The master delivers "1" onto the line CBUSLK-N in order to indicate that the data transfer of concern is the final one during its tenure period. This transfer is referred to as the final transfer (send/receive). When the final transfer has been executed (i.e. when CMSTEN-N = "0" and CSLVEN-N = "0"), the right of using the bus or the bus mastership assigned to the device serving as the master is terminated simultaneously with the final transfer (send/receive), whereupon both the master and the slave participating in the transaction release the bus.

② Address modification (multi-transfer):

To perform a multi-transfer, the master has to terminate the transfer being performed currently before it can start the succeeding transfer (by outputting a relevant address). What is referred to as address modification is the termination of the data transfer while asserting the bus tenure. The address modification is indicated by (CADR-N = "0" and CMSTEN-N = "1"). Upon occurrence of this address modification cycle, the slave releases the bus and prepares for an address to be outputted subsequently.

③ Master error:

This is the case in which the master terminates the transfer and releases the bus tenure for its own reason. This is indicated by (CADR-N = "0" and CBUSLK-N = "1" and CMSTEN-N = "1"). When this cycle occurs, both the master and the slave release the bus.

④ Bus error:

This error occurs when the bus controller SBUSC delivers "0" to the line CBERR-N. At this time, both the master and slave release the bus unconditionally.

Figure 19:
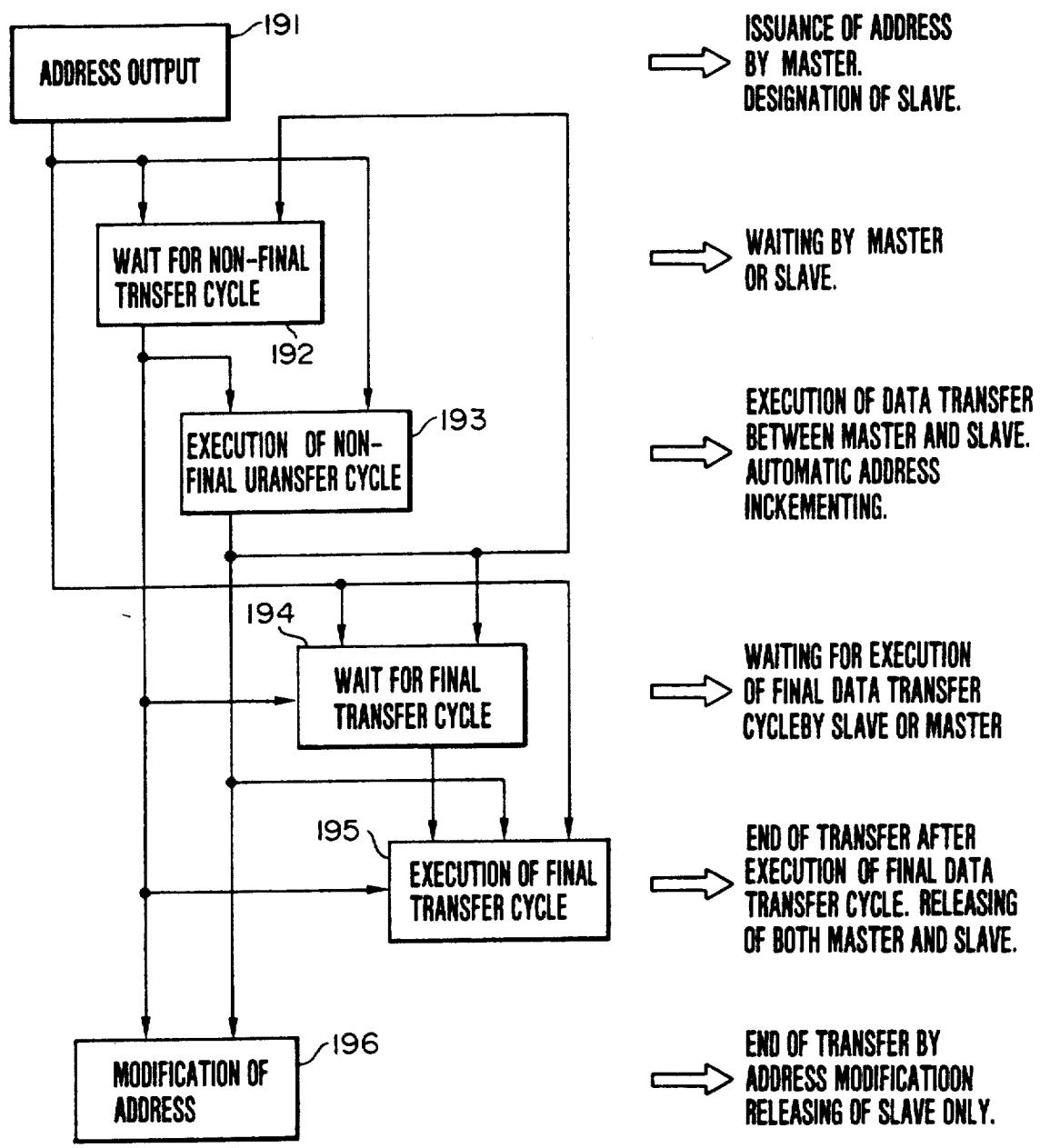
FIG. 19 is a diagram for illustrating a data transfer procedure.
Figure 21:
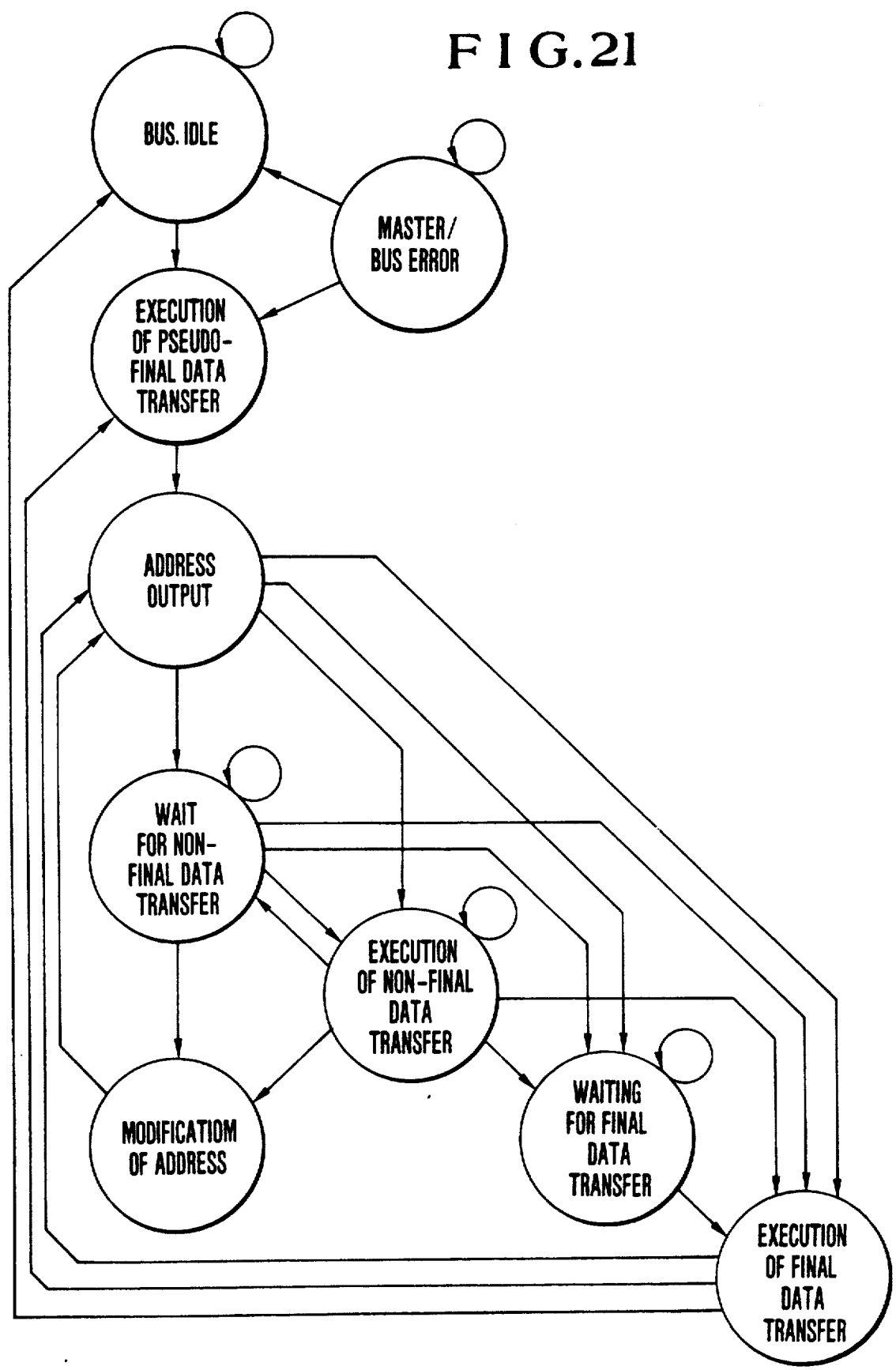
FIG. 21 is a diagram showing cycle status transitions.

Now, referring to FIGS. 19 to 27, description will be made in detail of the data transfer procedure over the bus system according to the second embodiment of the invention as well as the operation timing thereof. FIG. 19 is a diagram for illustrating the data transfer procedure. Referring to the figure, so long as neither a master error nor a bus error occurs, a single transaction event may begin with the address output beat 191. After the data transfer has been performed a given number of times (while passing through a non-final transaction wait status 192, non-final transaction execute status 193, final transfer wait status and others), the current transaction is terminated in response to the occurrence of the final transfer execution 195 or address modification 196. FIG. 20 is a view for illustrating the data transfer cycles in the bus system according to the instant embodiment of the invention. As can be seen in this figure, there may be generated eleven data transfer cycle states in total by the signal lines CADR-N, CBUSLK-N, CMSTEN-N and CSLVEN-N. Of the eleven data transfer cycle states one of the three states of the final/pseudo-final transfer (send/receive) execution, the address modification and the master error takes place in the transfer end cycle. The pseudo-final transfer execution will be described in more detail later on. The bus error may take place in any cycle. FIG. 21 is a diagram showing the cycle state transitions corresponding to the above description. The data transfer cycles in the bus according to the instant embodiment of the invention follows one of the cycle state transitions illustrated in FIG. 21, provided no error makes appearance.

Figure 22:
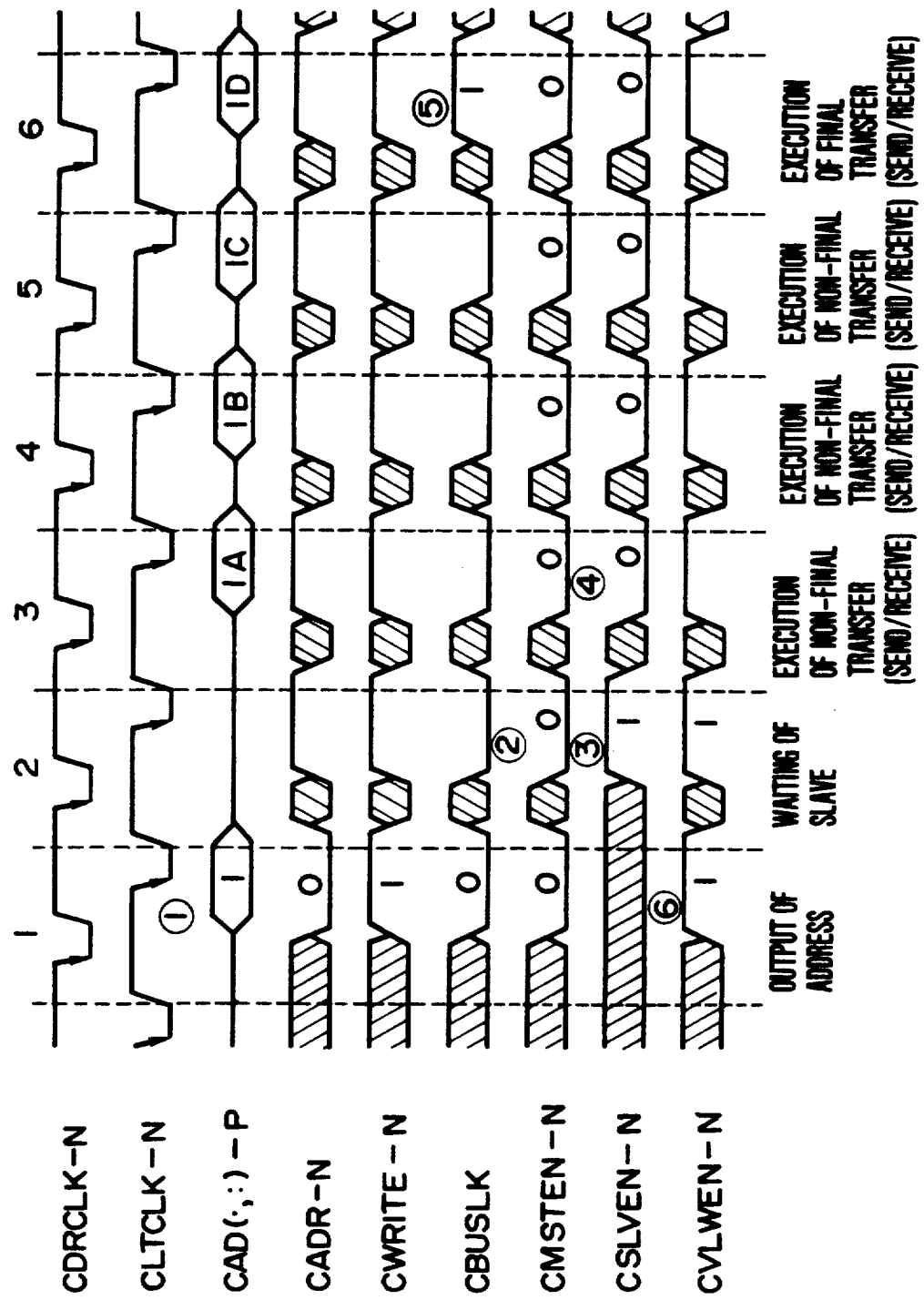
FIG. 22 is a timing chart for illustrating a 32-bit read transfer (non-multi-transfer) operation.

Further referring to FIGS. 22 to 27, concrete examples of the data transfer which can be carried out through the instant bus system will be described. FIG. 22 is a timing chart for illustrating the 32-bit read transfer (nonmulti-transfer). More specifically, this figure illustrates an example of the read transfer of four LWs. The master assumes the state ready for the data transfer (②) immediately after outputting an address (①). On the other hand, the slave waits for one cycle (③) before delivering the data (④). In the sixth cycle, the final transfer (send/receive) is executed (⑤), whereupon the transfer comes to an end.

The mater delivers an address 1 to designate a slave in the first cycle, requesting a 32-bit transfer (⑥). After waiting for one cycle, the slave addressed delivers sequentially a series of data 1A, 1B, 1C and 1D, wherein the data 1A corresponds to the address 1. As the cycle advances, the address is incremented one by one automatically. In the sixth cycle, the final transfer is executed, whereupon both the data transaction and the master's bus tenure are simultaneously terminated. Accordingly, if there exists another master mastership, another data transfer can be started from the seventh cycle.

Although the data transfer of four LWs is shown in the figure, it is self-explanatory that the data to be transferred may be of an arbitrary amount and the transfer procedure remains constantly invariable independent of the amount of data to be transferred. By way of example, when the first cycle is followed immediately by the sixth cycle in the above diagram, this means a read transfer of one LW.

Figure 23:
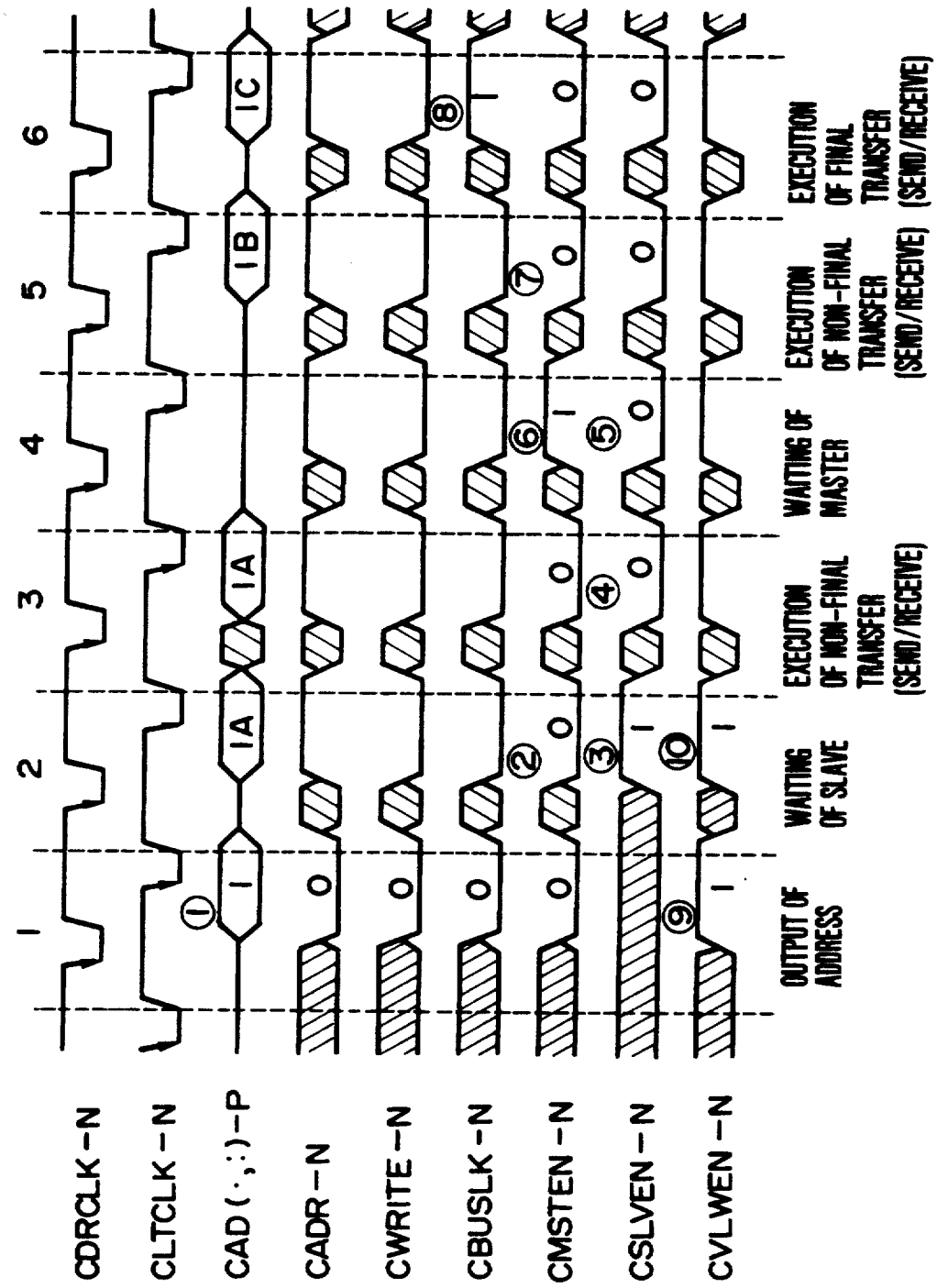
FIG. 23 is a timing chart for illustrating a 32-bit write transfer (non-multi-transfer) operation.

FIG. 23 illustrates an example of the 32-bit write transfer (nonmulti-transfer) on the assumption that the write transfer of three LWs is to be performed. The master delivers the data (②) immediately after outputting an address (①). On the other hand, the slave waits for one cycle (③) before executing the data receive (④). In the fourth cycle, the slave assumes the state ready for data reception (⑤). The master however waits for one cycle (⑥) before outputting the data (⑦). In the sixth cycle, the final transfer is executed (⑧), whereupon the data transaction and the master's bus tenure come to an end simultaneously.

The master writes the three LW data 1A, 1B and 1C in the slave designated with the address 1. In the instant bus, the data transaction is performed by handshake between the master and the slave on equal terms. The master issues a request for a 32-bit transfer in the first cycle (⑨). In this case, the slave outputs "1" on the signal line CVLWEN-N ( ⑩) over a time span from the second cycle to the end of the transfer.

Figure 24:
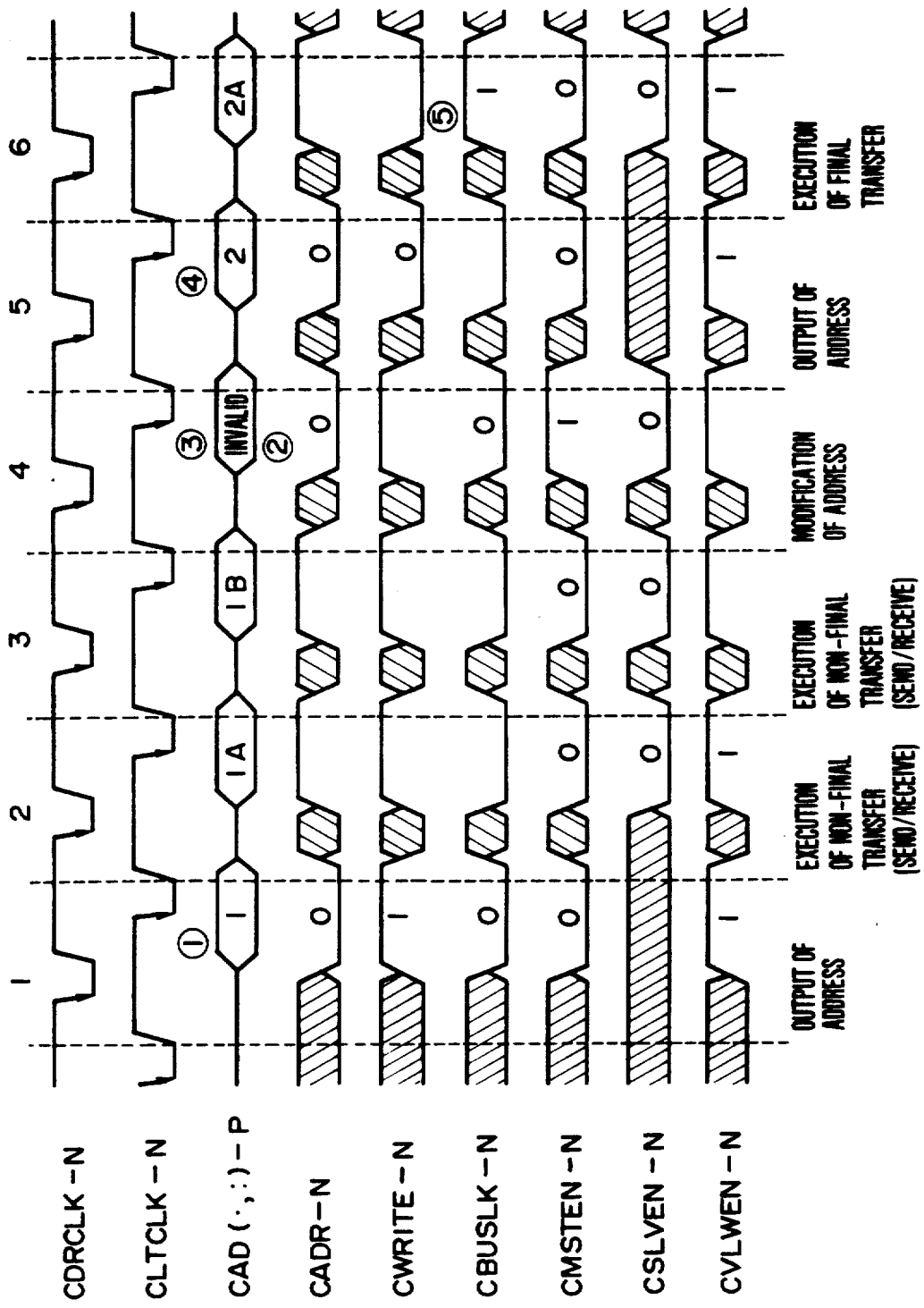
FIG. 24 is a timing chart for illustrating a 32-bit multi-transfer operation.

FIG. 24 shows an example of the 32-bit multi-transfer operation on the assumption that the reading of two LWs and the writing of one LW are to be performed successively through the multi-transfer. The master starts the read transfer to an address 1 (①) and, after transfer of two LWs, modifies the address in the fourth cycle (②). The data outputted by the slave in the fourth cycle is invalidated (③), whereupon the data transfer to the address 1 is terminated. The master still holds the bus mastership or tenure and starts the write transfer to an address 2 in the fifth cycle (④). In the sixth cycle, the final transfer (send/write) is executed, whereupon the data transaction and the bus tenure come to an end simultaneously. In the case of the instant example, the reading of two LWs from the address 1 which is then followed immediately by the writing of one LW 2A to the address 2 is executed consecutively during the single bus tenure.

In the instant bus system, the value of the signal CWRITE-N is not varied during a single data transaction event. Accordingly, a read-address-write operation or the like can be performed by the multi-transfer. In the multi-transfer mode, the master drives the signal line CVLWEN-N in all the address output cycles or beats.

Figure 25:
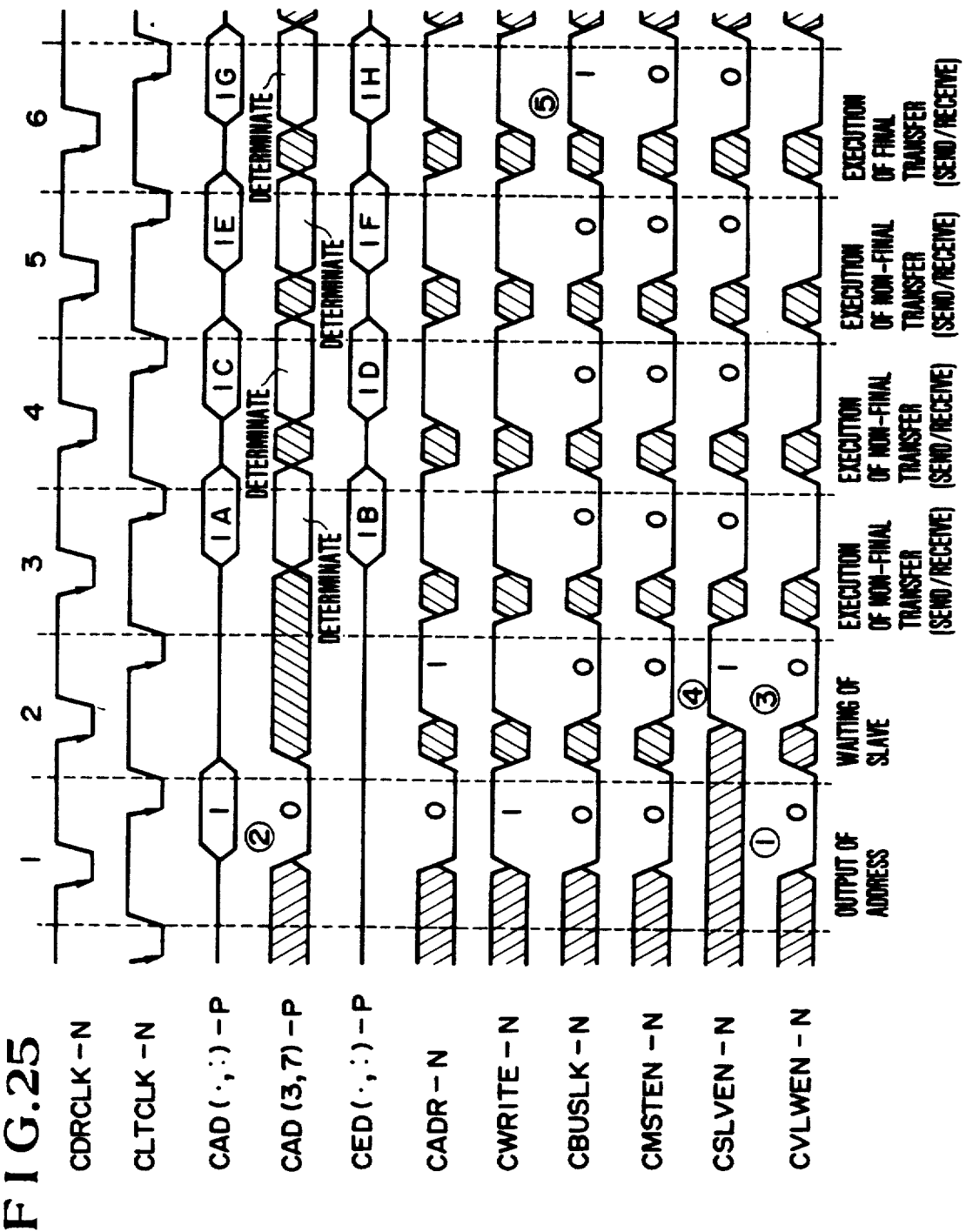
FIG. 25 is a timing chart for illustrating a 64-bit read transfer (non-multi-transfer) operation.

FIG. 25 is a timing chart for illustrating an example of the 64-bit read transfer (nonmulti-transfer) operation on the assumption that the transfer of VLWs is to be performed. The master issues a request for the 64-bit transfer to an address 1 in the first cycle (①). In this case, the least significant bit (CAD(3, 7)-P) of the address 1 is "0" (②). In the second cycle, the slave which is addressed responds to the master's request by asserting the 64-bit transfer (③) and waits for one cycle (④) before outputting the data. During the third to sixth cycles, the data of four VLWs (eight LWs) 1A to 1H is sent and received. In the sixth cycle, the final data transfer is executed (⑤). The slave does not vary the value of the signal CVLWEN-N during a single data transaction event.

Figure 26:
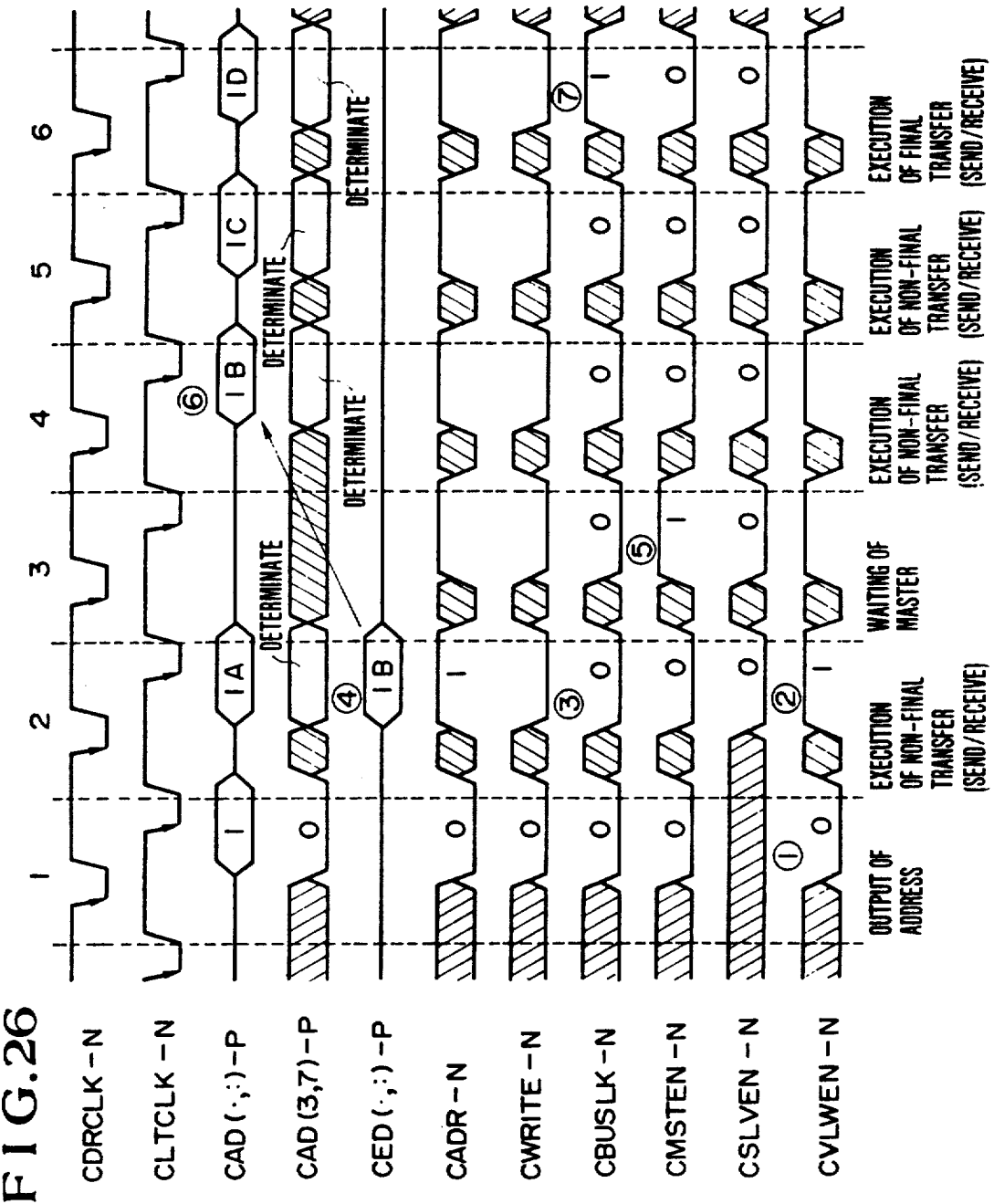
FIG. 26 is a timing chart for illustrating a 32-bit write transfer.

FIG. 26 is a timing chart for illustrating an example of the 32-bit write transfer (nonmulti-transfer of four LWs) on the assumption that a 64-bit master makes access to a 32-bit slave. In the first cycle, the master makes access to an address 1 for the 64-bit transfer (①). However, the slave which is designated rejects the request for the 64-bit transfer by placing "1" on the line CVLWEN-N in the second cycle (②). Consequently, the 32-bit transfer mode is automatically established in the second cycle, wherein only the data 1A is sent and received (③) while the data 1B is invalidated (④). The master waits for one cycle (⑤), whereon the transfer of the data 1B is performed by swapping (⑥), which is then followed by the transfer of two LWs in the 32-bit transfer mode. The final data transfer is performed in the sixth cycle (⑦). The master may wait in the second cycle, as occasion requires, in order to confirm the response from the slave before performing the data transfer.

Figure 27:
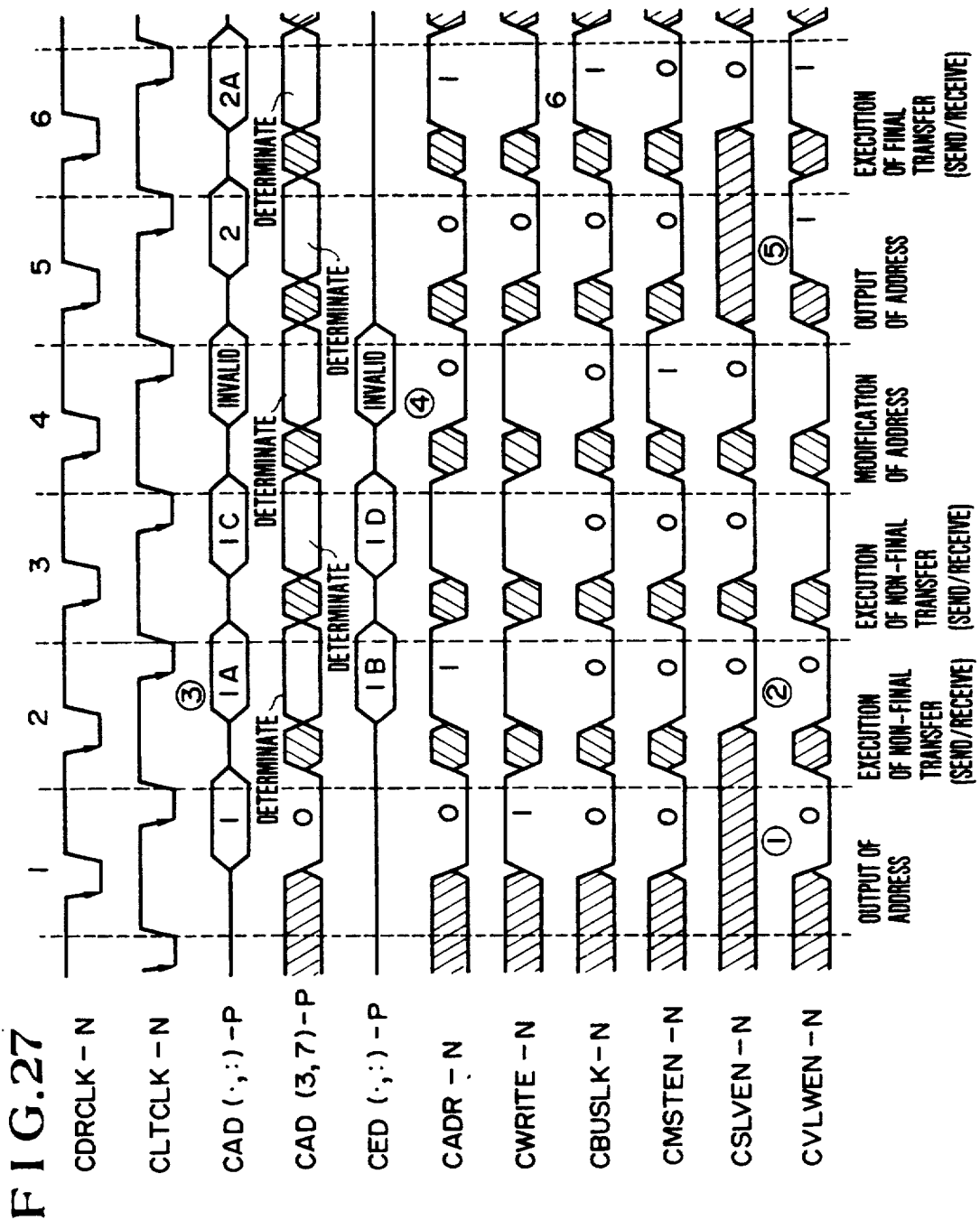
FIG. 27 is a timing chart illustrating an example of 64-bit/32-bit multi-transfer.

FIG. 27 is a timing chart for illustrating an example of the 64-bit/32-bit multi-transfer on the assumption that the reading of two VLWs and the writing of one LW are to be performed in the multi-transfer mode. In the first cycle, the master makes access to the address 1 for the 64-bit data transfer (①). In the second cycle, the slave responds by asserting the 64-bit transfer (②) and simultaneously outputting the data (③). After the transfer of two VLWs, the master asserts an address modification request to end the transfer without relinquishing the bus tenure in the fourth cycle. In the fifth cycle, the master makes access to an address 2 in the 32-bit mode (⑤) to execute the data transfer of one LW. In the sixth cycle, the master executes the final data transfer (⑥).

Bus Error Line

Figure 29:
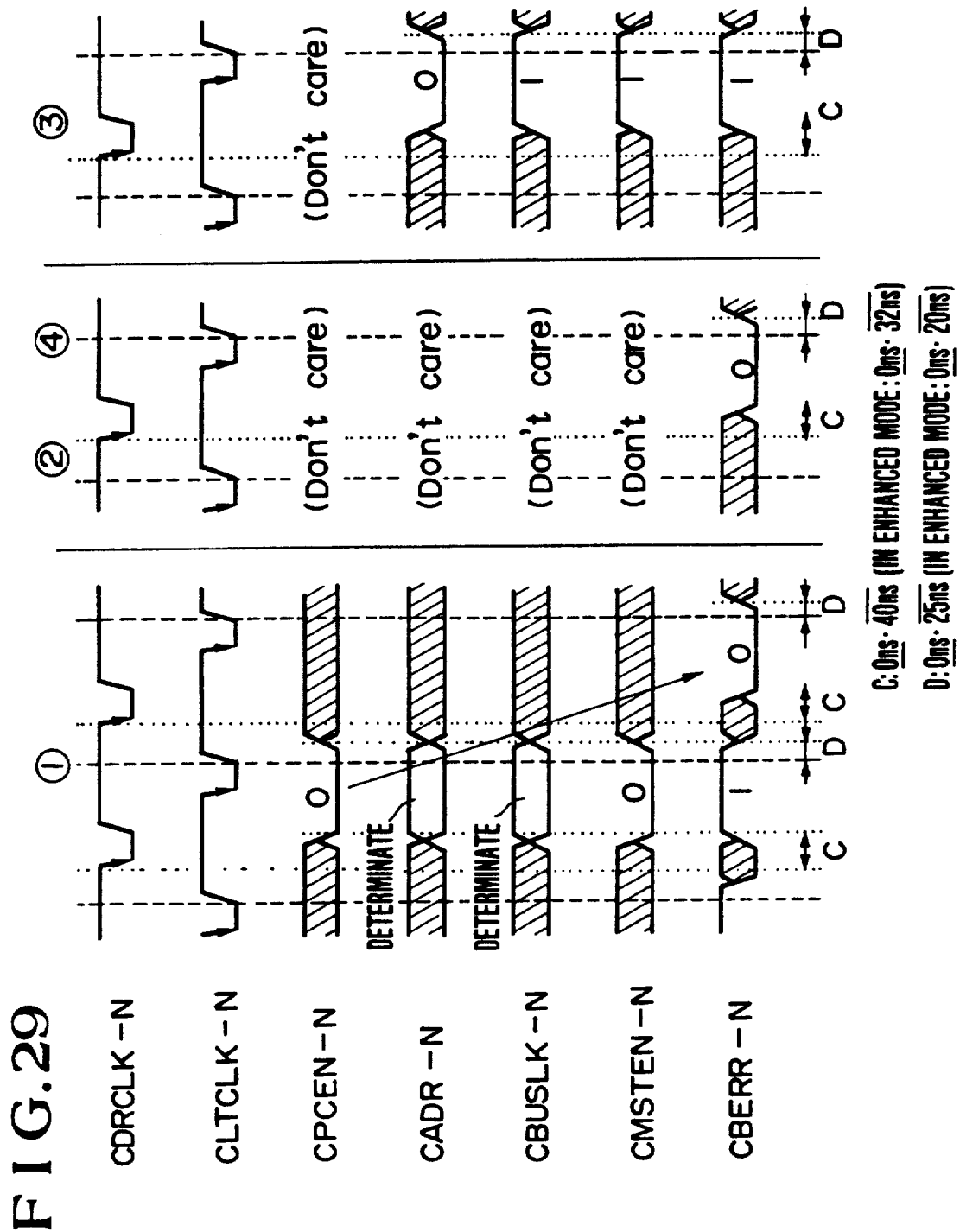
FIG. 29 is a timing chart for illustrating the operation of the same.

The bus system according to the instant embodiment of the invention includes a bus error line. FIG. 28 shows the specifications of this bus error line. There are four types of bus errors. They are (1) a parity error, (2) a time-out error, (3) a master error, and (4) a bus controller (SBUSC) error. FIG. 29 is a timing chart for illustrating these errors. The following description is directed to the errors mentioned above by reference to FIG. 29.

(1) Parity error:

When the bus controller (SBUSC) detects a parity error in a cycle during which the parity is enabled (i.e. CPCEN-N = "0"), the controller outputs "0" on the line CBERR-N in the next cycle.

(2) Time-out error:

Unless the transfer (CMSTEN-N = "0" and CSLVEN-N = "0") is executed over a certain number of cycles in the state where a master has the bus mastership or tenure, the bus controller (SBUSC) outputs "0" on the line CBERR-N.

(3) Master error:

This error takes place when the master holding the bus mastership relinquishes it without performing the final data transfer (send/receive) for some reason, which is defined by (CADR-N = "0" and CBUSLK-N = "1" and CMSTEN-N = "1"). The master error indication is to serve for indicating the slave stoppage of the data transfer and forcing it to release the bus.

(4) SBUSC error:

When the bus controller SBUSC has detected something wrong with the bus or abnormality thereof, the controller places "0" on the line CBERR-N to set the bus in the idle state. If whatever has happened exerts an adverse influence on the bus control, the bus controller SBUSC places "0" on the line CMSTRST-N (resetting the master).

When a bus error cycle has occured, both the master and slave release the bus except for the arbitration line and the interrupt lines described hereinafter. At this time, the bus is controlled by the bus controller SBUSC. The results of the transaction executed during the error cycle are invalidated, as the bus specifications can not be guaranteed thereby.

Arbitration Control Line

Description will now be made of the arbitration control according to the instant embodiment of the invention by referring to FIGS. 30 to 35.

Figure 31:
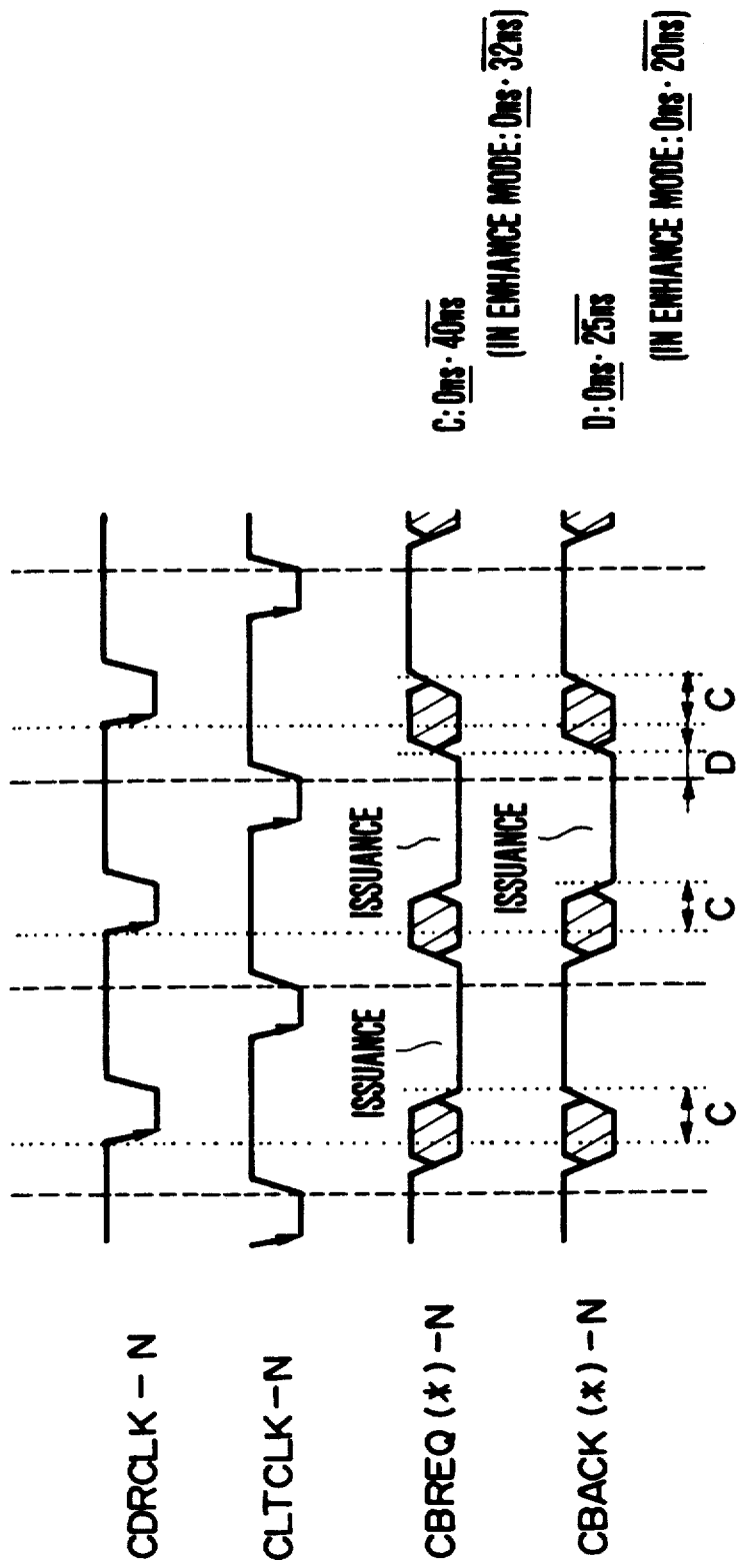
FIG. 31 is a timing chart for illustrating the operation of the same.

FIG. 30 shows the specification of the arbitration control line, and FIG. 31 is a timing chart for illustrating operation of the same. Each device which is connected to the instant bus system and which is required to serve as the master has separate request line CBREQ(*)-N and a separate acknowledge line CBACK(*)-N connected to the bus controller SBUSC. The operation timing of these lines is illustrated in FIG. 31.

The device of those devices connected to the bus which is to serve as the master issues the request signal CBREQ(*)-N to assert the bus mastership and continues to issue the request signal CBREQ(*)-N until it has acquired the bus mastership. (It should however be noted that it is not till the issuance of the CBACK(*)-N.) The bus controller SBUSC performs the arbitration control at this time and issues the CBACK(*)-N in advance to the master to which the bus mastership or tenure is to be next assigned. The master does not issue the CBREQ(*)-N so long as it holds the bus tenure. The arbitration is performed throughout all the cycles.

Now, the arbitration control will be explained in more detail.

The bus tenure is set up when (CBACK(*)-N = "0" and CBUSLK-N = "1" and CMSTEN-N = "0" and CSLVEN-N = "0"), i.e. when the CBACK(*)-N is issued and when the final data transfer (send/receive) has been performed. When the bus is in the idle state, the bus controller SBUSC outputs the signal CBACK(*)-N of "0" together with the CBUSLK-N of "1", the CMSTEN-N of "0" and the CSLVEN-N of "0". This status is referred to as pseudo-final transfer, as the result of execution of which the bus tenure is established. The master that has gained the bus tenure outputs the CBUSLK-N of "0" in the next cycle and simultaneously starts a data transaction even by outputting an address.

In the instant bus system, it is possible to set up such a master which has a privilege of forcing another master to stop the data transfer thereof and gain the bus tenure. When a master which has a privilege of higher level than that of the master currently having the bus tenure issues the CBREQ(*)-N, the bus controller SBUSC then delivers the CBACK(*)-N to both of the master currently having the bus tenure and the master having the higher privilege or priority. At that time, the CBACK(*)-N represents an abort acknowledgment for the master currently having the bus tenure. The master having received the abort acknowledgment should execute the next data transfer as a final data transfer or alternatively issue a master error for terminating the transfer. In other words, when the abort acknowledgment is issued, the controller SBUSC starts to monitor the bus from the next cycle and, if any other data transfer than the final one is executed, issue a bus error to terminate forcibly the data transfer.

The arbitration control is not affected by errors. Accordingly, the CBREQ(*)-N is not released even when an error cycle occurs.

Figure 32:
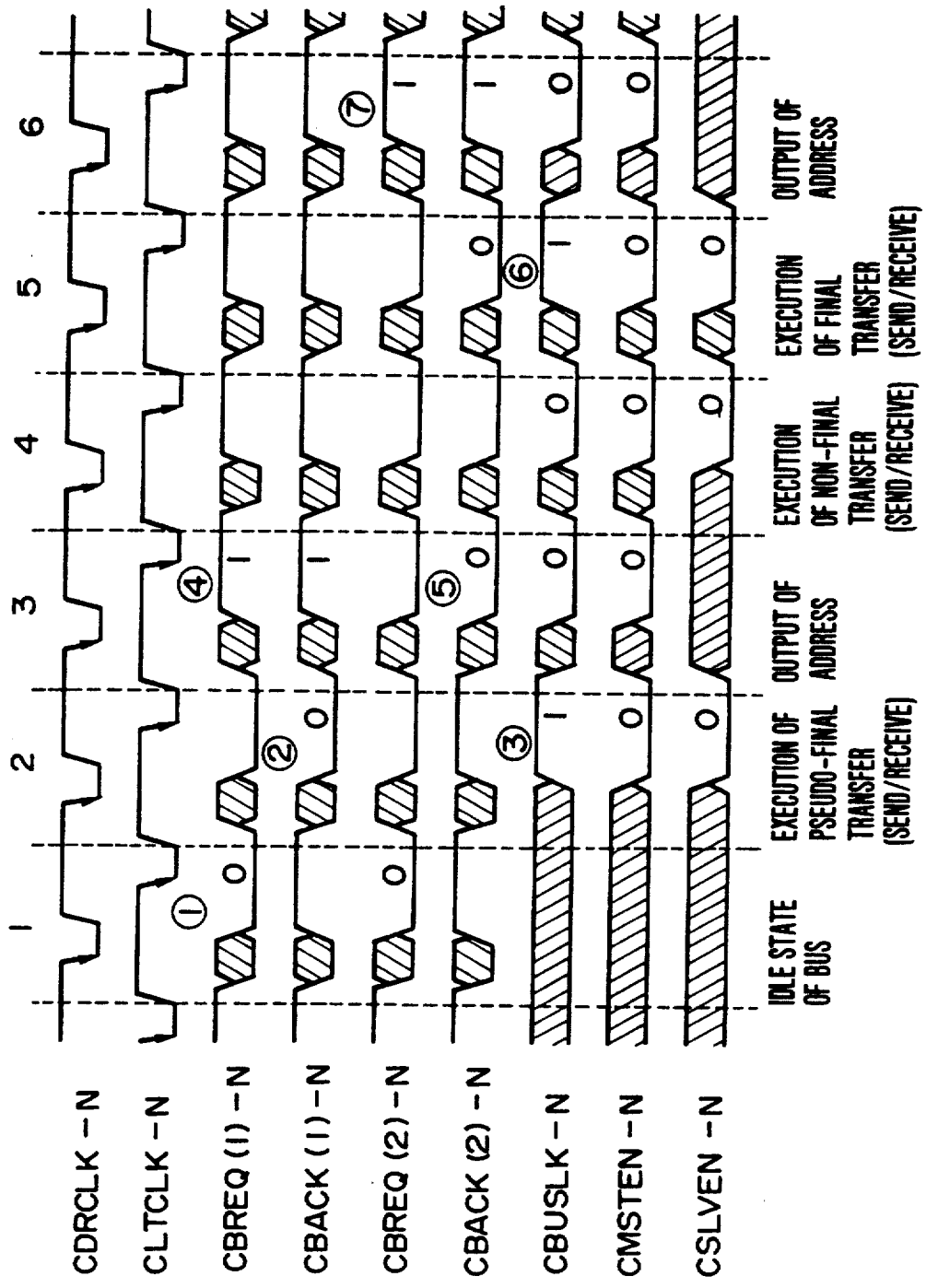
FIGS. 32 to 34 are timing charts illustrating three examples of arbitration control.
Figure 33:
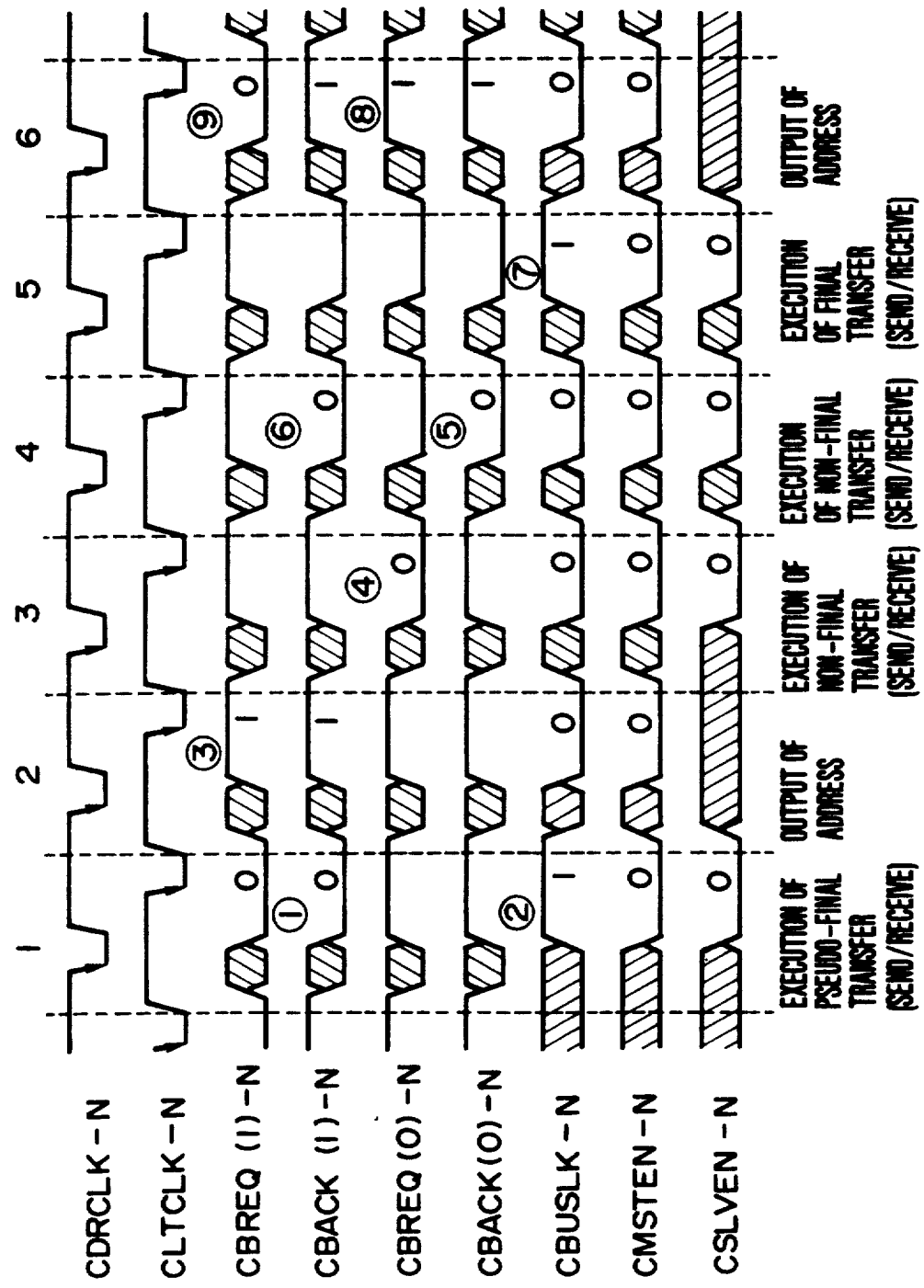
Figure 34:
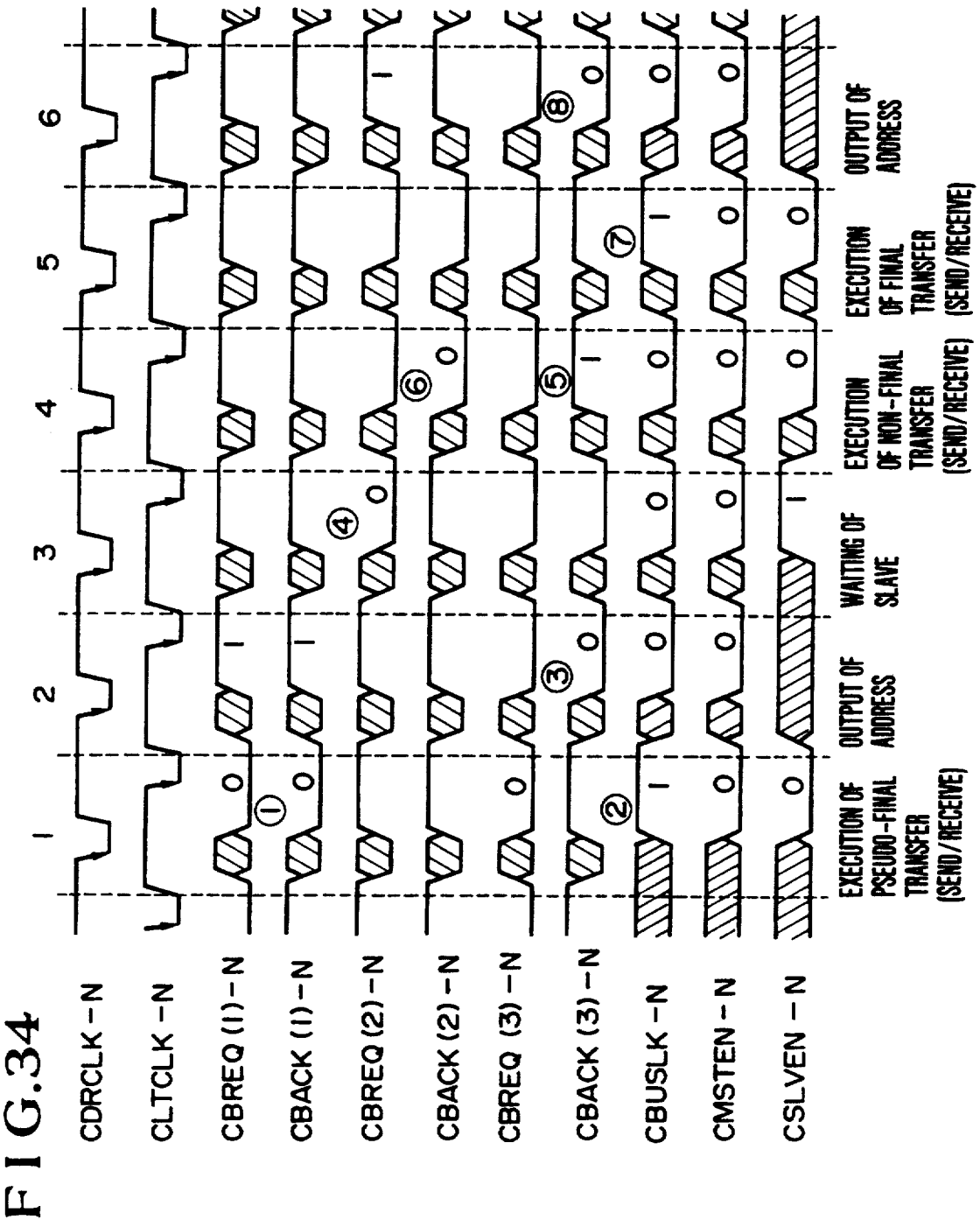
Figure 35:
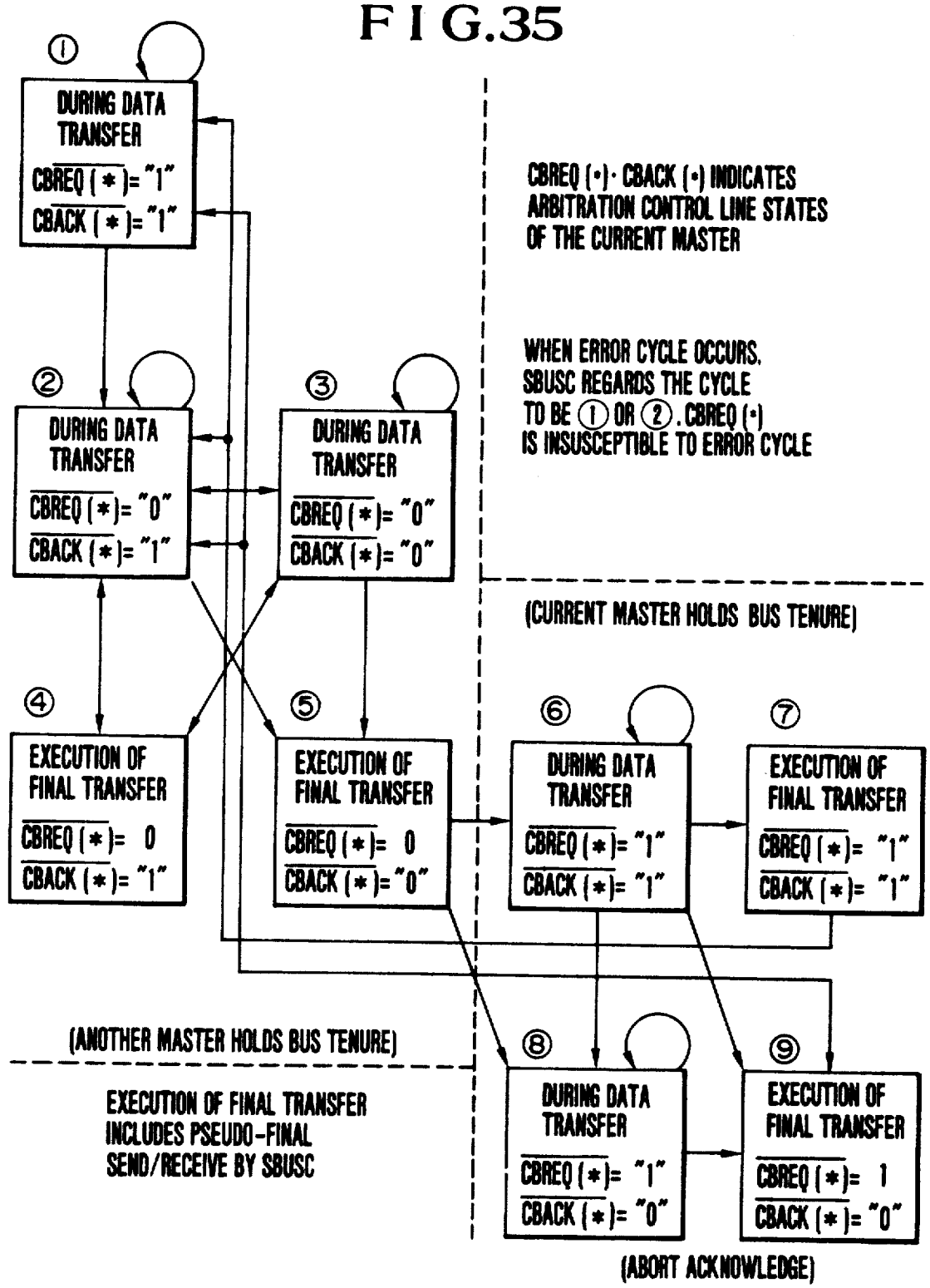
FIG. 35 is a diagram for illustrating the status transition in the arbitration control.

FIGS. 32 to 34 are timing charts illustrating three examples, respectively, of the arbitration control according to the instant embodiment of the invention. Further, FIG. 35 shows an arbitration status transition diagram.

In the first place, control of simple competition will be described by reference to FIG. 32, in which it is assumed that two masters 1 and 2 each issue a bus request during the first cycle in the idle state of the bus (①). Accordingly, the bus controller SBUSC performs the arbitration such that an acknowledgment is asserted to the master 1 in the second cycle (②) and at the same time the controller SBUSC executes the pseudo-final transfer to impart the bus tenure to the master 1 (③). In the third cycle, the master 1 stops issuing the request (④) and starts data transfer, while the bus controller SBUSC asserts the acknowledgment to the master 2 in the place of the master 1 (⑤). In the fifth cycle, the master 1 executes the final data transfer (send/receive) (⑥) and now the bus tenure is set up for the master 1. In the sixth cycle, the master 2 stops issuing the request (⑦) and starts the data transfer.

FIG. 33 is a timing chart for illustrating the abort acknowledgment control. In this case, the bus tenure of the master 1 is established in the first cycle after an acknowledgement has been issued (①) with the pseudo-final transfer having been executed (②). The master 1 stops issuing the request to start the data transfer in the second cycle (③). In the third cycle, the master 0 having the privilege or priority over the master 1 issues a request (④). In response, the bus controller SBUSC asserts the acknowledgment to the master 0 (⑤), while asserting the abort acknowledgment to the master 1 (⑥) in the fourth cycle. Receiving the abort acknowledgment, the master 1 executes the final data transfer and release the bus (⑦) in the fifth cycle. At the same time, the bus tenure is established for the master 0 which then stops issuing the request to start the transaction (⑧) in the sixth cycle. The master 1 having relinquished the bus tenure again issues the bus request (⑨) in the sixth cycle. On the other hand, the master 1 having the bus tenure is inhibited from issuing the bus request during the period from the second to fifth cycles.

FIG. 34 shows a competition control with canceling of the acknowledgement. In this case, the master 1 that has won in the competition with the master 3 gains the bus tenure in the first cycle by asserting the acknowledgment (①) and executing the pseudo-final transfer (②). The master 1 performs the data transaction during the second to fifth cycles. The bus controller SBUSC asserts acknowledgment to the master 3 (③) in the second cycle. However, the bus controller receives a bus request (④) from the master 2 in the third cycle and performs the arbitration, whereby the acknowledgment asserted to the master 3 is canceled (⑤) in the fourth cycle while acknowledgment is asserted to the master 2 instead (⑥). In the fifth cycle, the master 1 executes the final transfer (⑦), which is then followed by an acquiring of the bus tenure by the master 2. In the sixth cycle, the master 2 starts the data transaction while the bus controller SBUSC asserts acknowledgment (⑧) to the master 3 again.

The arbitration controls described above are performed in accordance with the arbitration status transition diagram shown in FIG. 35. Referring to the figure and assuming that when a master is transferring data by using the bus (①), another master issues a bus request for acquiring the bus mastership or tenure by setting the signal or line CBREQ(*)-N to "0" (①→②). Then, the line CBACK(*)-N is set to "0" and the master requesting the bus tenure waits for the final transfer execution cycle (②, ③, ④). Upon acquiring the bus tenure at (⑤), the latter stops issuing the bus request by setting the line CBREQ(*)-N to "1" and releases the bus after execution of the final data transfer (⑦). On the other hand, when the latter receives the abort acknowledgment in the course of the data transfer with the line CBACK(*)-N set to "0" (⑧), that master is forced to execute the next data transfer as the final transfer (⑨).

Interrupt Control Line

FIG. 36 shows specifications of an interrupt control line which can be used in the bus system according to the instant embodiment of the invention.

Any device connected to the instant bus system that can assert the interrupt to a central processing unit which is also one of the connected devices has to be connected separately to the bus controller SBUSC via an interrupt control line CIREQ(*)-N.

An interrupt occurs when the line CIREQ(*)-N is set to "0". The interrupt is represented by an asynchronous level signal. In response to the reception of this signal, the bus controller SBUSC generates an interrupt vector to the central processing unit (CPU). The device that has issued the interrupt request keeps the signal CIREQ(*)-N at "0" until the execution of interrupt processing by the CPU is confirmed.

The CIREQ(*)-N does not affect the other signals in the instant bus. Any error cycle of the bus does not affect the interrupt control at all. Upon resetting, the output signal CIREQ(*)-N is set to "1".

Summary and List of Standard Connector Pins

FIG. 37 shows various signals in the system bus described in the foregoing. FIG. 38 shows a list of standard connector pins, and FIG. 39 shows a list of expansion connector pins.

As can be seen in FIGS. 38 and 39, the connector of an expansion board connected to the instant system bus is specified according to the DIN 41612 as a 96-pin connector (Euro-connector) which is a standard connector of the 32-bit specification. For the 64-bit specifications, an Euro-connector is added as the expansion connector. The pin assignments of the standard and expansion connectors are shown in FIGS. 38 and 39, in which symbol K denotes sink, Y denotes tri-state, V denotes power supply, G denotes the ground.

The connector pins are assigned to the lines as mentioned below:
1) Clock lines:2 pins
2) Reset lines:2 pins
3) Address/data lines:32 pins (64 pins when expanded)
4) Bus control lines:16 pins (24 pins when expanded)
5) Arbitration control lines: 2 pins (connected individually for each slot)
6) Interrupt control line: 1 pin (connected individually for each slot)
7) Slot definition lines: 3 pins (connected individually for each slot)
8) Power lines: 14 pins (22 pins when expanded)
9) Ground lines: 22 pins (44 pins when expanded)
10) Reserved lines for diagnosis: 2 pins
11) Reserved line for expansion connector: 26 pins (only when expanded)

The power supply lines require eight pins (sixteen pins when expanded) of 5 V and two pins of 12 V, −12 V and −5 V each, wherein the −5 V power supply is optional.

Typical Operations

Now, description will be made of four types of bus operations and combinations thereof by reference to timing charts I, II, III and IV shown in FIGS. 40, 41, 42 and 43, respectively, on the assumption that these timing charts are all for the 32-bit specifications and that the signal CVLWEN-N is constantly locked at "1" during the transfer.

Figure 40:
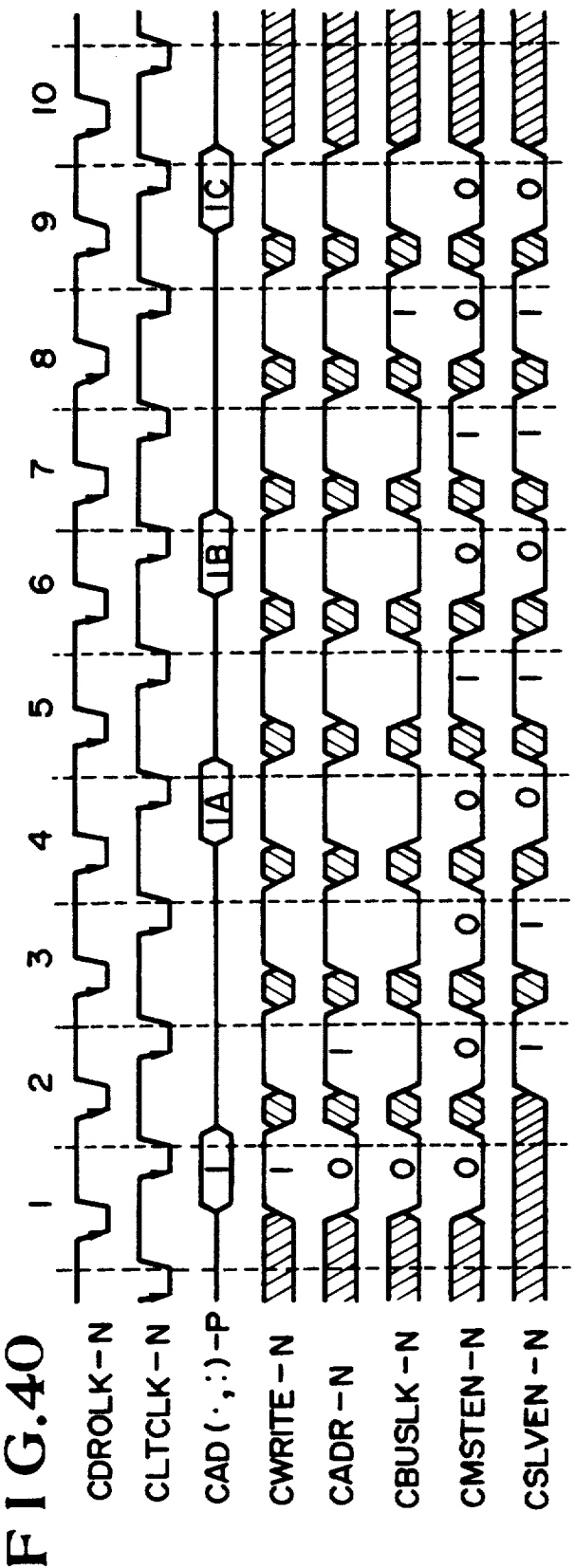
FIGS. 40 to 43 are timing charts for illustrating various operations and combinations thereof in the bus system according to an embodiment of the invention.

1) Timing chart I (FIG. 40)

FIG. 40 is a timing chart for illustrating the read transfer operation of three LWs. In the three transfer events, the slave is forced to wait twice, once and twice, respectively. The master is forced to wait every time it has received the data 1A and 1B. The final transfer is started in the eighth cycle and is executed in the ninth cycle.

Figure 41:
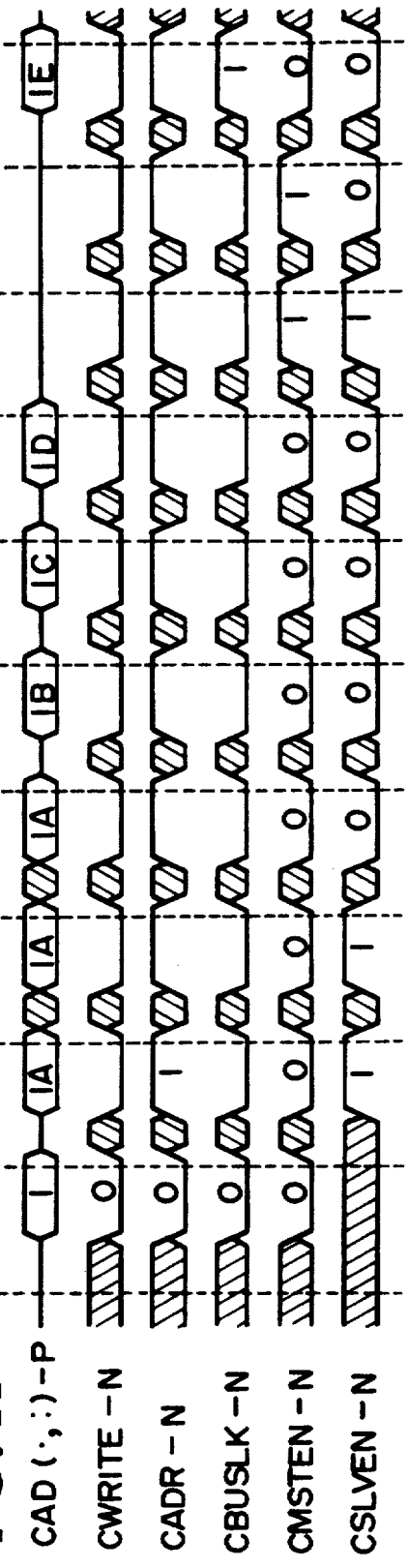

2) Timing chart II (FIG. 41)

FIG. 41 is to illustrate, by way of example, the write transfer operation of five LWs. The slave is forced to wait twice during transfer of the data 1A and once during that of the data 1E. On the other hand, the master is forced to wait twice for the transfer of the data 1E and then executes the transfer as the final one. In this case, the signal CBUSLK-N may be "0" or "1" in the eighth and ninth cycles.

Figure 42:
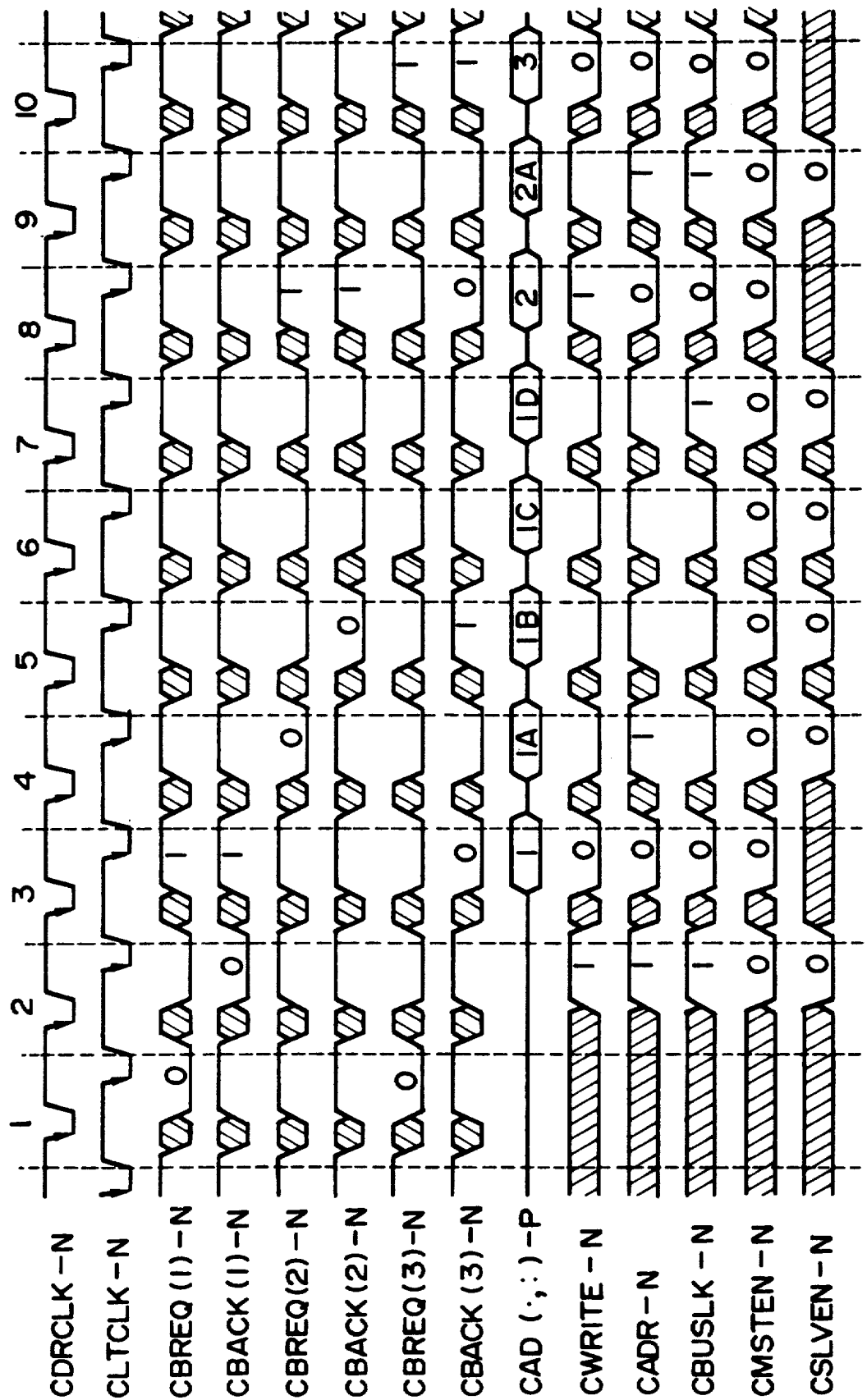

3) Timing chart III (FIG. 42)

FIG. 42 is to illustrate an example of the arbitration performed for three master devices 1, 2 and 3. In the first cycle, the signals CBREQ(1)-N and CBREQ(3)-N are issued in the idle state of the bus. In response, the bus controller SBUSC issues the signal CBACK(1)-N in the second cycle, whereupon the pseudo-final transfer is executed simultaneously to grant the master 1 of the address 1 to acquire the bus tenure. The master 1 performs the write transfer of four LWs during the period from the third to seventh cycles and executes the final data transfer in the seventh cycle. The master 2 designated by the address 2 issues the request signal CBREQ(2)-N in the fourth cycle. In response, the bus controller SBUSC asserts the acknowledgment CBACK(1)-N instead of CBACK(3)-N. The master 2's bus tenure is set up in the seventh cycle, and the read transfer of one LW is performed throughout the eighth and ninth cycles. The signal CBACK(3)-N is issued again in the eighth cycle, whereby the master 3's bus tenure is established in the night cycle after execution of the final data transfer.

Figure 43:
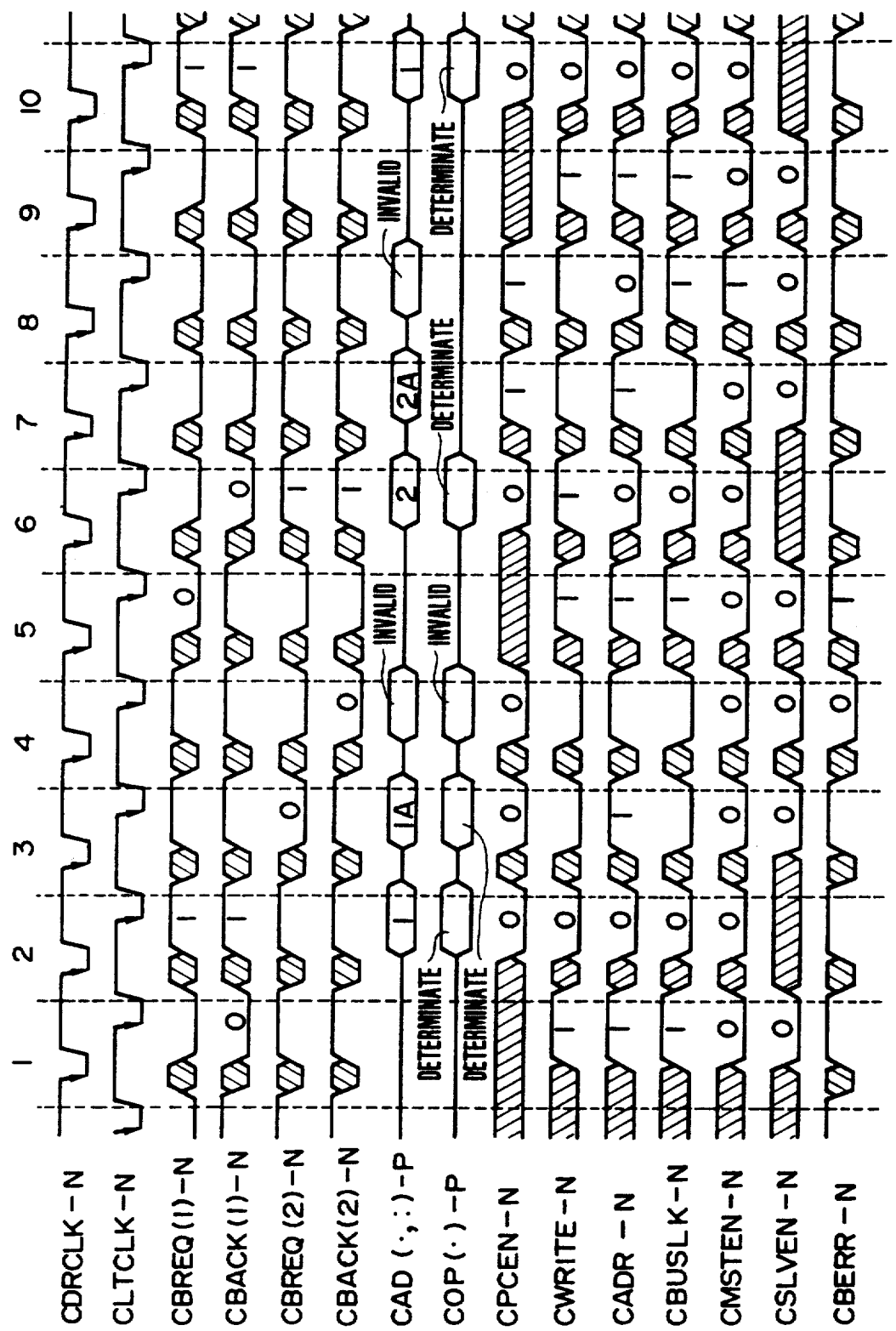

4) Timing chart IV (FIG. 43)

FIG. 43 illustrates an example of the operation performed when errors occur. The master 1, having acquired the bus tenure after execution of the pseudo-final data transfer in the first cycle, starts the write transfer from the second cycle with the parity check enabled. A parity error occurs for the data 1A. The bus controller SBUSC issues the bus error signal CBERR-N in the fourth cycle. Thus, the data transfer performed in the fourth cycle is invalidated. The master 1 and the slave release the bus. In the fifth cycle, the bus controller SBUSC validates the pseudo-final data transfer and gives the bus tenure to the master 2. The master 1 issues the bus request signal CBREQ(1)-N in an effort to regain the data transfer.

Although the master 2 is provided with a parity for the address, the designated slave does not support the parity. Thus, the signal CPCEN-N is set to "1" in the seventh and eighth cycles. The master 2 issues a master error in the eighth cycle. Consequently, the data transfer is stopped with the master and slave releasing the bus.

In the ninth cycle, the bus controller SBUSC executes the pseudo-final data transfer and grants the master 1 the bus tenure. The master 1 restarts the data transfer to the address 1 in the tenth cycle.

In the foregoing description, it has been assumed that the address/data multiplex lines of 32-bits and 32 bits/64 bits are employed and that the data width corresponding to a unit address coincides with the number of the address/data multiplex lines. However, this is only for the purpose of illustration. It is self-explanatory that modification may be made to the abovementioned bus configuration. For example, when there arises a need for expanding the address space, independent address lines may be correspondingly added or alternatively multiplexed with a part of the bus control lines described hereinbefore.

Figure 44:
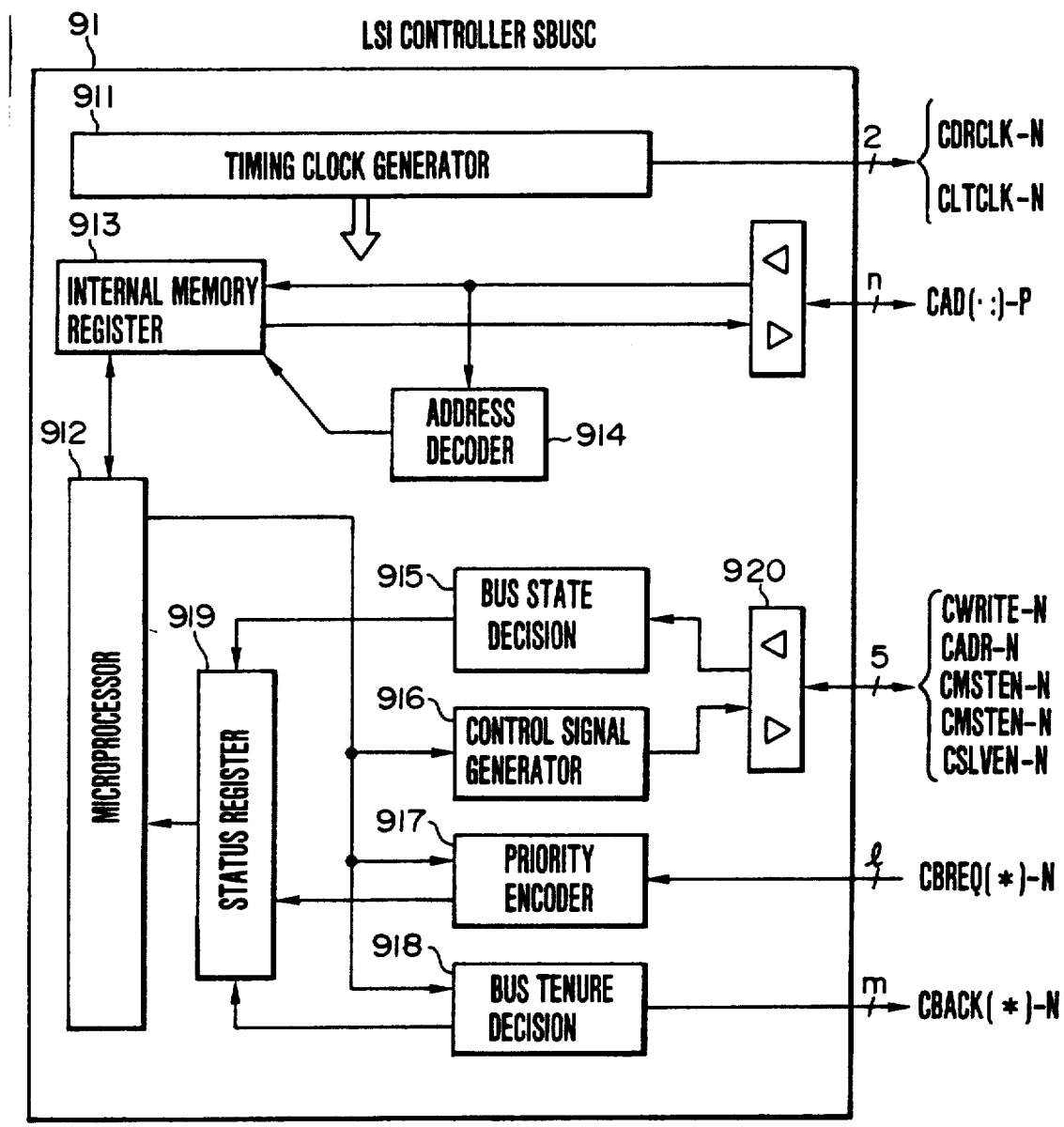
FIG. 44 is a block diagram showing an internal structure of a bus controller (SBUSC) according to an embodiment of the invention.

FIG. 44 shows an internal structure of the bus controller SBUSC for the system bus described above. This bus controller corresponds to that shown in FIG. 2.

Referring to FIG. 44, a reference numeral 91 denotes generally the bus controller for the system bus of the configuration shown in FIG. 2. The bus controller 91 includes as internal components thereof a timing clock generator 911, a microprocessor 912, an internal memory register 913, an address decoder 914, a bus state decision part 915, a control signal generator 916, a priority encoder 917, a bus mastership/tenure decision part 918, a status register 919 and a bi-directional signal input/output driver 920.

The bus controller shown in FIG. 44 is designed for use with the address/data multiplex synchronous type bus described hereinbefore. It should however be understood that the bus controller can also be applied to other types of system bus configurations, as will become apparent as description proceeds. In the following, operations of the individual components of the bus controller will be described.

The timing clock generator 911 generates a variety of timing clocks, which are supplied to various components of the bus controller 91. In the case of the synchronous system bus, the timing clock generator 911 generates the bus clocks CDRCLK-N and CLTCLK-N as well, which are sent out onto the system bus. The microprocessor 912 is responsible for the overall control of operations of the bus controller. This control is performed by a central processing unit or CPU (not shown) of the system in accordance a program and parameters loaded in the internal memory register 913 by consulting the contents held in the status register 919 for thereby issuing commands to the various members of the bus controller. The internal memory register is a storage circuit which can be accessed for reading and writing by the central processing unit via the system bus and stores therein a program and parameters for controlling the operation of the microprocessor 912 which may be constituted by a general-purpose CPU circuit capable of performing operations in accordance with the program and the parameters mentioned above.

The address decoder 914 serves to decode the addresses on the system bus to thereby command or indicate the writing and the reading to and from the internal memory register 913. In the case of an address/data separation type bus, only the address line is connected to the input of the address decoder 914. The bus state decision part 915 is an encode logic circuit which serves to monitor the state of the five bus control lines CWRITE-N, CADR-N, CMSTEN-N, CSLVEN-N and CBUSLK-N determines the bus status on the basis of the combinations of the monitored states, the result of which is written in the status register 919. Thus, the microprocessor 912 can confirm the bus status by inspecting the content of the status register 919. The control signal generator 916 is constituted by a decode logic circuit which generates the control signals to be outputted onto the bus control lines in accordance with the commands 921 issued by the microprocessor 912. When the bus controller (SBUSC) 91 becomes the master or slave in the bus system or when the controller initializes the bus for the reasons of occurrence of a reset error or others, the microprocessor 912 then outputs the bus control signals in response to the command 921.

Connected to the input side of the priority encoder 915 are the request lines in a number of l in total which extend from the individual devices connected to the bus, wherein the priority encoder 917 selects the bus mastership request of the highest priority in accordance with the priority sequence set up by the microprocessor 912. The result of the selection is sent to the bus mastership/tenure decision part 918 and at the same time is written in the status register 919. Thus, the microprocessor 912 can confirm the status of the bus mastership requests by referring to the contents of the status register. The bus mastership/tenure decision part 918 is constituted by a decode logic circuit which determines the master that may assert the bus tenure on the basis of the result of the selection performed by the priority encoder 917 and the command 921 outputted from the microprocessor 912 to thereby output the corresponding signal on the m acknowledge lines. Information of the master which has acquired the bus tenure is written in the status register 919. Thus, the microprocessor 912 can confirm the status of the bus tenure by consulting the content of the status register 919.

There are written in the status register 919 the bus status, the bus tenure status and the bus mastership request status as the status information to be utilized by the microprocessor 912, which can thus issue to the control signal generator 916 and the bus mastership/tenure decision part 918 the command 921 for shifting the bus status and the bus tenure status by referring to the status information stored in the register 919 and in accordance with the program and the parameters placed in the internal memory register 913.

The master having the privilege to stop the burst transfer being performed by another master is registered as a parameter in the internal memory register 913. The microprocessor 912 can thus issue to the bus mastership/tenure decision part 918 the command 921 for stopping the data transfer by referring to the content of the status register 919, when the bus tenure request is issued from the privileged master set as the parameter in the internal memory register 913. The bus mastership/tenure decision part 918 decodes the abovementioned command to output a transfer stop command onto the bus acknowledge signal line CBACK(*)-N shown in FIG. 2. At the same time, the acknowledge is issued to the master having the privilege, as described hereinbefore.

In this manner, the bus controller (SBUSC) 91 of the abovementioned structure can perform arbitration control inclusive of the transfer stop command in the bus system described previously.

In the above description of the bus controller, the internal memory register 913 is assumed to be externally loaded with the program and the parameters. In this conjunction, it should be mentioned that the internal memory register 913 may be incorporated as an internal ROM or the like unless the external access is required. Further, the microprocessor 912 may be constituted by a dedicated logic operation circuit instead of the general purpose CPU.

Figure 45:
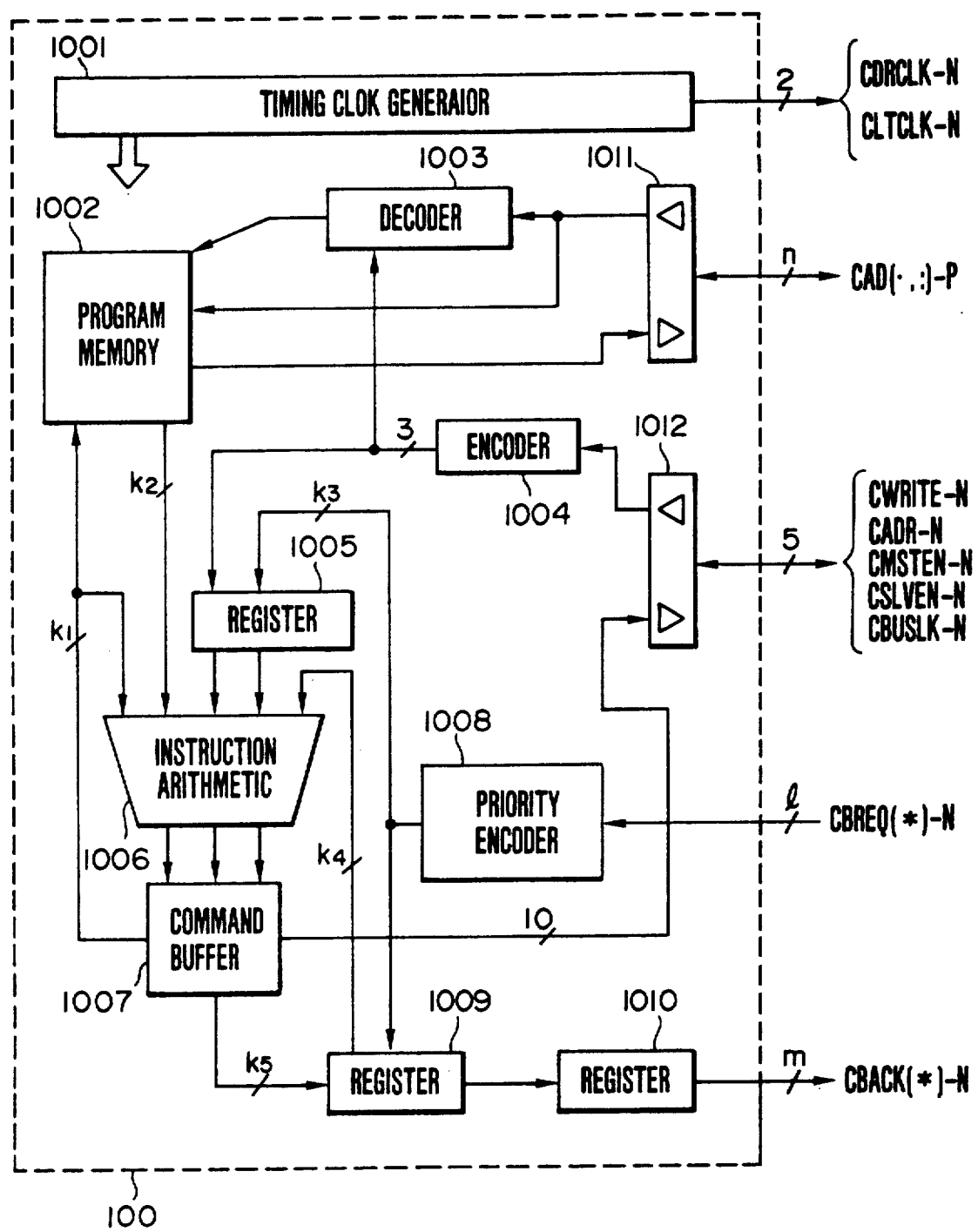
FIG. 45 is a block diagram showing an internal configuration of the bus controller (SBUSC) according to another embodiment of the invention.

FIG. 45 is a block diagram showing an internal configuration of the bus controller SBUSC according to another exemplary embodiment of the invention. Referring to FIG. 45, the bus controller SBUSC of the bus system is denoted generally by a reference numeral 100 and includes as internal components a timing clock generator 1001, a program memory 1002, decoder circuits 1003 and 1010, an encoder circuit 1004, registers 1005 and 1009, an instruction arithmetic unit 1006, a command buffer 1007, a priority encoder 1008, and bi-directional signal input/output drivers 1011 and 1012. The bus controller shown in FIG. 45 is designed for use with the address/data multiplex synchronous type system bus, wherein the individual parts constituting the bus controller operate in synchronism with the system bus. Operations of the individual components of the bus controller 100 will be described below.

The timing clock generating circuit 1001 generates the clock signals CDRCLK-N and CLTCLK-N for driving the corresponding clock lines and at the same time generates a timing signal for allowing the individual components incorporated in the bus controller 100 to operate in synchronism. The bus controller (SBUSC) 100 in turn operates in synchronism with the bus in accordance with a micro-code program stored in the program memory 1002 which may be constituted by a RAM or the like.

The program memory 1002 is resident in the address space of the system bus when viewed from the central control unit (not shown) of the system and is accessed for a write/read operation by the latter via the system bus. The decoder circuit 1003 decodes the address on the bus to thereby output a write/read command signal to the program memory 1002.

Figures 46, 47:
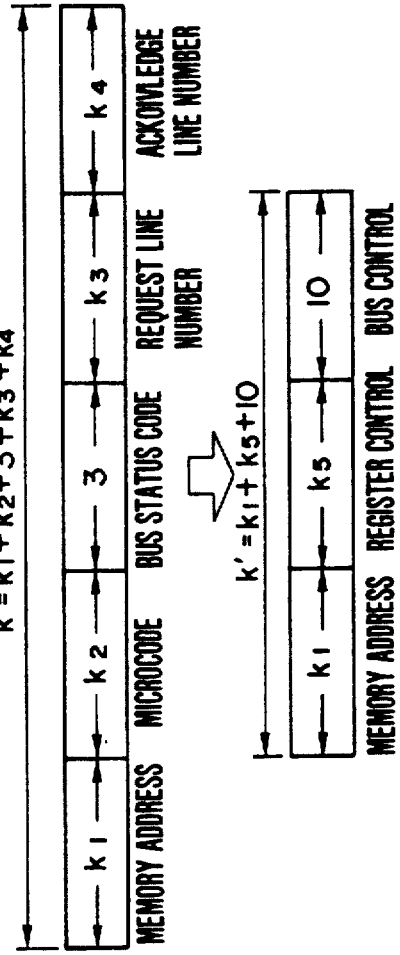
FIG. 46 is a view showing examples of the status decision codes.
FIG. 47 shows an example of a format for the codes.

The encoder circuit 1004 serves to monitor the states of the five bus control lines CWRITE-N, CADR-N, CMSTEN-N, CSLVEN-N and CBUSLK-N to thereby determine the bus status, the result of which is coded. FIG. 46 is a view showing examples of the resulting codes. More specifically, there are shown in the figure combinations of the states of the five control lines on the left-hand side, the bus statuses indicated by the combinations at the center and the status corresponding codes on the right-hand side. Parenthetically, a mark "X" indicates that the states of the corresponding control lines may be either "HIGH" or "LOW". The encoder circuit 1004 converts automatically the combination of the five bus control line states as inputted into a corresponding code. The generated code is written in the register 1005 and at the same time is supplied to the decoder circuit 1003 which responds to only the code "000" or "001" by decoding the address. When the address as decoded corresponds to that of the program memory 1002, a write command signal for the program memory 1002 is outputted by the decoder circuit 1003 in case the code is "000", while a memory read command signal is outputted when the code is "001" with a memory read command signal being outputted when the code is "001". In this way, the read/write operation of the program memory 1002 can be carried out.

The instruction arithmetic unit 1006 is a logical operation unit which operates in accordance with a microprogram stored in the program memory 1002. More specifically, the unit 1006 performs a logic operation on k input bits in total supplied from the command buffer 1007, the program memory 1002 and the registers 1005 and 1009 to output k' bits, which are then written in the command buffer 1007. FIG. 47 shows an example of a format for the logical operation. Referring to FIG. 47, the k-bit input signal includes a memory address of $k_1$ bits inputted from the command buffer 1007, a microcode of $k_2$ bits inputted from the program memory 1002, a code of three bits written in the register 1005 by the encoder circuit 1004, the request line number of $k_3$ bits written in the register 1005 by the priority encoder 1008 and the acknowledge line number of $k_4$ bits inputted from the register 1009. On the other hand, the output signals of k' bits includes the memory address of $k_1$ bits, a control signal of $k_5$ bits for the register 1009 and the bus control line signal of ten bits and is written in the command buffer 1007. The instruction arithmetic unit 1006 converts automatically the k-bit input signal in accordance with the $k_3$-bit micro-code supplied from the program memory 1002.

The command buffer 1007 is constituted by a latch circuit which is designed to hold the k'-bit output of the instruction arithmetic unit 1006 for one instruction cycle. The memory address defined by $k_1$ bits out of the k' bits is supplied to the program memory 1002 and the instruction arithmetic unit 1006. The program memory 1002 has a data width (length) of $k_2$ bits and supplies to the instruction arithmetic unit 1006 a micro-code designated by the memory address supplied from the command buffer 1007. On the other hand, the instruction arithmetic unit 1006 arithmetically determines a next memory address from the current memory address in accordance with the micro-code. The next memory address thus determined is written in the command buffer 1007.

The priority encoder 1008 is constituted by a priority encoder which receives l request line inputs CBREQ(*)-N to select the request having the highest priority and supplies to the register 1005 and the register 1009 the $k_3$-bit request line number corresponding to the selected request. The register 1005 is loaded with the 3-bit bus status code from the encoder 1004 and the $k_3$-bit request line number from the priority encoder 1008.

The register 1009 is designed to hold two sets of the acknowledge line numbers of $k_4$ bits, which consists of the request line number of $k_3$ bits written from the priority encoder 1008 and added with a part of $k_3$ bits defining the register control signal supplied from the command buffer 1007. The register 1009 serves as a double buffer for holding the acknowledge line numbers for the master having currently the bus tenure and the master which can next assert the bus tenure. The acknowledge line number for the master holding currently the bus tenure is supplied to the instruction arithmetic unit 1006. The acknowledge line number for the master to which the bus tenure is next to be given or both the acknowledge line numbers are supplied to the decoder circuit 1010. The control for switching the double buffer and the control as to whether one or both of the acknowledge line numbers are to be supplied to the decoder circuit 1010 is carried out by making use of a part of the $k_5$ bits which define the register control signal outputted from the command buffer 1007.

Inputted to the instruction arithmetic unit 1006 are 3-bit codes from the registers 1005 and 1009 indicating the bus status, the request line number of $k_3$ bits and the acknowledge line number of $k_4$ bits for the master having currently the bus tenure. This is information indicating the bus status, the request status and the bus tenure status, respectively. On the basis of this information, the instruction arithmetic unit 1006 determines arithmetically in accordance with the micro-code supplied from the program memory 1002 the commands for the next states of the bus control line and the acknowledge line, respectively, in the form of the $k_5$-bit register control signal and the 10-bit buffer control line signal, respectively, wherein the commands thus determined are then written in the command buffer 1007.

The register control signals of $k_5$ bits include the double-buffer switching signal for the register 1009, a switching signal for selecting either one or two sets of the acknowledge line numbers to be supplied to the decode circuit 1010 and an additional bit for converting the request line number into the corresponding acknowledge line number. When the code indicating the bus status is such as indicated at 1010 or 1011 in FIG. 11, the instruction arithmetic unit 1006 issues a command for switching the double buffer, since the bus mastership is shifted. Further, for a request which is found to originate in the master having a higher privilege over the master currently holding the bus tenure as the result of comparison between the request status and the bus tenure status, the command is issued for sending two sets of acknowledge line numbers to the decode circuit 1010.

The bus control line signal of 10 bits allows the bus controller (SBUSC) 100 to control directly the bus control line for initialization in succession to the occurrence of error or for read/write operation to the program memory 1002 with two bits indicating the switching of the outputs ON/OFF and HIGH/LOW for each of the five bus control lines mentioned previously, respectively.

The decoder circuit 1010 decodes one or two sets of the acknowledge line numbers from the register 1009 to thereby validate one or two of the m acknowledge lines CBACK(*)-N. Ordinarily, only one acknowledge line for the master which is next to acquire the bus tenure is validated. However, when there is issued a bus request from a master having a higher privilege level than the master having currently the bus tenure, the instruction arithmetic unit 1006 sends a command to the register 1009 through the command buffer 1007 for causing the register output the two sets of the acknowledge line numbers, as the result of which the decoder circuit 1010 validates also the acknowledge line CBACK(*)-N for the master having currently the bus tenure, whereon the command for stopping the burst transfer is issued.

As will be appreciated from the above, the bus controller (SBUSC) 100 monitors the bus status and the bus request status to thereby control the bus by outputting the signals to the five bus control lines and the acknowledge line CBACK (*)-N.

The system according to the instant embodiment is so arranged that the bus controller (SBUSC) 100 undergoes a program control by the central control unit with the aid of the program memory 1002. In this conjunction, it is noted that when the bus specifications are fixedly determined, the program memory 1002 may be constituted by a ROM or the like so that the program can be incorporated in the bus control system.

Although the instruction arithmetic unit 1006 is constituted by a dedicated arithmetic logical unit (ALU) designed to operate in accordance with micro-codes in the case of the instant embodiment, it is equally possible to adopt an arrangement in which a general-purpose microprocessor is used as the instruction arithmetic unit, as in the case of the embodiment shown in FIG. 44.

Figure 48:
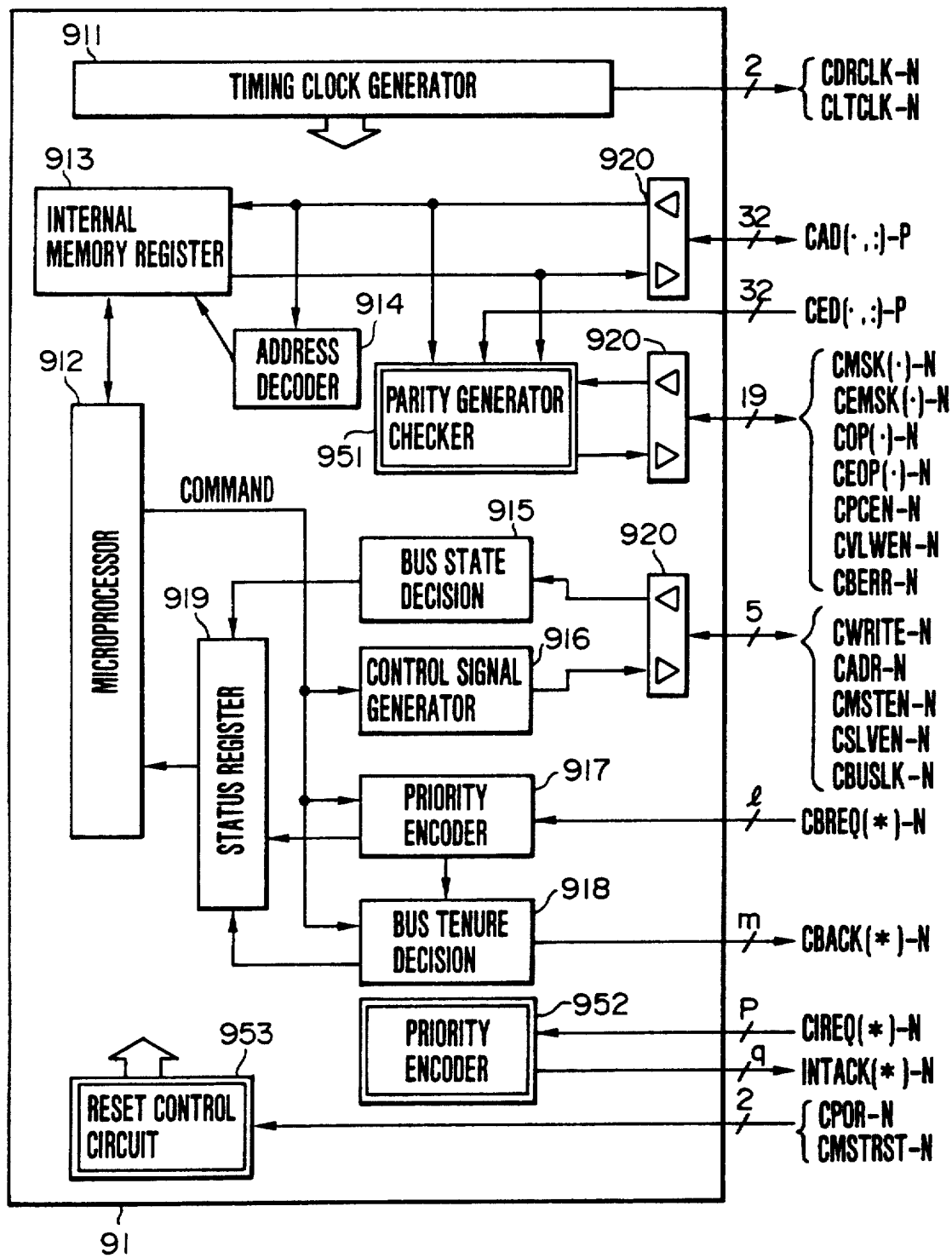
FIGS. 48 and 49 show other embodiments of bus controllers (SBUSC), respectively.
Figure 49:
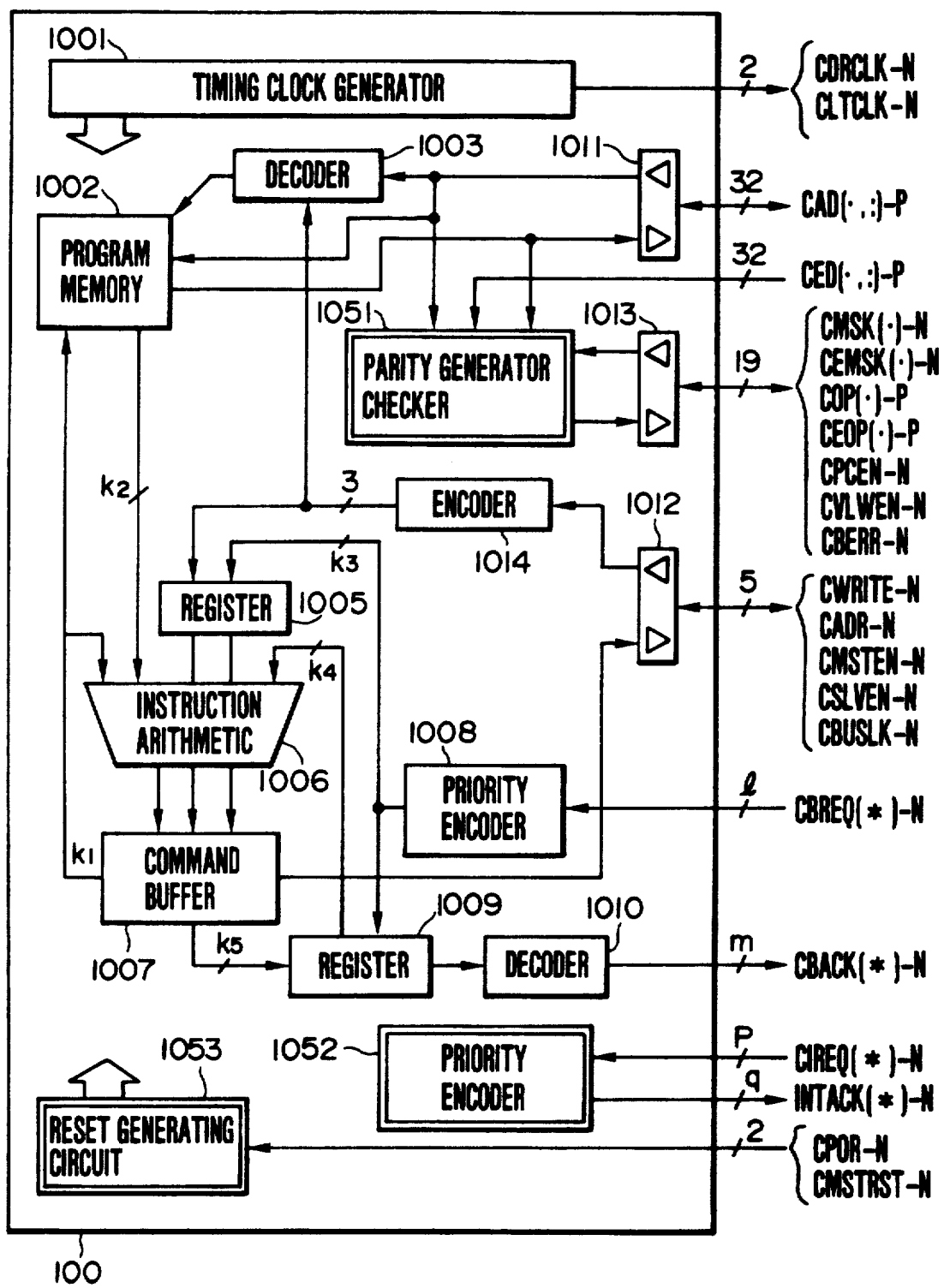

FIGS. 48 and 49 shows other embodiments of the bus controller SBUSC, respectively, which are adapted to be used with the system bus described hereinbefore with reference to FIGS. 5 et seq.. Since the embodiment shown in FIGS. 48 and 49 corresponds to the embodiment shown in FIGS. 44 and 45 in many respects, description of those parts common to both embodiments is omitted.

Referring to FIGS. 48 and 49, when the bus controllers 91 and 100 output the address signal CAD (. , :)-P, parity generator checkers 951 and 1051 generate corresponding parity data which are then delivered onto the line COP(.)-P. Further, when other connected devices are to perform the data transaction by using the lines CAD (. , :)-P and CED (. , :)-P, the signal CMSK (.)-N, CEMSK(*)-N, CPCEN-N and CVLWEN-N are checked through the procedure described hereinbefore by reference to FIGS. 13 to 16 to thereby carry out the parity checks COP(.)-P and CEOP(.)-P. When an error is detected as the result of the parity check, the bus error signal CBERR-N is outputted at the timing explained hereinbefore by reference to FIG. 29.

The priority encoders 952 and 1062 receive as the inputs thereto the p interrupt control signals CIREQ(*)-N to encode the interrupt having the highest priority among those being generated to thereby output the result of the encoding onto q interrupt message lines INTACK(*)-N, whereby messages are sent to devices which are issuing interrupt requests to the CPU or other. The line INTACK(*)-N is dedicated to the interrupt processing performed by the device and the bus controller and includes no bus control line.

A reset control circuit 953 and a reset generating circuit 1053 receive as the inputs thereto the signals from two reset lines CPOR-N and CMSTRST-N of the bus and generate reset signal for the bus controllers 91 and 100, respectively, when the reset is commanded, to thereby perform the reset control.

Figure 50A:
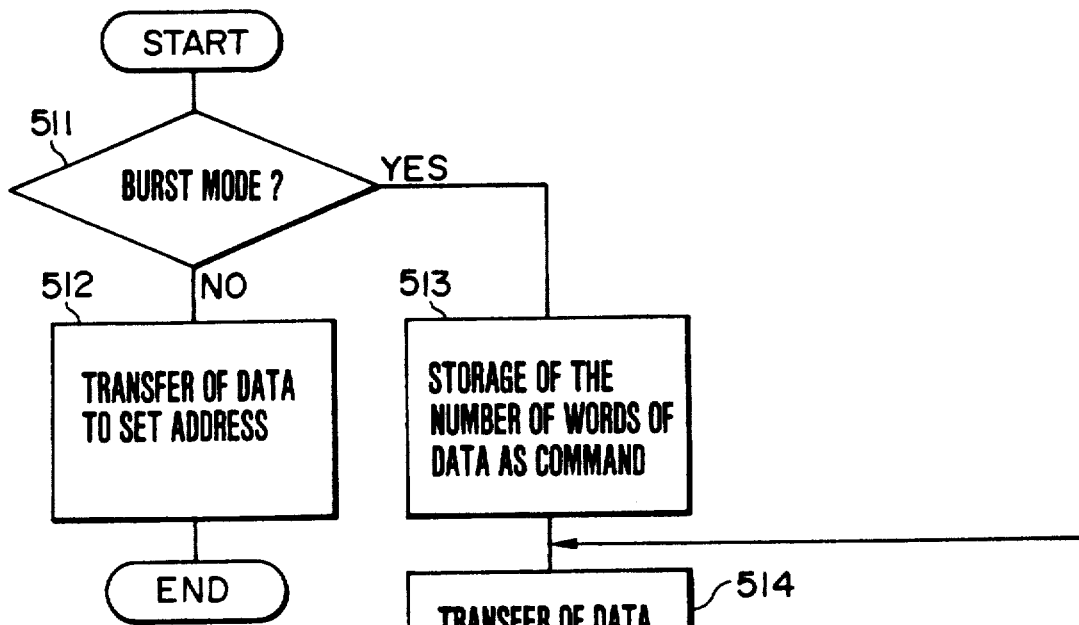
FIG. 50(a) is a flow chart for illustrating a data transfer operation of a bus system according to a conventional technique.
Figure 50B:
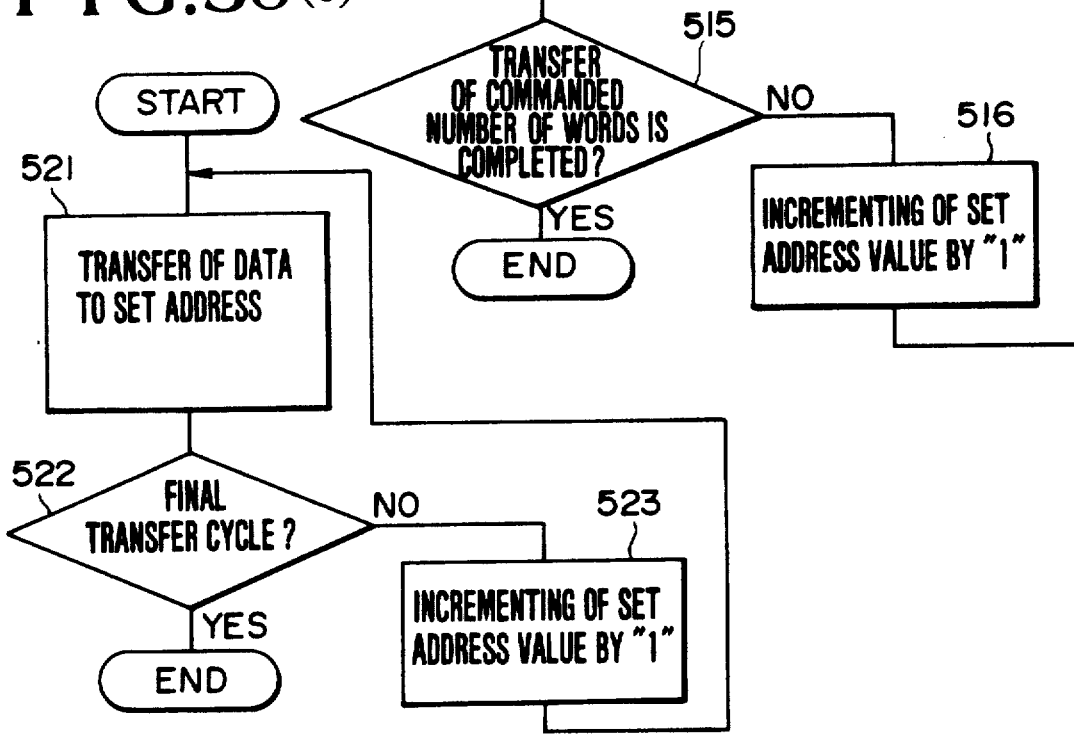
FIG. 50(b) is a flow chart for demonstrating advantageous effects of the bus systems according to the invention in comparison with the system shown in FIG. 50(a).

Finally, the effects which can be achieved with the embodiments of the invention described in the foregoing will be explained by reference to FIGS. 50(a) and 50(b), in which FIG. 50(a) is a flow chart for illustrating a data transfer operation of bus-connected devices through a conventional bus system, and FIG. 50(b) is a flow chart showing a flow in the system buses according to the embodiments of the invention.

In the case of the prior art bus system, a bus-connected device for performing the data transfer first makes decision as to whether the data transfer of concern is to be executed in the burst mode or not (step 511). Unless it is in the burst mode, the data transfer corresponding to the set address is performed (step 512) to thereby complete the data transaction. On the other hand, when the data transfer is to be performed in the burst mode, the number of words of data commanded for transfer in the burst mode is stored (531). Subsequently, the data transfer corresponding to the set address is performed (514), being followed by a decision step (515) for deciding whether or not the number of words as transferred has attained the commanded number of words. If the commanded number has been attained, the transfer comes to an end, and if otherwise, the value of the set address is incremented by one (516), whereon the next data transfer is performed. This process is repeated until data of the commanded number of words has been transferred.

In contrast, in the case of the system bus according to the embodiments of the invention, a bus-connected device to perform the data transaction executes the data transfer corresponding to the set address (521), and then makes decision as to whether or not the data transfer just executed is the final one (522). If it is final, the data transaction is ended, and if otherwise, the value of the set address is incremented by one (523) to execute the next data transfer. This process is repeated until the final data transfer has been executed.

As will be apparent, with the bus structures according to the invention, the control procedure for the transaction as well as the data transfer is much simplified when compared with the prior art system bus due to the fact that all the transfers can be accomplished through burst transfer, wherein the control circuits for performing the decision (511) and the operation (513) shown in FIG. 50(a) can be rendered unnecessary, which in turn means that the amount of hardware is correspondingly reduced.

As will now be appreciated from the foregoing description, the bus system taught by the invention permits the control means and circuits to be much simplified because all the data transfers can be realized in the burst transfer mode. Further, by executing the data transfer by handshake, the burst transfers can be performed at arbitrary and variable intervals. Additionally, by virtue of the possibility of specifying the final data to be transferred in the burst transfer mode, an arbitrary amount of data can be transferred consecutively. Besides, since the burst transfer stop command can be executed without interfering with the burst transfer operation, there can be realized the arbitration which is suited for the burst transfer of an arbitrary amount of data.

Moreover, according to the present invention, the data transfer can be carried out a plural number of times during a single bus tenure (per transaction) by modifying the address correspondingly. By virtue of this feature, distribution of a great amount of data to a plurality of addresses as well as read-modify-write transfer can be performed successively with high efficiency, whereby throughput of the bus can be enhanced to further advantage.

Besides, since the bus controller allows a bus mastership request of a higher priority to interrupt by commanding stoppage of the data transfer being performed without disturbing the data transfer operation, it is possible to exclude an unwanted situation in which the bus is executively used by a given device over an extended duration to thereby limit the operation of other devices.

Furthermore, according to the invention, an address space of highest efficiency is made available on the address/data multiplex type bus for information processing systems by allocating the addresses to all the bus-connected devices without redundancy. For those devices having data for transfer with a smaller width (length) than that of the address/data multiplex line, the width of data to be transferred as well as the position thereof in the data line can be controlled by a control circuit of a simple structure without need for controlling the multiplexed address to another advantage.

We claim:

1. A bus system for use in an information processing system, comprising:
   (a) a plurality of devices interconnected by a bus for transferring data based on requests;
   (b) a bus controller connected to said plurality of devices through said bus for controlling bus arbitration for effecting a data transaction among said devices;
   (c) a plurality of request lines and a plurality of acknowledge lines each separately connected between a respective one of said plurality of devices and said bus controller so that each device is connected to one request line and one acknowledge line;
   (d) priority means for holding a predetermined priority for each of said request lines;
   (e) acknowledge means in said bus controller responsive to a request received on at least one of said request lines for the use of said bus by at least one of said plurality of devices for asserting via an acknowledge line an acknowledgement to one device connected to a request line having highest priority of those devices issuing a bus use request;
   (f) data transfer means in each device, responsive to an acknowledgement from said acknowledge means, for transferring data to a device among said plurality of devices;
   (g) indication means in each device for asserting to said bus a signal indicating a timing at which a final data is transferred through said bus by said data transfer means between one device and another device; and
   (h) means in said bus controller for asserting an abort signal via said acknowledge line commanding said one device to abort a data transfer in response to another bus use request issued by another device having a higher priority than said one device;
   wherein said indication means includes means responsive to an abort signal for asserting a signal to said bus indicating a timing at which a final data is transferred to/from said one device to enable said data transfer means of said another device to initiate a data transfer upon receipt of an acknowledgement;
   said plurality of devices each comprising:
   (1) means for incrementing one by one a read/write address of data transferred through said bus,
   (2) address means responsive to reception of an acknowledgement from said bus controller for asserting an address designating a device as a slave for data transfer together with an address strobe on said bus,
   (3) master enable means for asserting a master enable signal on said bus indicating that said device which has received an acknowledgement operates as a master, and
   (4) address modifying means for controlling said address means to assert an address strobe while controlling said master enable means to assert a master enable signal to thereby indicate modification of a read/write address of data transferred through said bus to another device.

2. A bus system for use in an information processing system according to claim 1, wherein said address means includes means for asserting an address strobe and asserting an address on said bus upon transfer of data,
   wherein a number of bits of data to be transferred is equal to the number of bits of said address.

3. A bus system for use in an information processing system according to claim 2, wherein when the number of bits of said address is represented by n, and an address space of $2^n$ words each of n bits is provided for said devices.

4. A bus system for use in an information processing system according to claim 2, further including means for asserting a mask signal to designate validation or invalidation for only a part of the bits of said address.

5. A bus controller for controlling arbitration according to claim 2, wherein when the number of address lines of said bus is represented by n, an address space of $2^n$ words each of n bits is provided for said devices.

6. A bus controller for controlling arbitration according to claim 2, further including means for asserting a mask signal to designate validation or invalidation for only a part of the bits of an address on said bus.

7. A mechanism for transferring data from a first device to a second device through a common bus using a bus controller connected to the common bus in an information processing system, comprising:
   (a) a plurality of request lines and a plurality of acknowledge lines each separately connected between a respective one of said devices and said bus controller so that each device is connected to one request line and one acknowledge line, separately;
   (b) request means responsive to a demand in said first device for transfer of data to said second device for issuing a bus request signal requesting a use of said common bus by said first device via a request line connected to said first device;
   (c) bus lock means responsive to an acknowledge signal from said bus controller for issuing a signal on said common bus indicating that said common bus is busy;
   (d) means responsive to said acknowledge signal from said bus controller via an acknowledge line for transferring on said common bus a signal indicating whether data transfer is for writing data or for reading data, a signal indicating an address of a destination of said data transfer and said data;
   (e) data transfer means for transferring data via said common bus;

(f) indication means for asserting to said common bus a signal indicating a timing at which a final data is transferred;

(g) wherein said indication means includes means responsive to reception of another signal commanding an abort of the data transfer via said acknowledge line for aborting said data transfer and for issuing a signal indicating release of said common bus to said bus lock means;

(h) means for incrementing one by one the address for data transferred through said common bus;

(i) address means responsive to the reception of an acknowledge signal from said bus controller for asserting an address designating another device as slave destined to receive the data transferred together with an address strobe;

(j) master enable means responsive to reception of said acknowledge signal for asserting a master enable signal indicting that said device is to operate as a master in the use of the bus; and (k) address modifying means or controlling said address means to assert the address strobe while controlling said master enable means to assert a master enable signal to thereby indicate modification of the address of data transferred through said bus to another address.

* * * * *